(12) United States Patent
Savenok

(10) Patent No.: US 10,710,293 B2
(45) Date of Patent: Jul. 14, 2020

(54) COMPOSITE ARTICLE ASSEMBLY SYSTEM AND METHOD

(71) Applicant: Pavel Savenok, Wheaton, IL (US)

(72) Inventor: Pavel Savenok, Wheaton, IL (US)

(*) Notice: Subject to any disclaimer, the term of this patent is extended or adjusted under 35 U.S.C. 154(b) by 0 days.

(21) Appl. No.: 16/661,765

(22) Filed: Oct. 23, 2019

(65) Prior Publication Data

US 2020/0122381 A1    Apr. 23, 2020

Related U.S. Application Data

(60) Provisional application No. 62/749,627, filed on Oct. 23, 2018.

(51) Int. Cl.
| | | |
|---|---|---|
| B29C 51/26 | (2006.01) | |
| B29C 65/78 | (2006.01) | |
| B29L 31/56 | (2006.01) | |

(52) U.S. Cl.
CPC ........ *B29C 51/268* (2013.01); *B29C 65/7802* (2013.01); *B29C 65/7894* (2013.01); *B29L 2031/56* (2013.01)

(58) Field of Classification Search
CPC .............. B29C 51/268; B29C 65/7802; B29C 65/7894; B29L 2031/56
See application file for complete search history.

(56) References Cited

U.S. PATENT DOCUMENTS

| | | | |
|---|---|---|---|
| 7,353,582 B2 | 4/2008 | MacKenzie et al. | |
| 7,523,534 B2 | 4/2009 | MacKenzie et al. | |
| 8,544,677 B2* | 10/2013 | Selina ................ | B65D 21/0219 220/254.3 |
| 9,730,540 B2* | 8/2017 | Tabor ........................ | B26F 1/40 |
| 2009/0283526 A1* | 11/2009 | Pierce .................... | A47G 19/22 220/254.7 |

* cited by examiner

*Primary Examiner* — John C Hong
(74) *Attorney, Agent, or Firm* — Christopher J. Scott

(57) ABSTRACT

A composite article assembly arrangement includes an all-in-one assembly station for supporting certain two-workpiece or composite article assembly methodologies with a view toward a preferred lid assembly application. The all-in-one assembly station includes a stationary main base plate, opposed intermediate compactor plates, and opposed outer plates, which compactor plates and outer plates are movable relative to the stationary main base plate. One or more continuous webs bearing thermoformed first and second workpieces are directed through the assembly station, which assembly station operates to both separate the first and second workpieces from the web(s) as directed therethrough and assemble the first and second workpieces in one clapping movement of the compactor plates and outer plates relative to the main base plate. The main base plate comprises an axial alignment chamber or cavity that operates to mechanically or structurally maintain axial alignment of the first and second workpieces during workpiece assembly.

8 Claims, 75 Drawing Sheets

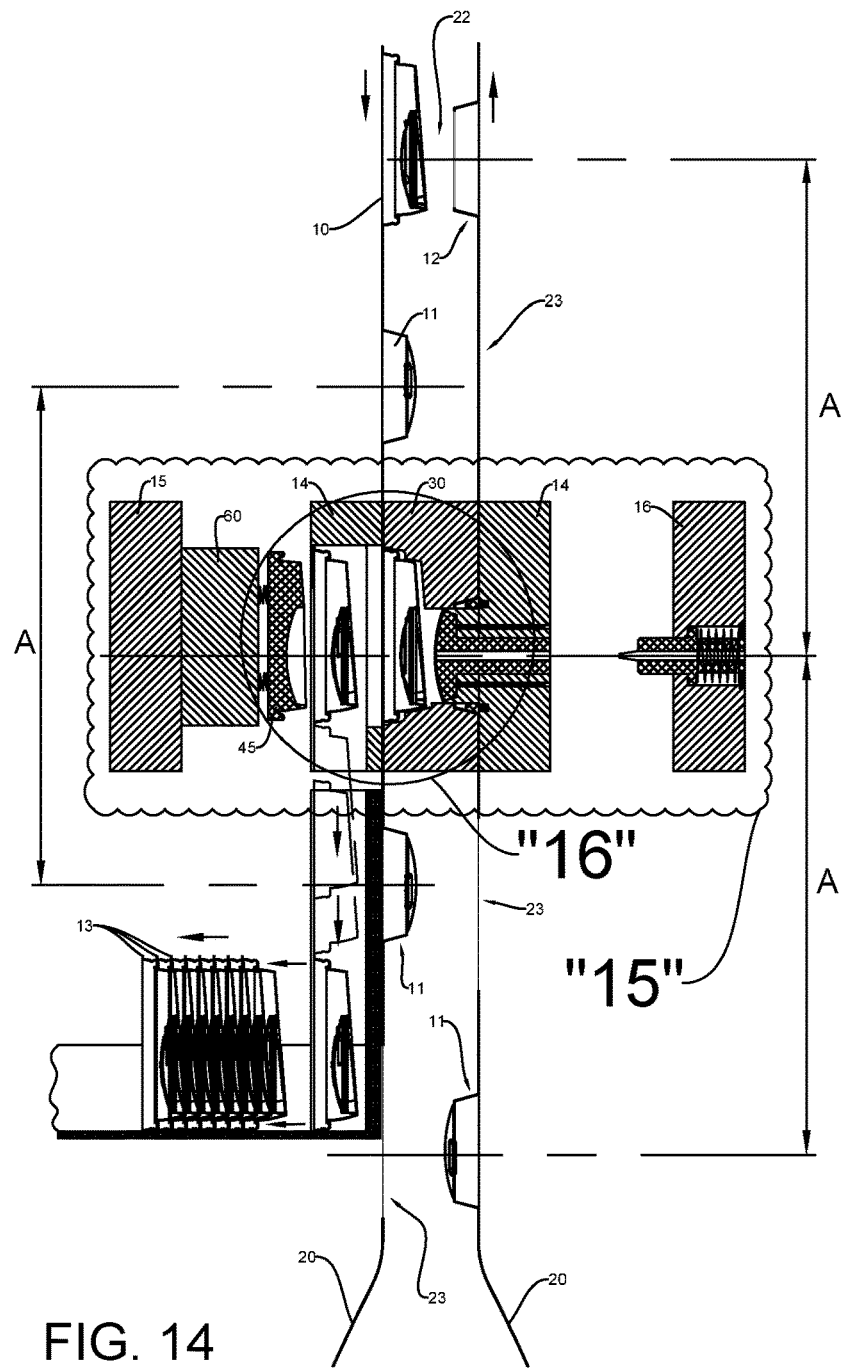
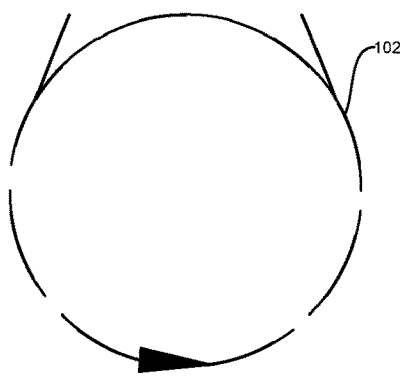
FIG. 14

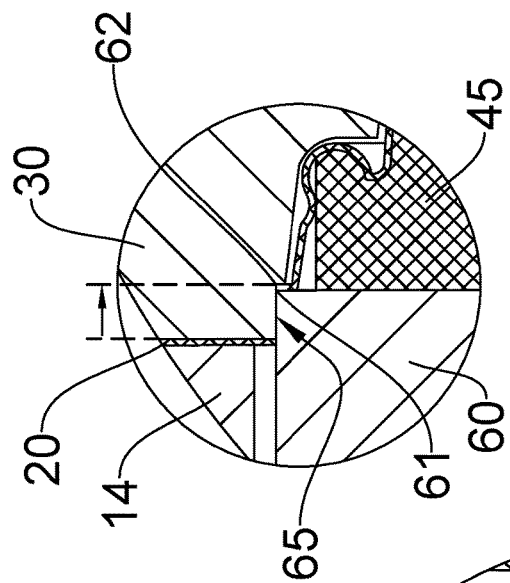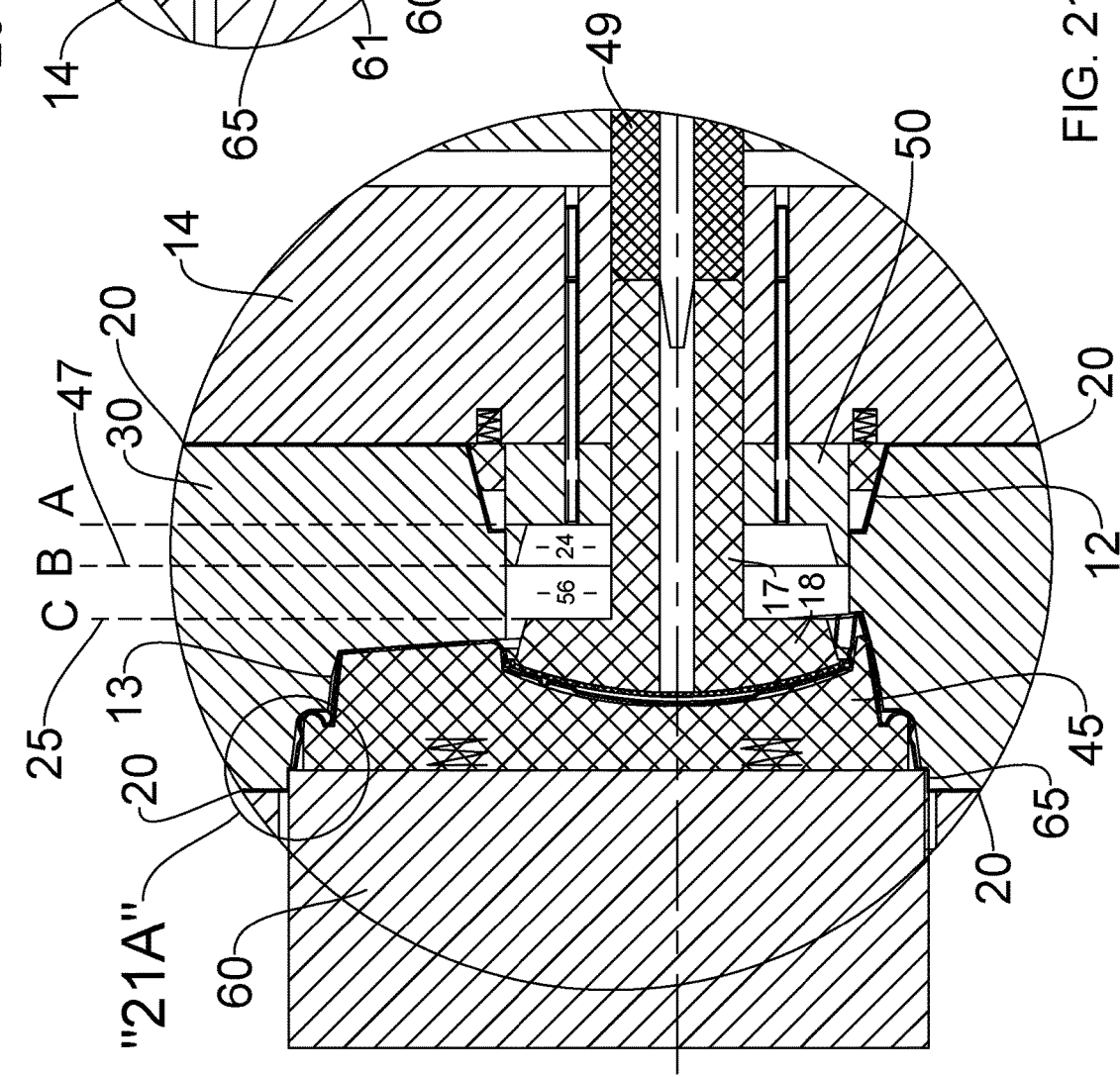
FIG. 21A
FIG. 21

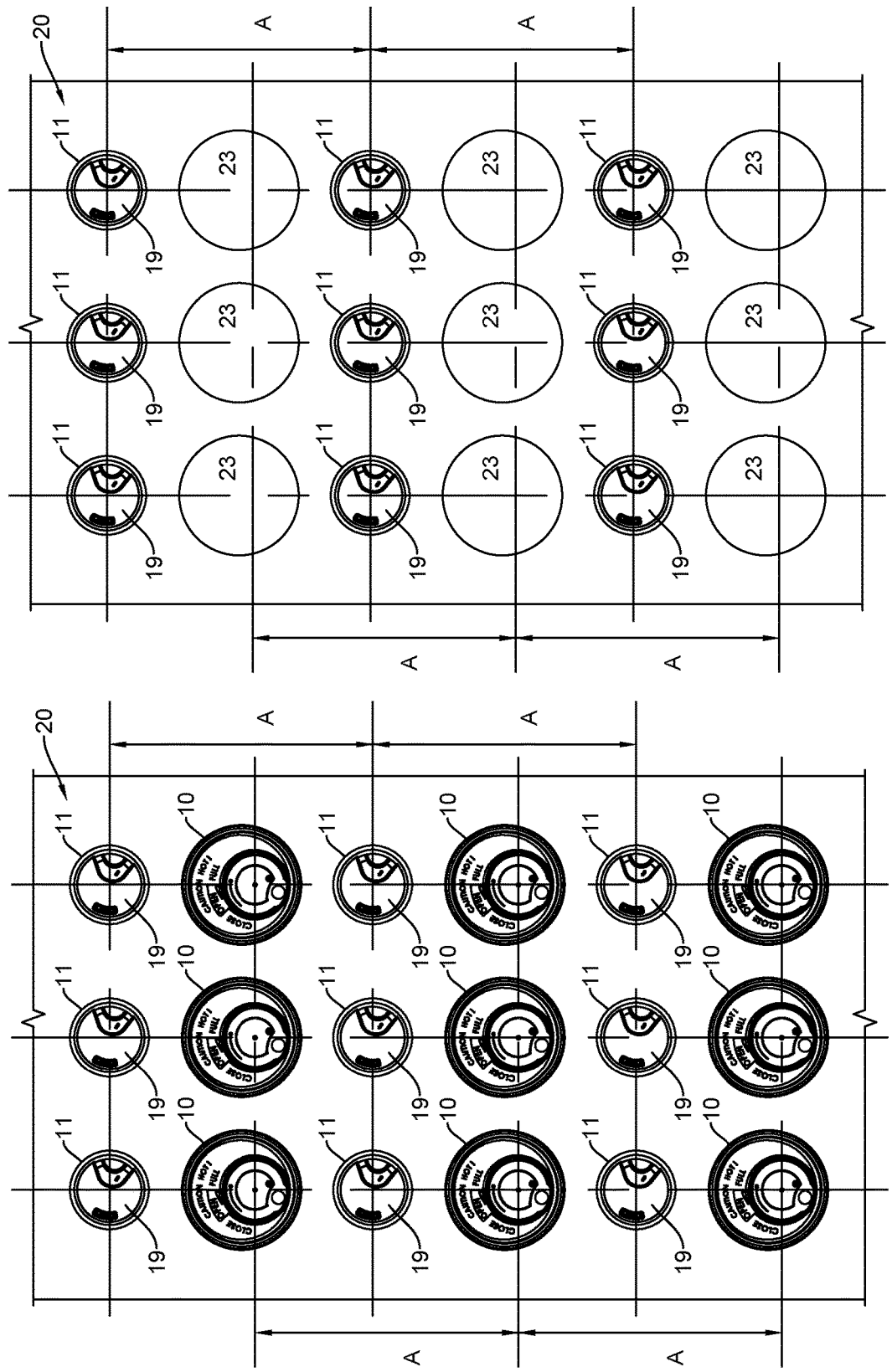

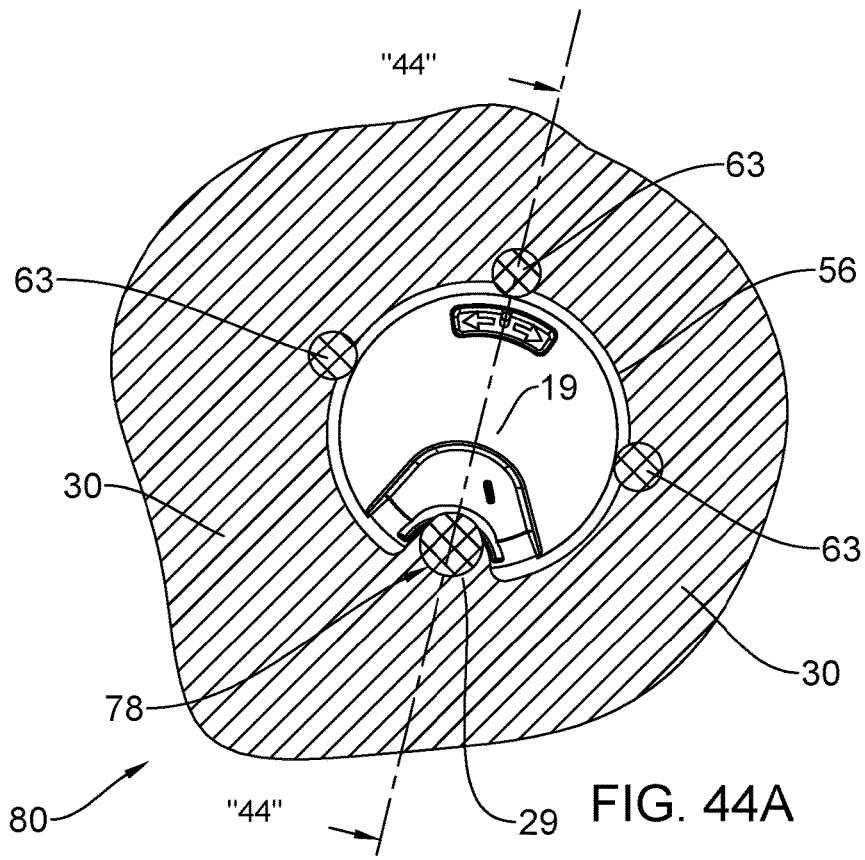
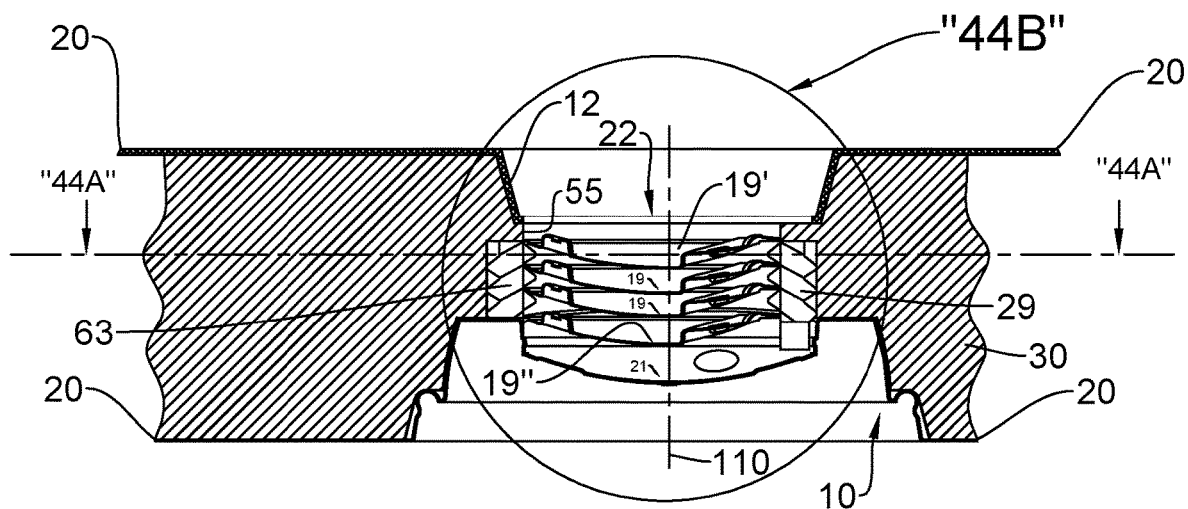
FIG. 44

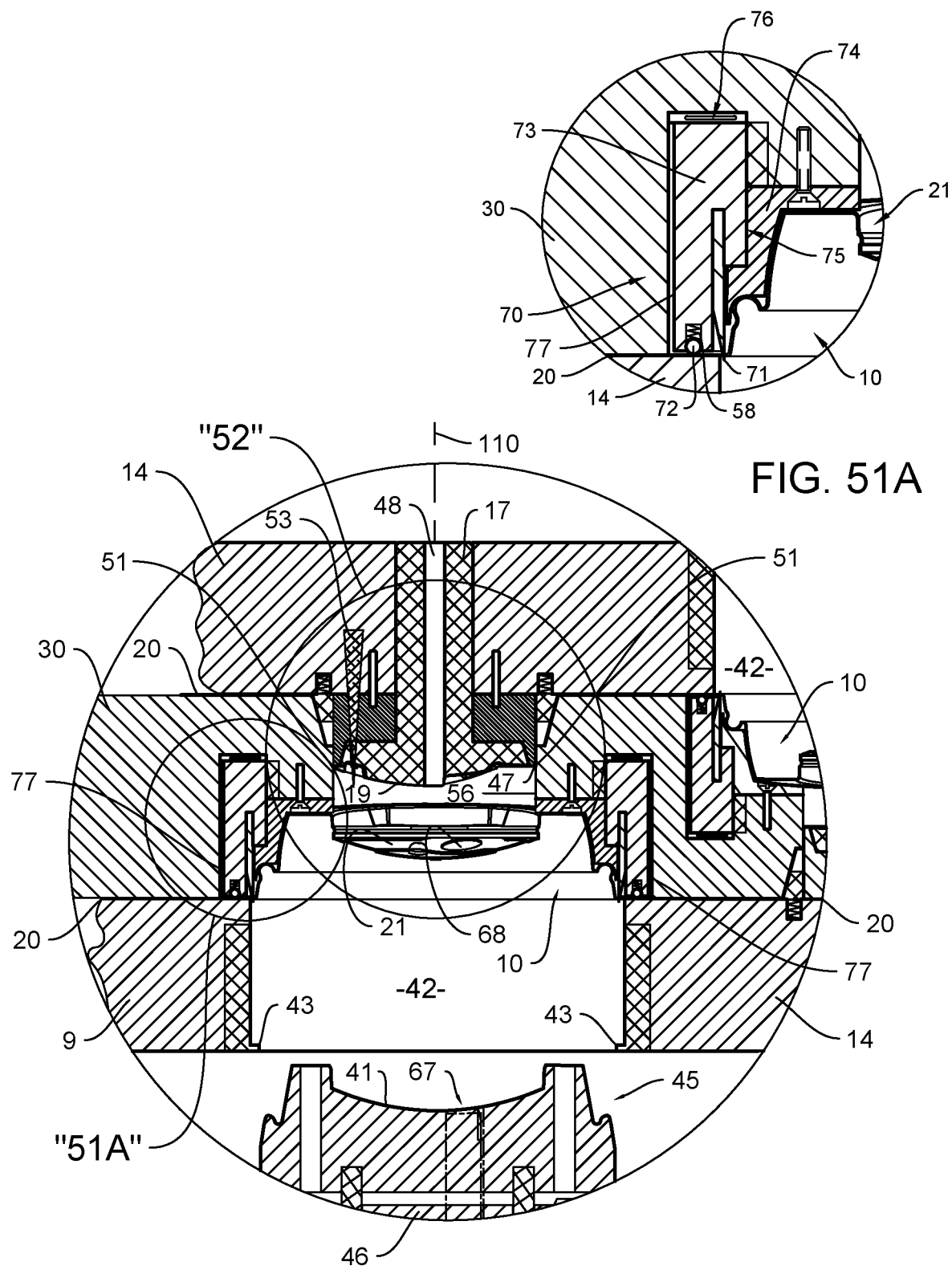

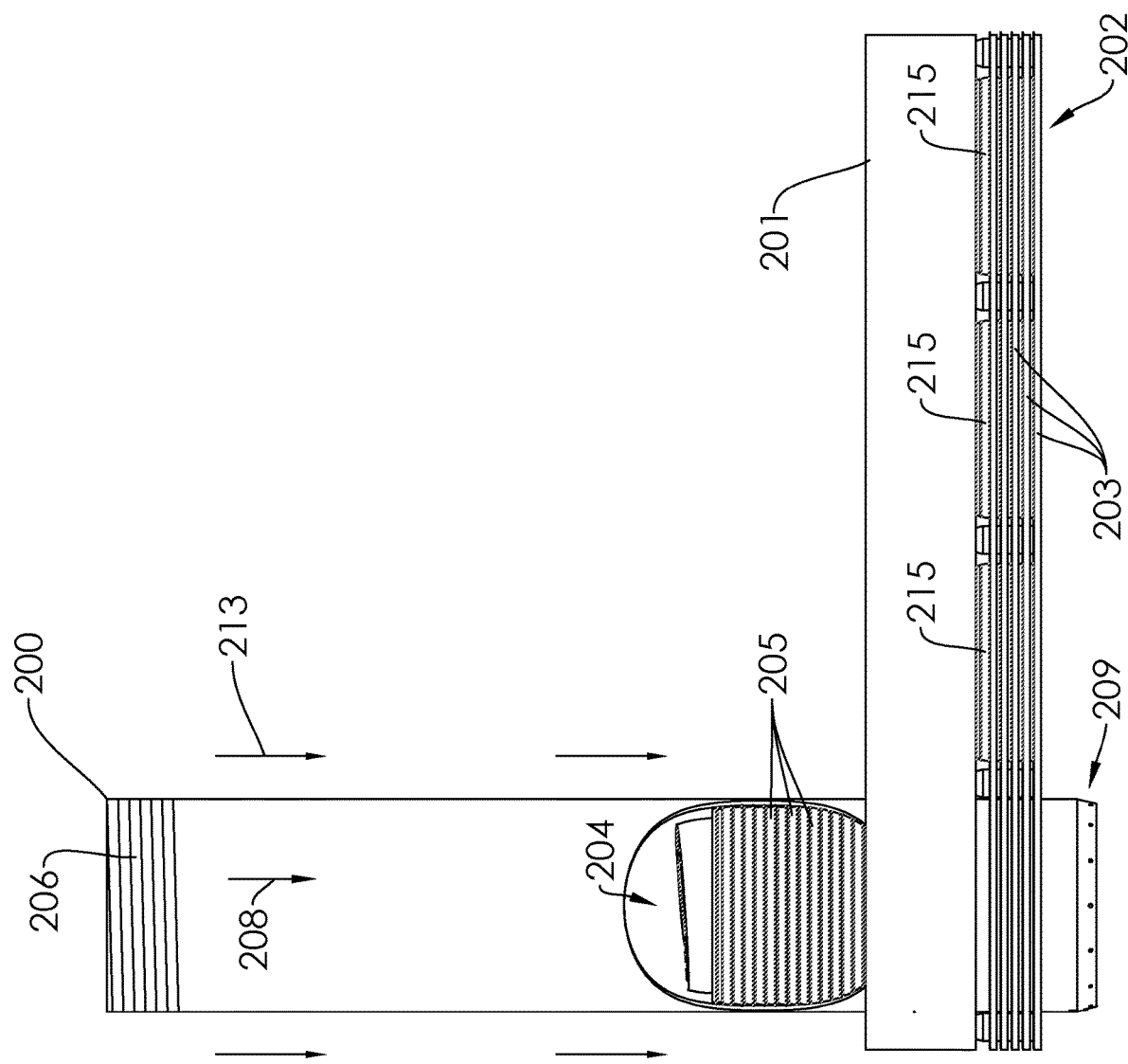

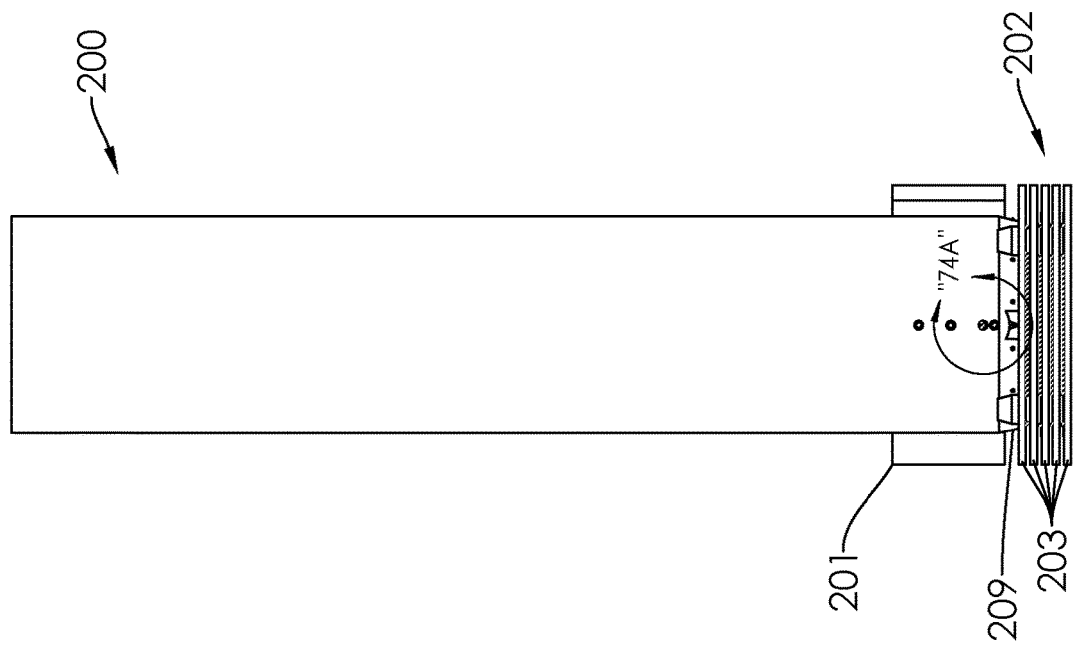
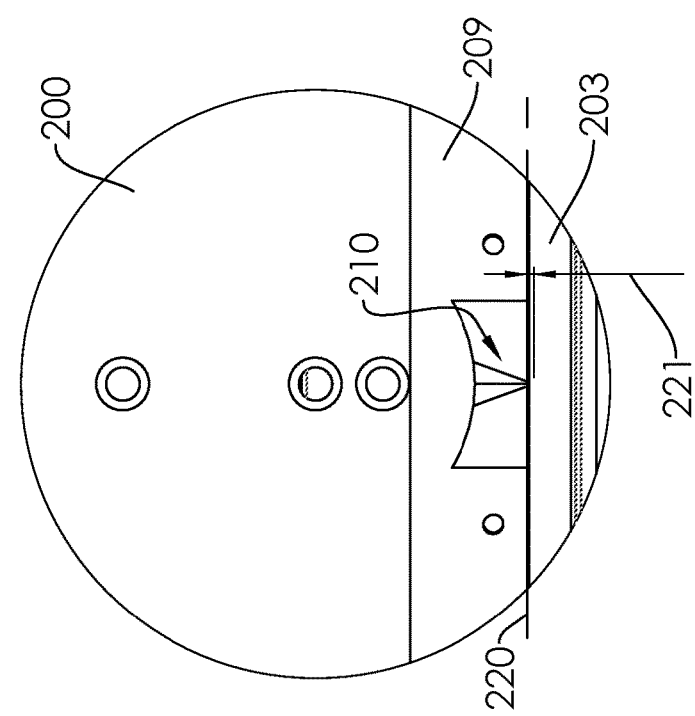

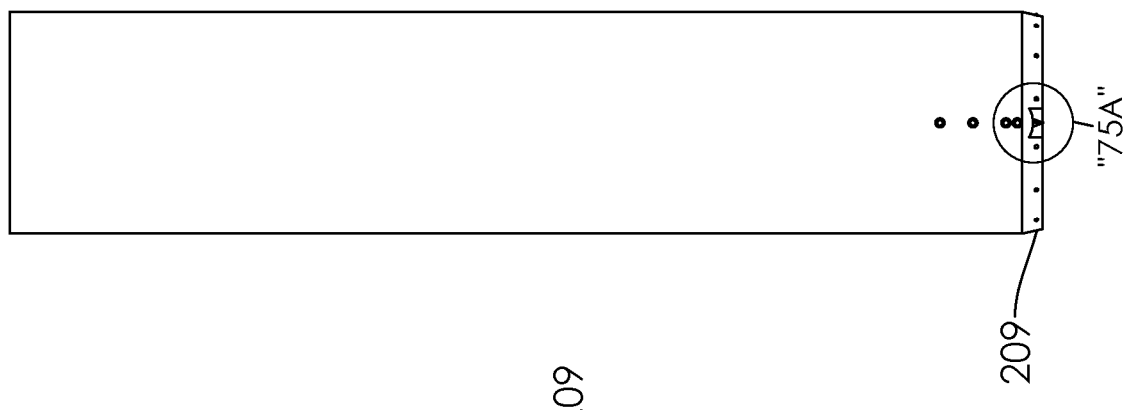
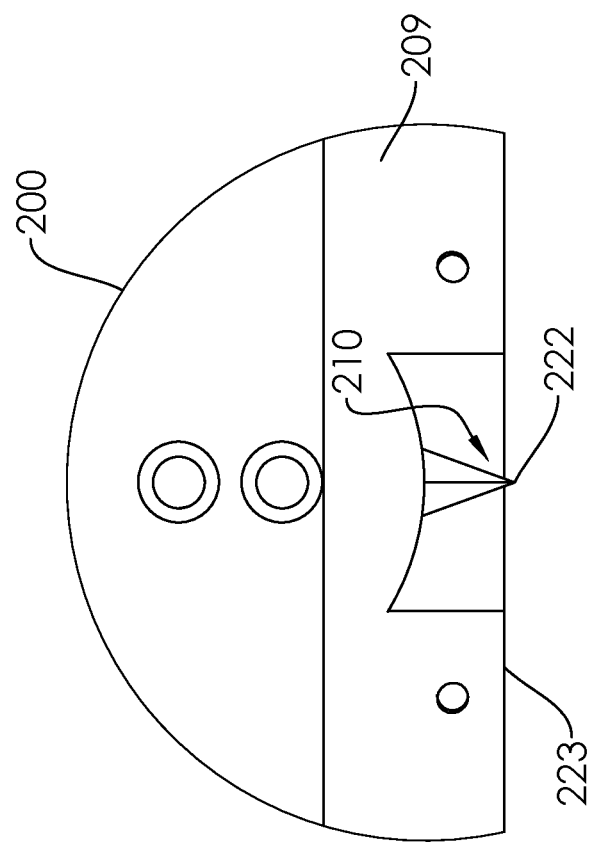
FIG. 75
FIG. 75A

COMPOSITE ARTICLE ASSEMBLY SYSTEM AND METHOD

PRIOR HISTORY

This application claims the benefit of U.S. Provisional Patent Application No. 62/749,627 filed in the United States Patent and Trademark Office (USPTO) on 23 Oct. 2018, the specifications and drawings of which are hereby incorporated by reference thereto.

BACKGROUND OF THE INVENTION

Field of the Invention

The present invention relates generally to certain production line systems and associated methods for forming composite articles as preferably applied to two-piece lid assemblies. More particularly, the present invention relates to production line assembly stations having all-in-one functionality whereby, in a single clapping movement, first and second thermoformed workpieces are removed from a web and assembled into a composite article typified by a two-piece lid assembly.

Brief Description of the Prior Art

U.S. Pat. No. 7,353,582 ('582 patent), issued to MacKenzie et al., discloses a Method for Assembling a Closure Tab to a Lid. The '582 patent describes a method and apparatus for assembling a first thermoformed workpiece, such as a tab closure, to a second thermoformed workpiece, such as a lid. The invention described by the '582 patent relates to an automated manufacturing line for making a composite thermoformed article from first and second thermoformed workpieces by automatically assembling the first thermoformed workpiece to the second thermoformed workpiece. The automated manufacturing line comprises a thermoforming station for thermoforming the first and second thermoformed workpieces in a plastic sheet, a trim station for trimming at least the first thermoformed workpiece from the plastic sheet; and an assembly station for assembling the first thermoformed workpiece onto the second thermoformed workpiece to form the composite article.

U.S. Pat. No. 7,523,534 ('534 patent), issued to MacKenzie et al., discloses a Method for Assembling a Closure Tab to a Lid. Similar to the '582 patent, the '534 patent describes certain methods for assembling a first thermoformed workpiece, such as a closure tab, to a second thermoformed workpiece, such as a lid. The assembly station of the '534 patent further describes a carrier mechanism that moves between a first position, where it picks the first thermoformed workpiece, and a second position, where it assembles the first thermoformed workpiece to the second thermoformed workpiece. A suction device can be added to the carrier to pick the first thermoformed workpiece as it is trimmed from the sheet and hold the first thermoformed workpiece as it is carried to the second thermoformed workpiece. Additionally, a force reliever can be added to the carrier to control the amount of force applied by the carrier to the first and second thermoformed workpieces as they are assembled.

The prior art perceives a need for a substantially simultaneous, dual-action composite article assembly system and method that operates to eliminate the structural requirement to carry a second workpiece to a first workpiece for article assembly. The state of the art teaches complex systems for workpiece transfer within a three-dimensional space, leading to inefficiency in workpiece-to-workpiece assembly. To overcome the structural requirement of carrying workpieces to other workpieces, the prior art perceives a need for a single step motion whereby workpieces can be removed from thermoformed webs and in the single step motion be assembled with one another. The present invention attempts to address this perceived need by providing certain composite article assembly methodologies supported by all-in-one assembly stations and associated production line technology, as summarized in more detail hereinafter.

SUMMARY OF THE INVENTION

Among the many objectives of this invention is the provision of a composite article assembly production line or arrangement comprising an all-in-one assembly station for supporting certain composite article assembly methodologies as exemplified by two-piece lid assemblies. The all-in-one assembly stations according to the present invention essentially comprise a stationary main base plate, opposed intermediate compactor plates, and opposed outer plates, which compactor plates and outer plates are movable relative to the stationary main base plate.

One or more continuous webs bearing thermoformed workpieces, exemplified by upper lid bodies and lower lid bodies, are directed through the assembly stations, which stations operate to both separate the workpieces from the web(s) as directed therethrough and assemble the workpieces in one clap-like or clapping movement of the compactor plates and outer plates relative to the main base plate. The main base plate comprises an axial alignment chamber or cavity that operates to mechanically or structurally maintain axial alignment of the workpieces as they are assembled to form the composite article.

The composite article assembly method supported by the all-in-one assembly stations according to the present invention may be said to comprise the basic steps of forming workpieces exemplified by upper lid bodies or disks and lower lid bodies or primary lid formations via state-of-the-art thermoforming station(s). The workpieces are then placed or directed into axial alignment with one another along an assembly alignment axis extending through the assembly site or chamber(s) of the main base plate of the all-in-one assembly station(s).

Once placed into axial alignment with one another, the workpieces are directed toward one another within the assembly station along the assembly alignment axis or alignment axes in the case of multiple assembly chambers formed in the main base plate. When directed toward one another, distance between the respectively aligned workpieces is decreased to the point when aligned upper workpieces approaches zero, and the first and second workpieces are assembled under the forced and directed engagement into one another to form composite articles exemplified by two-piece lid assemblies.

Central to the practice of the present invention are the steps of directing the first and second workpieces toward one another within the assembly station along the assembly alignment axis, and assembling the first and second workpieces along or in parallel relation relative to the assembly alignment axis within the all-in-one assembly station(s) as performed in a single clap-like or clapping movement of opposed tooling as exemplified by intermediate compactor plates and outer plates opposite the stationary main base plate within which workpiece assembly occurs.

The present invention is believed centered on the substantially simultaneous, dual-action (with sequential momentary delays as may be required), workpiece-cut and workpiece-to-workpiece assembly step whereby the opposed tooling is directed towards one another for directing a first workpiece (e.g. an upper lid body or disk) into engagement with a second workpiece (e.g. a lower lid body or primary lid formation) for forming composite articles. In other words, when the first workpiece is cut from the web it is directed (not carried)) into assembled relation with the second workpiece also being cut from the web during one clap-like, to-and-fro, or back and forth tooling movement within the all-in-one assembly station(s) thereby providing a composite formed article or two-workpiece assembly.

The step of forming first workpieces and second workpieces via the primary body-forming or thermoforming stations comprises or includes the step of forming the such workpieces on at least one continuous web. However, the present invention further contemplates the formation of such workpieces or composite formed articles on at least a pair of, or at least two continuous webs, directing the pair or at least two continuous webs via at least two separate primary thermoforming stations in a web-to-station flow or direction (i.e. into or toward a singular all-in-one assembly station).

The composite article assembly method according to the present invention further comprises the step of removing (e.g. via a select cutting process) a select body formation from the at least one continuous web before directing first and second workpieces toward one another within the assembly station, which select body formation is selected from the group consisting of the first workpieces and the second workpieces. The select cutting process may be selected from the group consisting of a die-cutting process or a circular knife-cutting process.

The composite article assembly method may further preferably comprise or include the step of forming first and second workpieces on the least one continuous web via the at least one thermoforming station such that the first and second workpieces are formed in spaced and alternating relation to one another. The at least one continuous web may be further directed through a secondary body-forming station as exemplified by pre-punch stations after forming the first and second workpieces via the primary thermoforming station(s). The secondary body-forming stations function to form secondary formations as exemplified by sip holes, air vents, or other similar secondary apertures in select workpieces as selected from the group consisting of the first and second workpieces.

When the production line is built around a single, continuous web, the composite article assembly method may further preferably comprise the step of directing the spaced and alternating first and second workpieces through a loop mechanism so as to axially align the first and second workpieces within the singular assembly station for forming composite articles. Bearing in mind that the all-in-one assembly stations all provide a basis for the described methodology, the methodology may further preferably comprise the step of directing the first and second workpieces into a stationary plate structurally enhancing axial alignment of the first and second workpieces during the step of assembling the first and second workpieces along the assembly alignment axis.

The present invention may further preferably comprise the step of directing at least two or a series of workpieces into a portion of the stationary plate before directing a first of the series of workpieces into assembled relation with a singular second workpiece. In other words, a series of workpieces (e.g. disks) may be directed into a disk-guiding shaft of the main base plate before a first of the workpieces (e.g. disks) is expelled, discharged or otherwise directed from the disk-guiding shaft into engagement with an underlying lid depression of a workpiece (e.g. a lower lid body). It will thus be understood that the disk-guiding shaft of the stationary plate may temporarily store at least one workpiece for later discharge as governed by the operator.

The present invention embraces the concept of adjusting tooling features in a manner that cooperates with inherent resiliency of materials to provide for better assembly characteristics. For example, a compactor shaft and compactor head may be finely adjusted so as to resiliently deform a first workpiece prior to separation from the web and directed transfer through the disk-guiding shaft into engagement with the underlying workpiece. Accordingly, the present methodology contemplates the step of resiliently deforming a select body formation before the step of assembling the first and second workpieces along the assembly alignment axis within the assembly station, which select body formation is selected from the group consisting of the first and second workpieces. The step of resiliently deforming the select body formation functions to adjustably enhance workpiece assembly.

The present specifications further contemplate certain workpiece stacking methodology or workpiece cutting methodology for providing a stacked series of workpieces for ease of packaging. The workpiece stacking or cutting methodology according to the present invention contemplates the essential steps of stacking a series of web sheets atop one another into a web sheet stack. Each web sheet may provide at least one, but preferably a series of workpiece sites. The web sheet stack may thus preferably comprise at least one stack of web-based workpieces.

The web sheet stack may be positioned in (inferior) adjacency to a shaft-receiving plate assembly, which shaft-receiving plate assembly comprises at least one, but preferably a series of shaft-receiving apertures or bores. The at least one stack of web-based workpieces are preferably positioned in adjacency to the shaft-receiving aperture(s). At least one tubular shaft, but preferably a plurality of tubular shafts may be directed through the web sheet stack via the shaft-receiving aperture(s) thereby separating the web-based workpieces from the series of web sheets and forming a stacked series of workpieces within the tubular shaft.

The stacked series of lid formations or workpieces are linearly directed into the tubular shaft as the tubular shaft is directed through the web sheet stack. In this regard, each tubular shaft preferably comprises a tubular shaft end, which tubular shaft end is preferably outfitted with a cutting implement or knife. The cutting implement cuts through the web sheet stack as the tubular shaft is directed therethrough. The tubular shaft preferably comprises external threads, and the shaft receiving aperture or bore is preferably outfitted with a thread-driving interface. The thread-driving interface and external threads are cooperable for converting rotational motion to linearly directed motion thereby directing the tubular shaft linearly through the web sheet stack.

Other secondary objects of the present invention, as well as particular features, elements, and advantages thereof, will be elucidated or become apparent from, the following brief descriptions of the drawings and the accompanying drawing figures.

BRIEF DESCRIPTIONS OF THE DRAWINGS

Other features and objectives of the invention will become more evident from a consideration of the following brief descriptions of patent drawings.

FIG. 14 is a schematic drawing showing a fourth production line arrangement with a schematic side view depiction of a fourth all-in-one assembly station for punching+trimming+assembling+packaging lower lid bodies and upper lid bodies according to the present invention.

Figure 17:
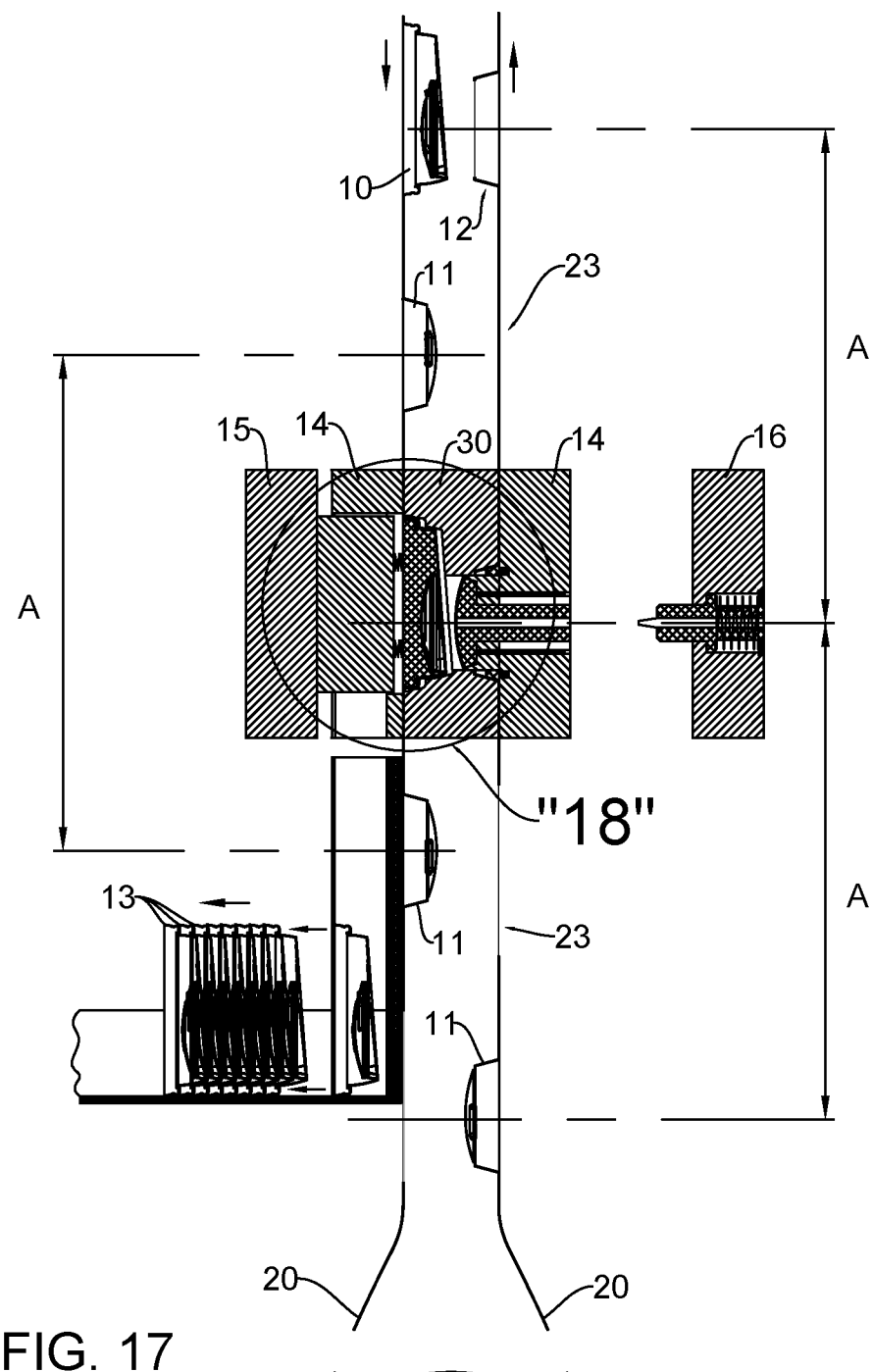
FIG. 17 is a schematic drawing showing a generic fourth production line arrangement with a schematic side view depiction of a generic all-in-one assembly station (for punching+trimming+assembling+packaging lower lid bodies and upper lid bodies showing the outer plate in engagement with the first intermediate compactor plate.
Figure 18:
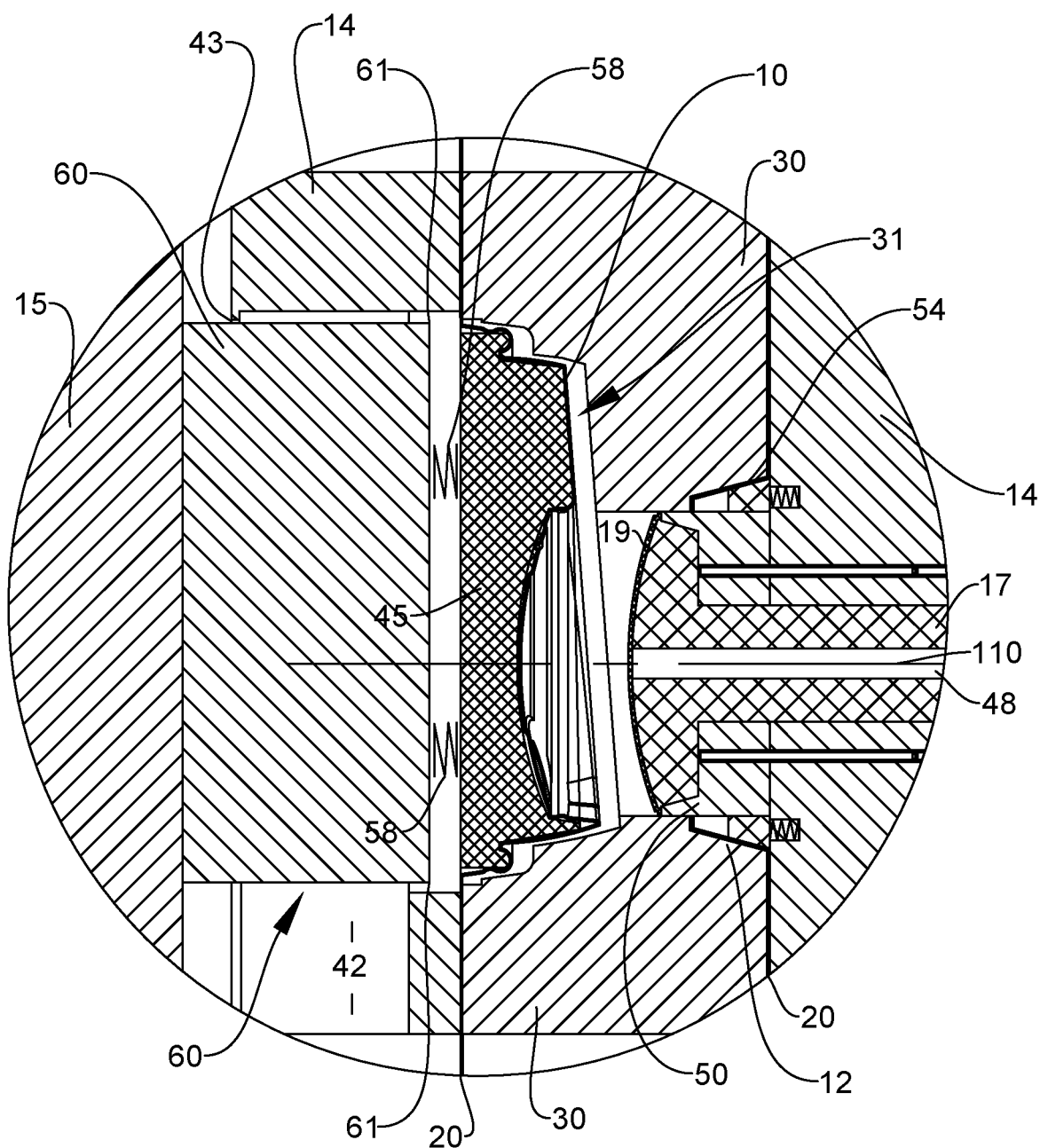
Figure 19:
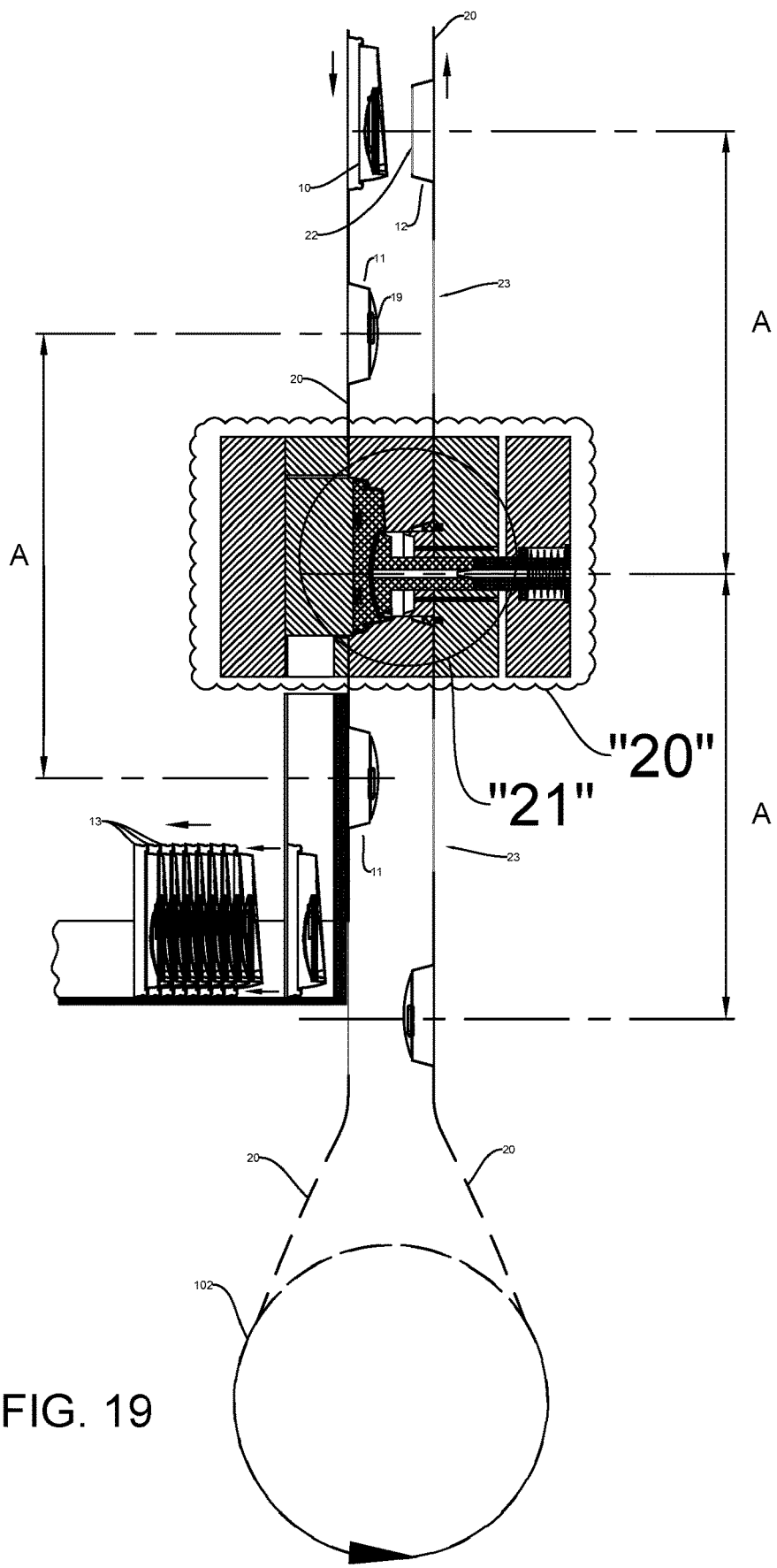

FIG. 18 is an enlarged schematic drawing as enlarged from FIG. 17 to more clearly show the outer plate in engagement with the first intermediate compactor plate FIG. 19 is a schematic drawing showing a generic fourth production line arrangement with a schematic side view depiction of a generic all-in-one assembly station for punching+trimming+assembling+packaging lower lid bodies and upper lid bodies showing the outer plate in engagement with the first intermediate compactor plate and the outer pin support plate in engagement with the second intermediate compactor plate thereby directing the upper lid body into assembled relation with the lower lid body.

Figure 20:
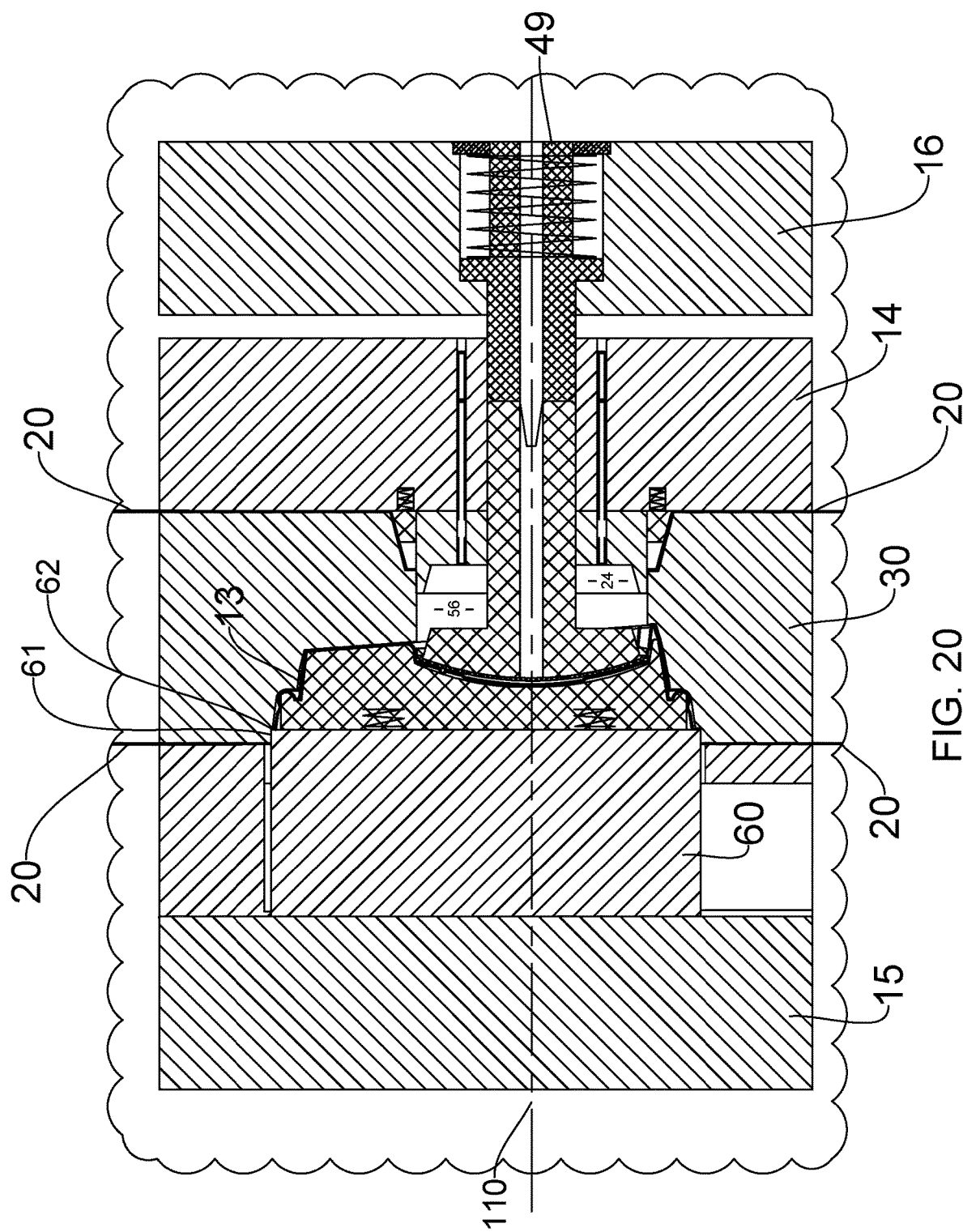

FIG. 20 is an enlarged schematic drawing as enlarged from FIG. 19 to more clearly show from left-to-right an outer plate, a first intermediate compactor plate, a main base plate, a second intermediate compactor plate, and an outer pin support plate relative to opposed portions of the web being directed therethrough and the upper lid body being directed into assembled relation with the lower lid body.

FIG. 21 is an enlarged schematic drawing as enlarged from FIG. 19 to more clearly show the outer plate in engagement with the first intermediate compactor plate and the outer pin support plate in engagement with the second intermediate compactor plate relative to opposed portions of the web with the upper lid body being directed into assembled relation with the lower lid body.

FIG. 21A is an enlarged schematic drawing as enlarged from FIG. 21 to more clearly show the site where the lower lid body punch removes the lower lid body from the web.

Figure 22:
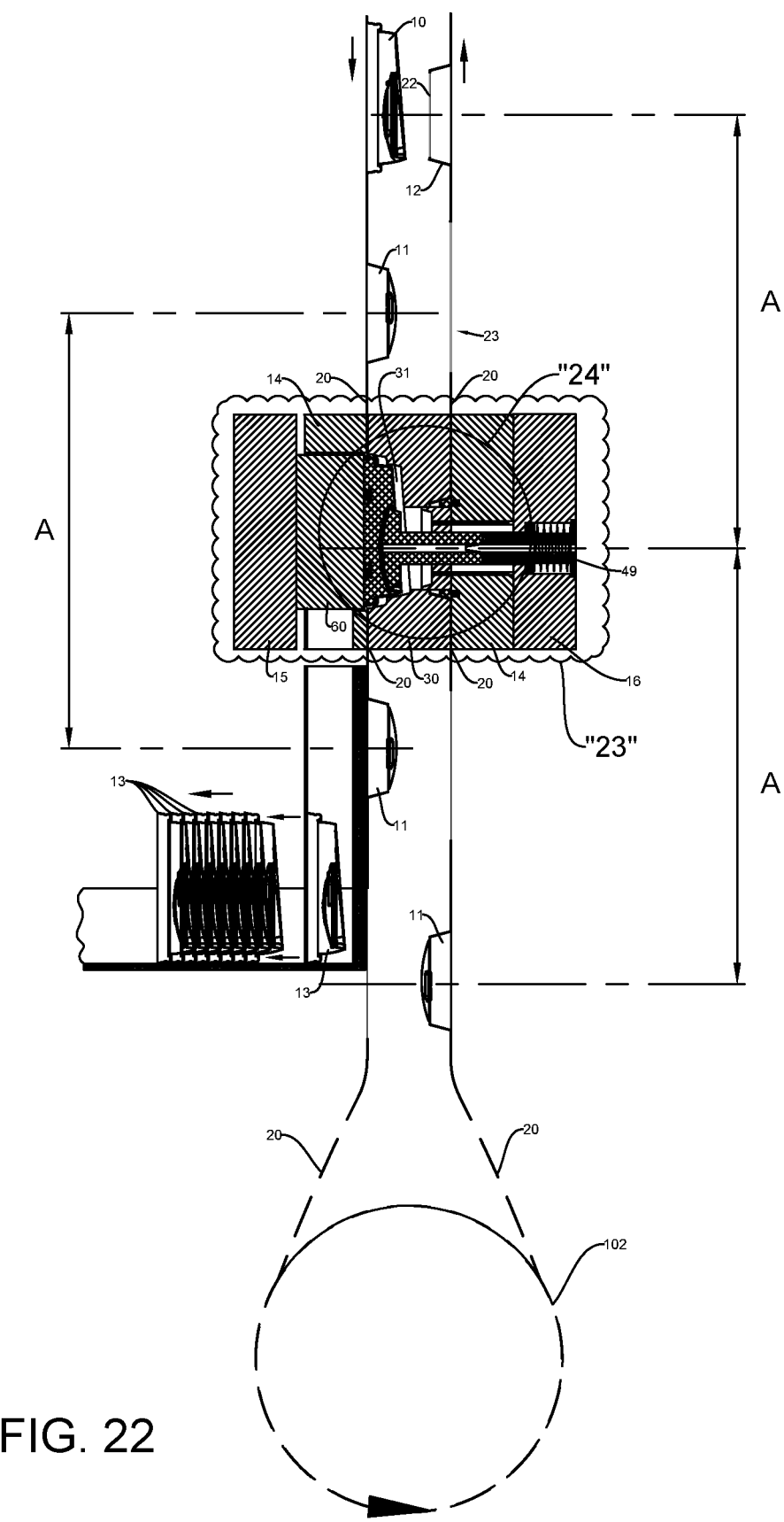

FIG. 22 is a schematic drawing showing a generic fourth production line arrangement with a schematic side view depiction of a generic all-in-one assembly station for punching+trimming+assembling+packaging lower lid bodies and upper lid bodies showing the outer plate being removed from engagement with the first intermediate compactor plate and the outer pin support plate in engagement with the second intermediate compactor plate with the upper lid body having been directed into assembled relation with the lower lid body.

Figure 23:
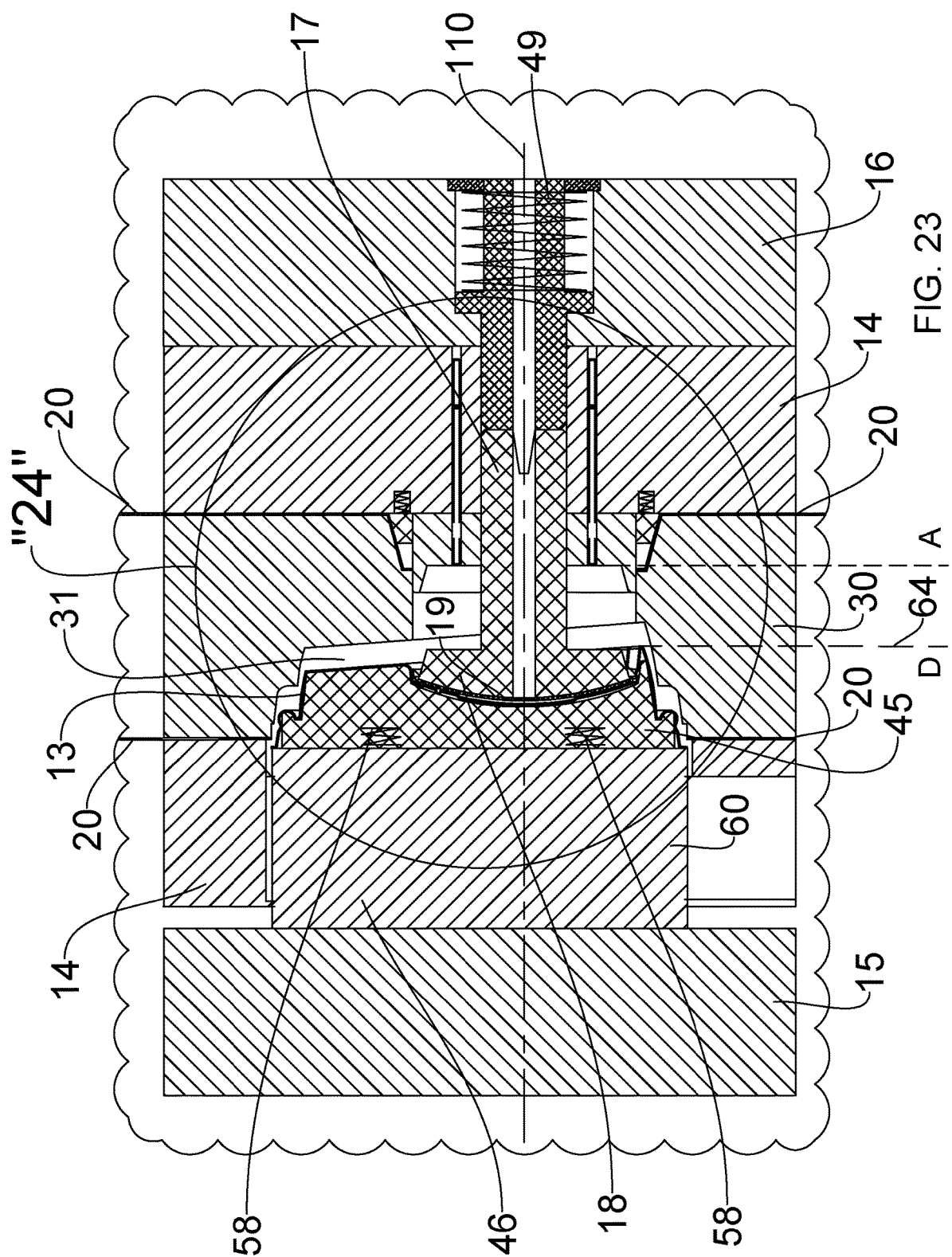

FIG. 23 is an enlarged schematic drawing as enlarged from FIG. 22 to more clearly show from left-to-right an outer plate, a first intermediate compactor plate, a main base plate, a second intermediate compactor plate, and an outer pin support plate mechanism relative to opposed portions of the web being directed therethrough with the outer lid body plate with the outer plate being removed from engagement with the first intermediate compactor plate with the upper lid body having been directed into assembled relation with the lower lid body.

Figure 24A:
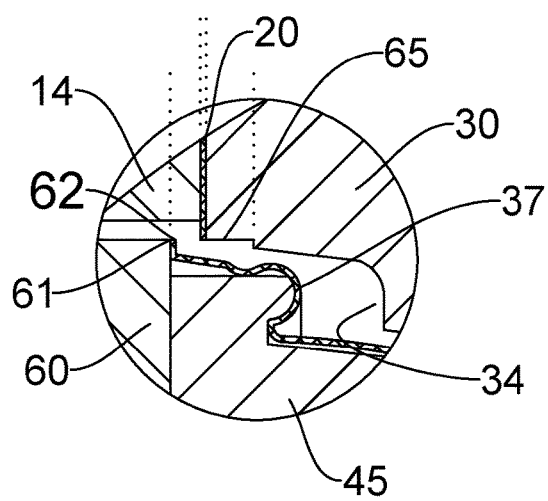
Figure 24:
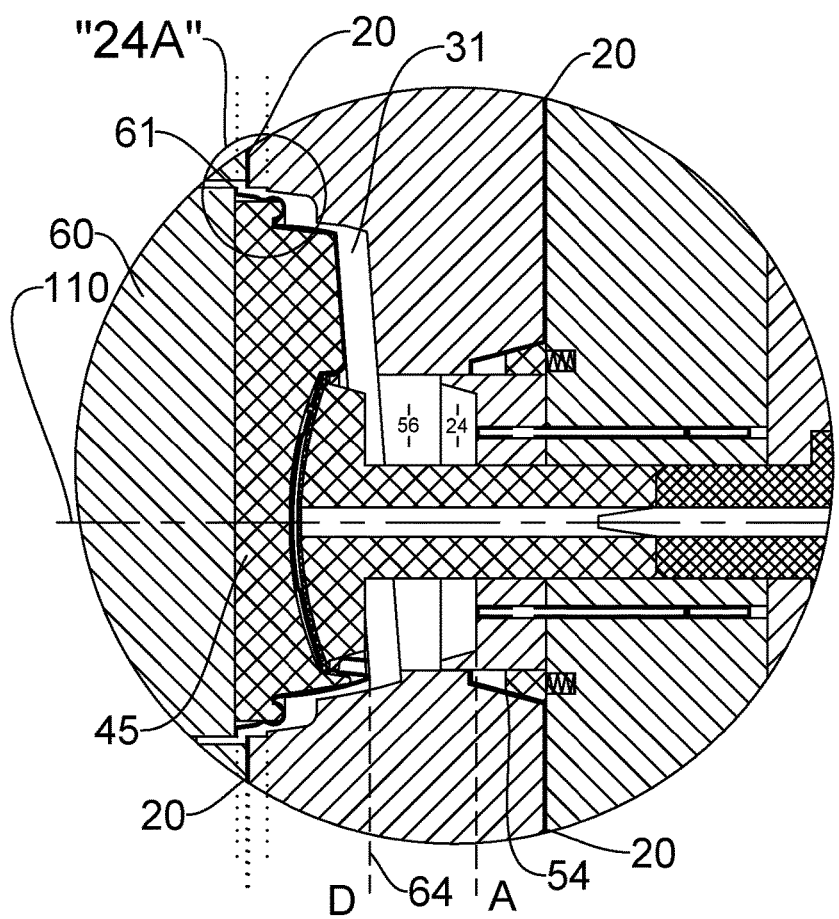

FIG. 24 is an enlarged schematic drawing as enlarged from FIG. 23 to more clearly show from left-to-right an outer plate, a first intermediate compactor plate, a main base plate, a second intermediate compactor plate, and an outer pin support plate mechanism relative to opposed portions of the web being directed therethrough with the outer lid body plate with the outer plate being removed from engagement with the first intermediate compactor plate and the upper lid body having been directed into assembled relation with the lower lid body.

FIG. 24A is an enlarged schematic drawing as enlarged from FIG. 24 to more clearly show the site where the lower lid body punch with assembled lid assembly being removed from the first intermediate compactor plate.

Figure 25:
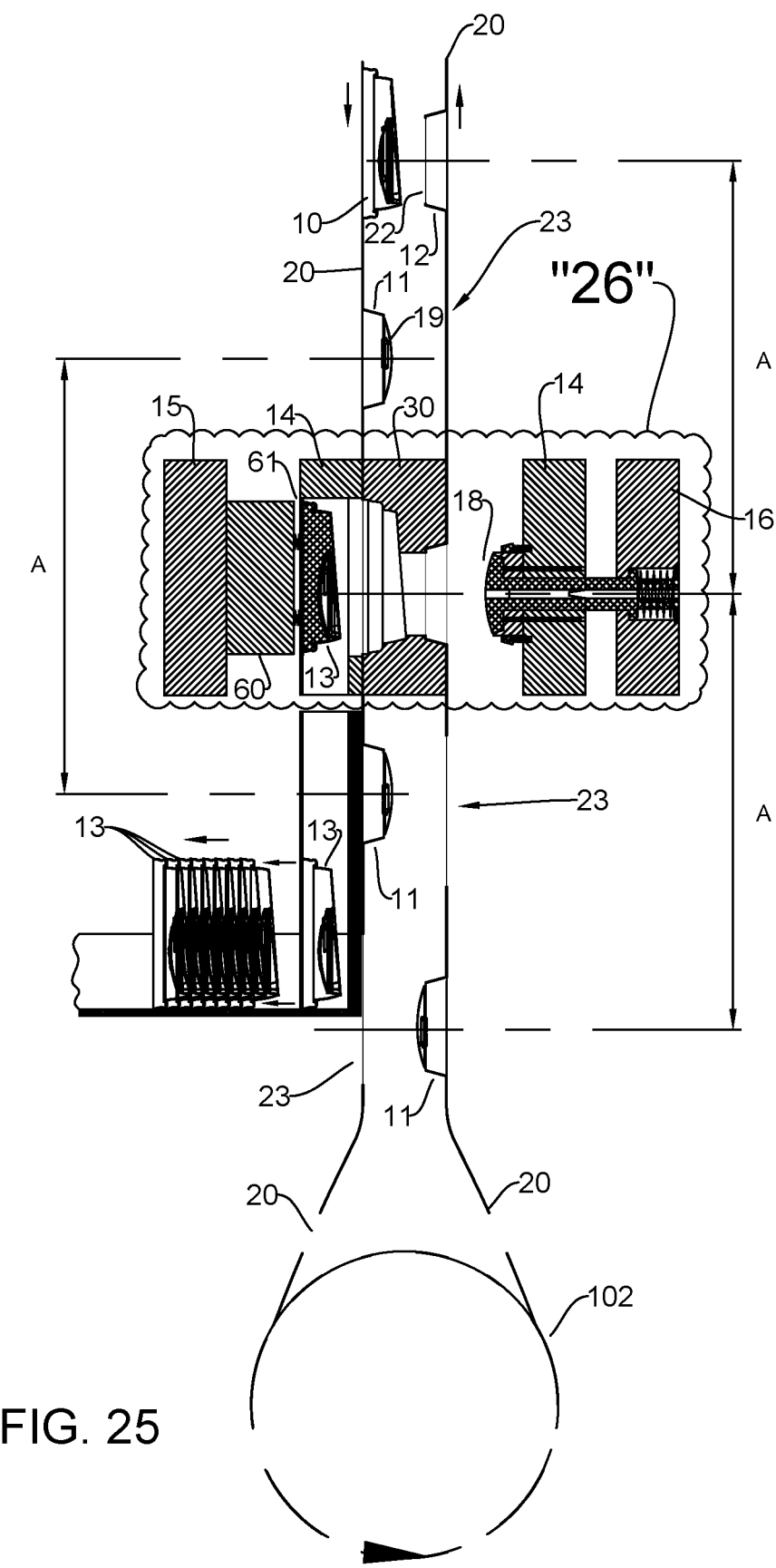

FIG. 25 is a schematic drawing showing a generic fourth production line arrangement with a schematic side view depiction of a generic all-in-one assembly station for punching+trimming+assembling+packaging lower lid bodies and upper lid bodies showing the outer plate being removed from engagement with the first intermediate compactor plate and the outer pin support plate being removed from engagement with the second intermediate compactor plate and the second intermediate compactor plate being removed from engagement with the main base plate with a fully assembled lid assembly being positioned for further direction for stacking with previously assembled lid assemblies.

Figure 26:
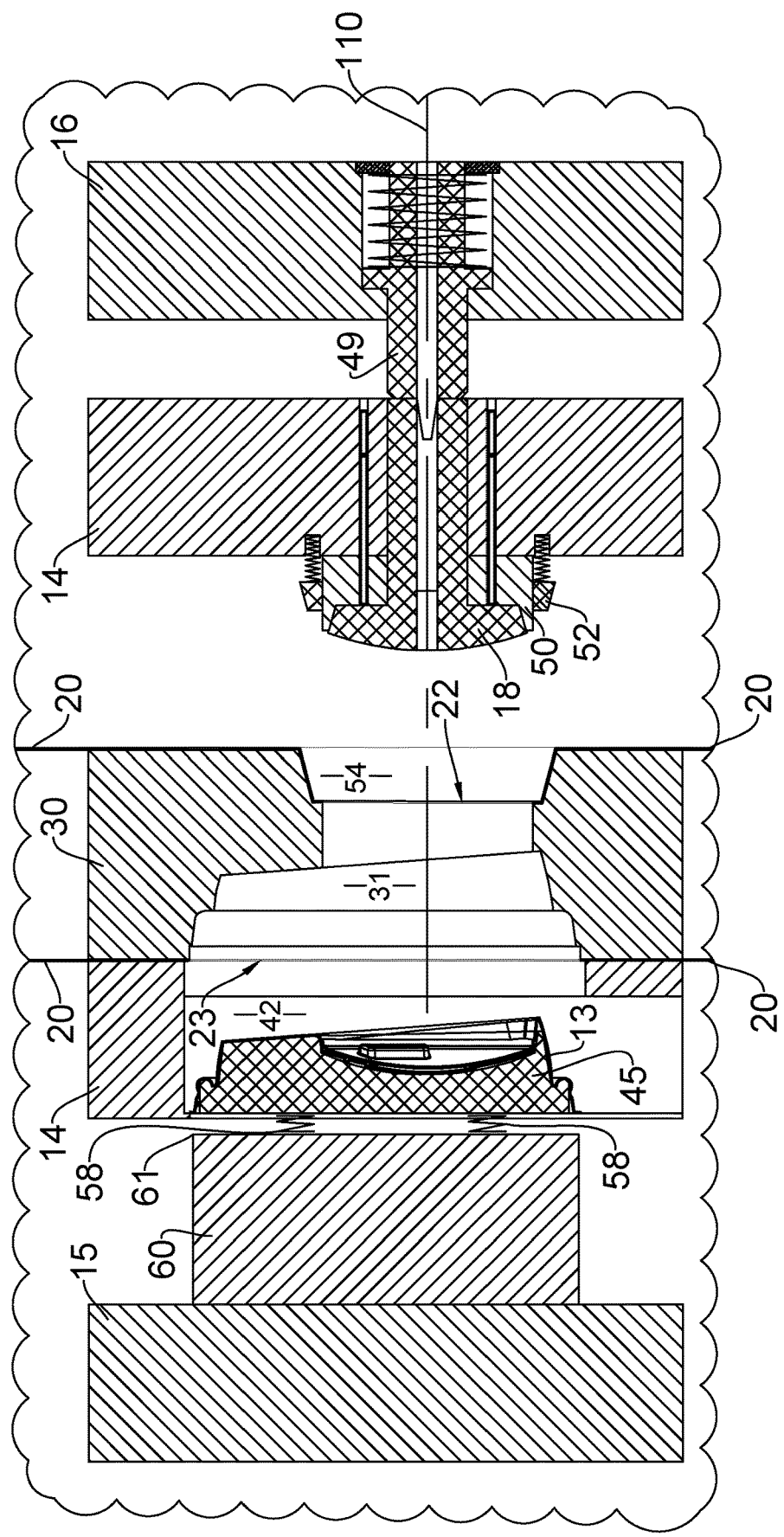

FIG. 26 is an enlarged schematic drawing as enlarged from FIG. 24 to more clearly show the outer plate being removed from engagement with the first intermediate compactor plate and the outer pin support plate being removed from engagement with the second intermediate compactor plate and the second intermediate compactor plate being removed from engagement with the main base plate.

Figure 27:
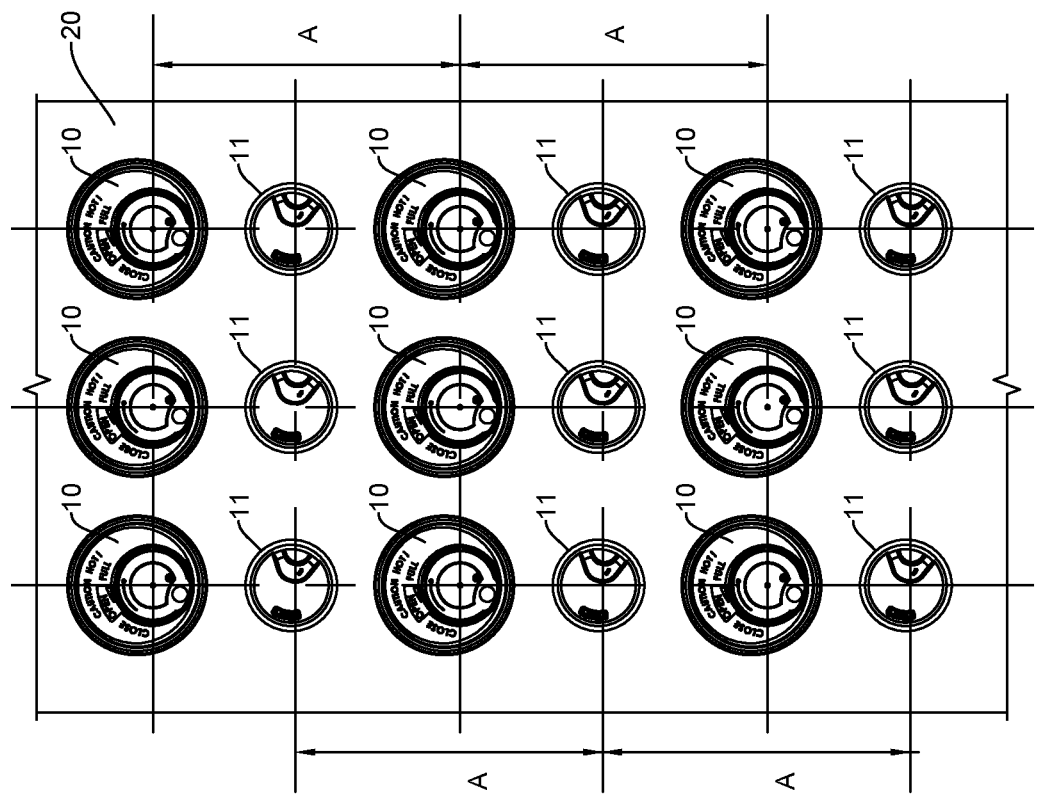

FIG. 27 is a top plan view of a first web layout after lower lid bodies and upper lid bodies are formed via a thermoforming process at a thermoforming station and showing a first alternating lower lid body-upper lid body field presentation and before lower lid bodies and upper lid bodies are die-cut from the web according to the present invention.

Figure 28:
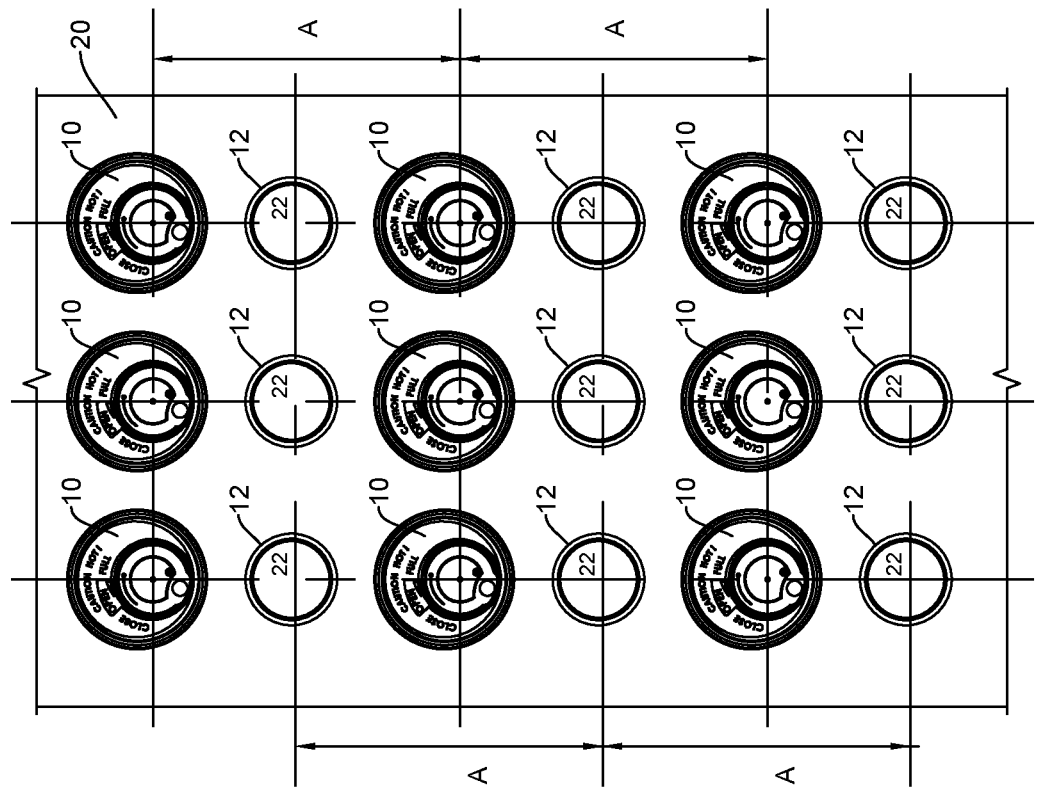

FIG. 28 is a top plan view of a second web layout after upper lid bodies are die-cut from the web showing disk-departed web apertures and before lower lid bodies are die-cut from the web at an assembly station according to the present invention.

Figure 29:
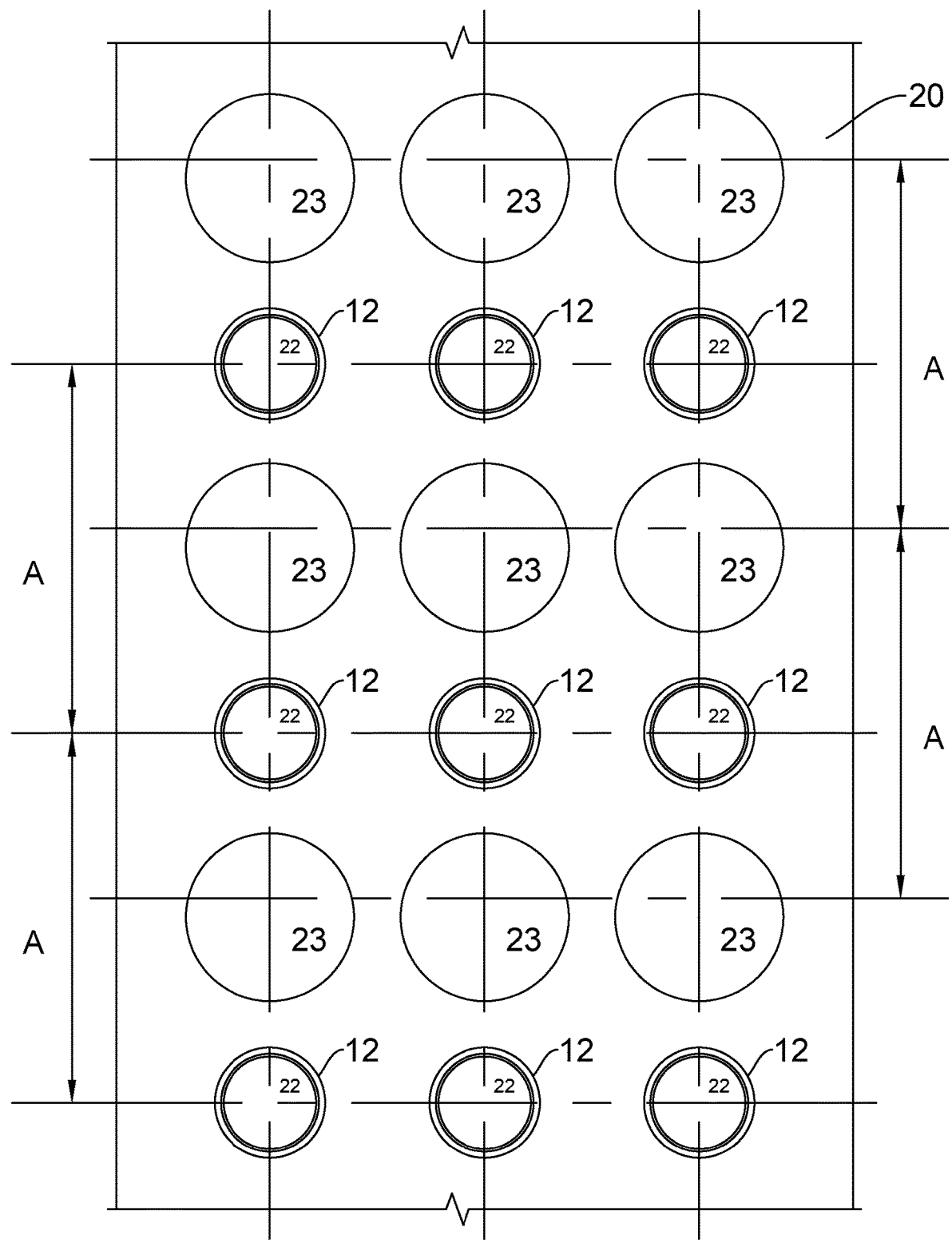

FIG. 29 is a top plan view of a third web layout after lower lid bodies and upper lid bodies are die-cut from the web showing both disk-departed web apertures and lower lid body-departed apertures in a first alternating aperture field presentation according to the present invention.

FIG. 30 is a top plan view of a fourth web layout after lower lid bodies and upper lid bodies are formed via a thermoforming process at a thermoforming station and showing a second alternating lower lid body-upper lid body field presentation before lower lid bodies and upper lid bodies are die-cut from the web according to the present invention.

FIG. 31 is a top plan view of a fifth web layout after lower lid bodies are die-cut from the web showing lower lid body-departed apertures and before upper lid bodies are die-cut from the web at an assembly station according to the present invention.

Figure 32:
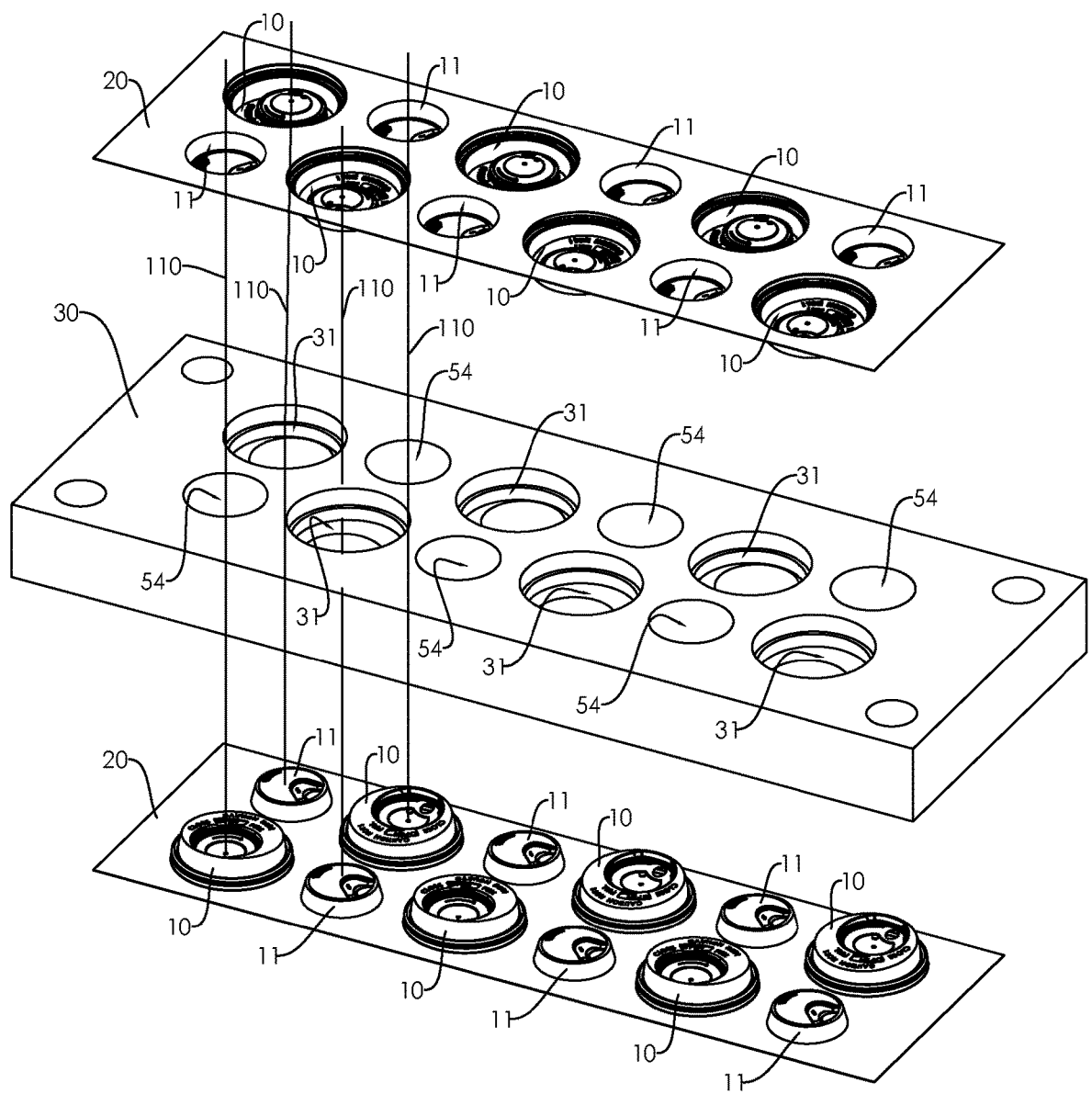

FIG. 32 is a top perspective view of a fragmentary main base plate and fragmentary upper and lower web portions in exploded relation to one another depicting alternating lower lid body and upper lid body forms in the upper and lower web portions for receipt in the main base plate and in axial alignment.

Figure 32A:
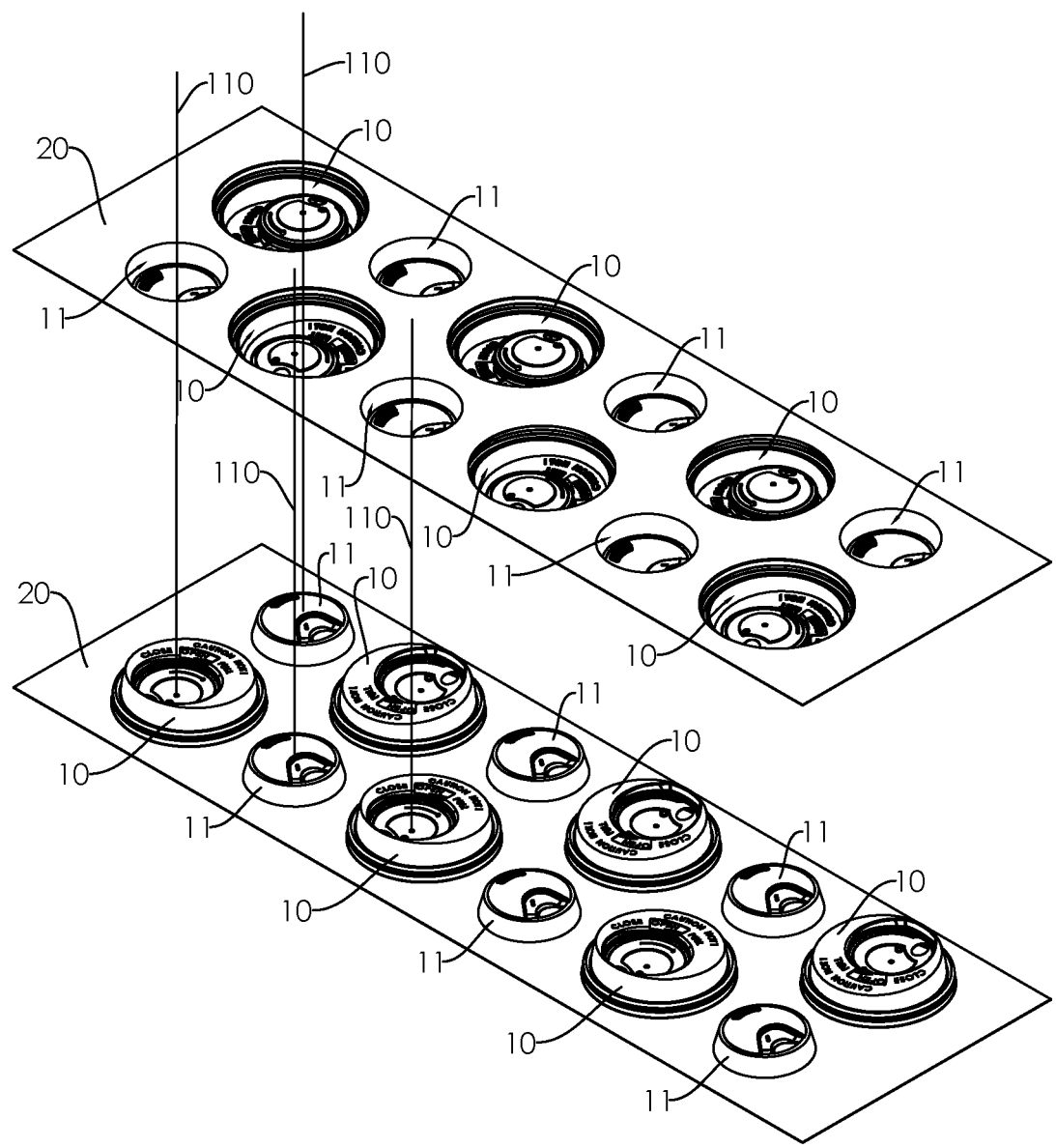

FIG. 32A is a top perspective view of fragmentary upper and lower web portions in exploded relation to one another depicting alternating lower lid body and upper lid body forms in the upper and lower web portions in axial alignment.

Figure 33:
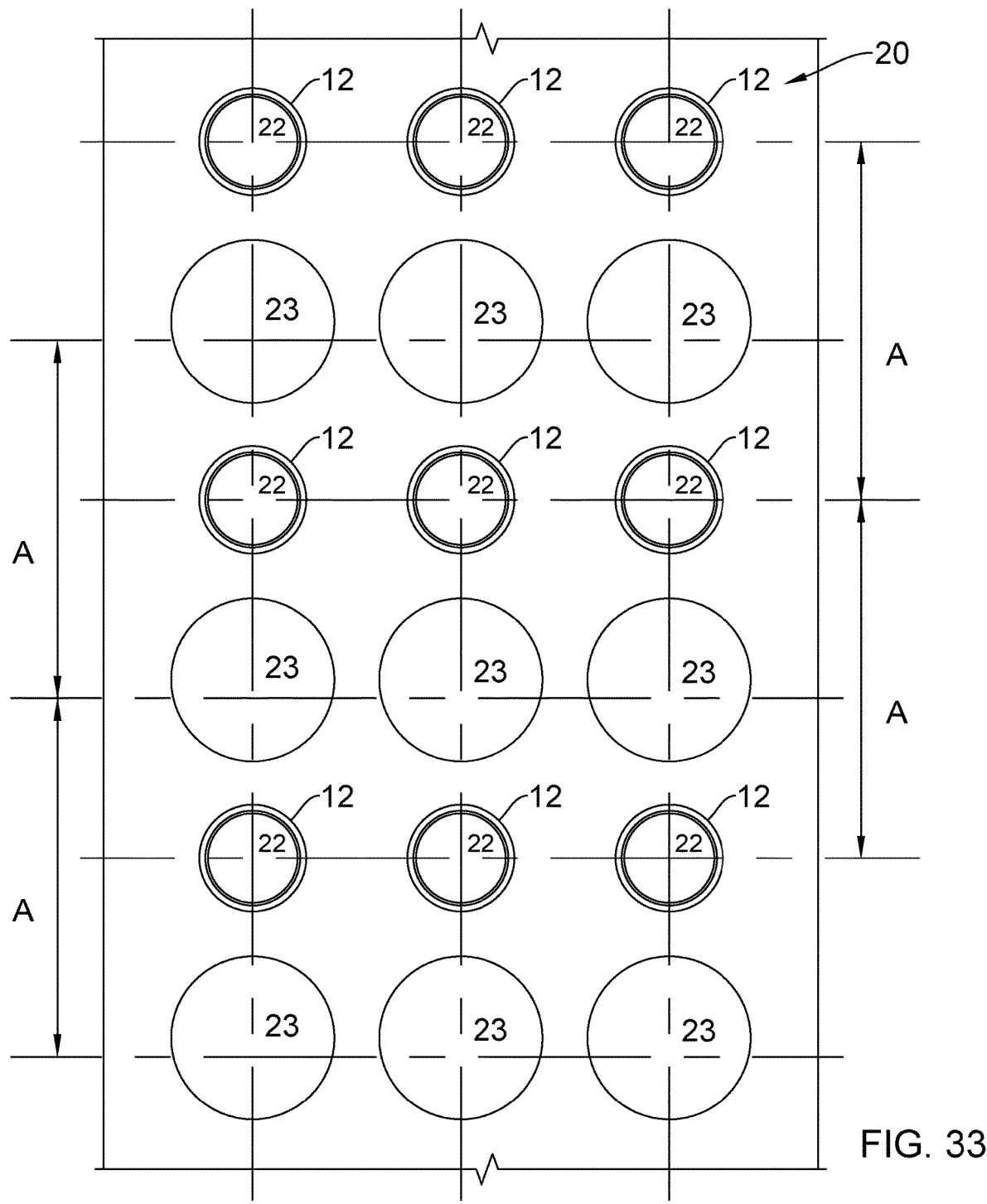

FIG. 33 is a top plan view of a sixth web layout after lower lid bodies and upper lid bodies are die-cut from the web showing both disk-departed web apertures and lower lid body-departed apertures in a second alternating aperture field presentation according to the present invention.

Figure 34:
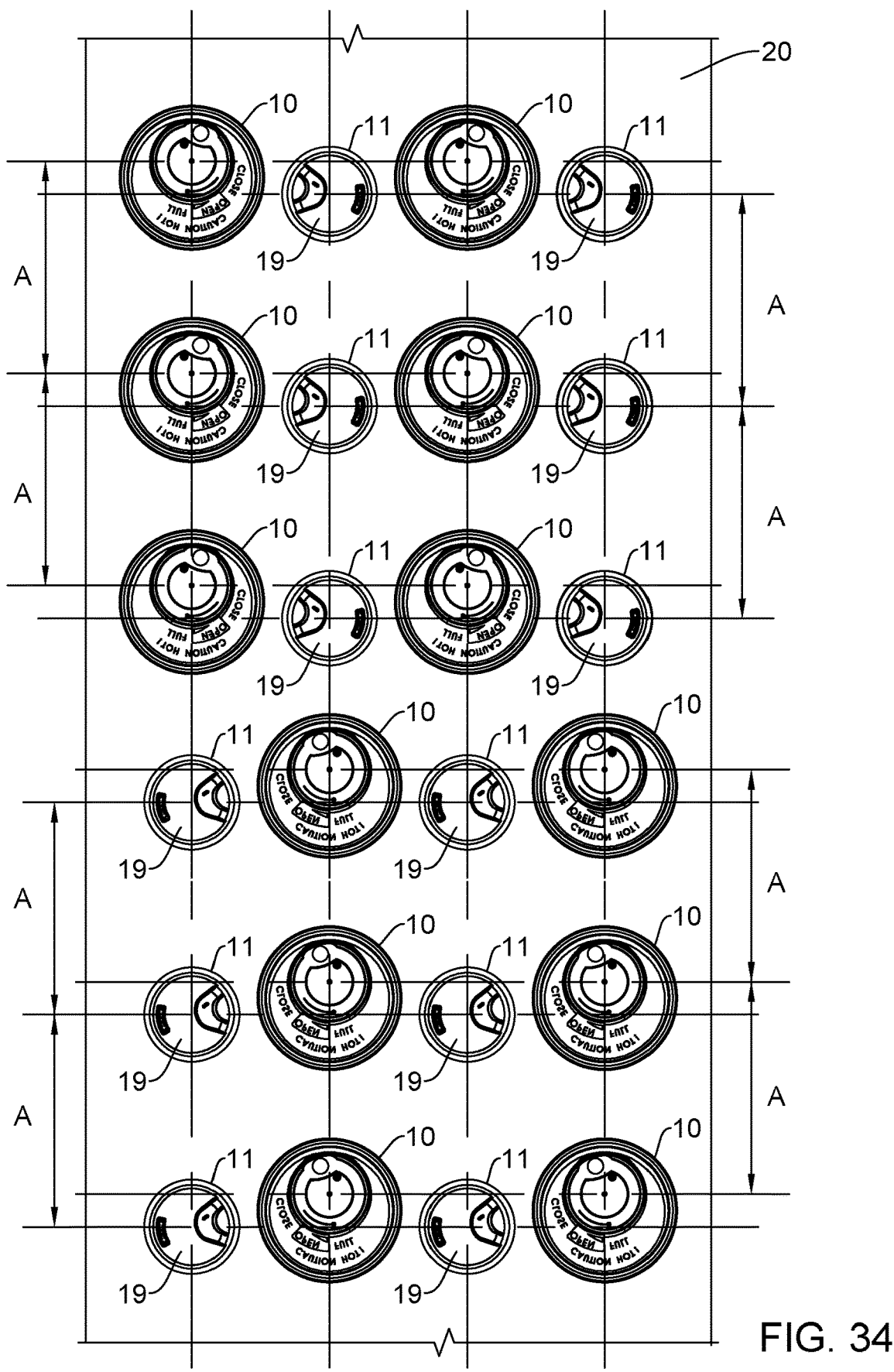

FIG. 34 is a top plan view of a seventh web layout after lower lid bodies and upper lid bodies are formed via a thermoforming process at a thermoforming station and before lower lid bodies and upper lid bodies are die-cut from the web in a third alternating lower lid body-upper lid body field presentation according to the present invention.

Figure 35:
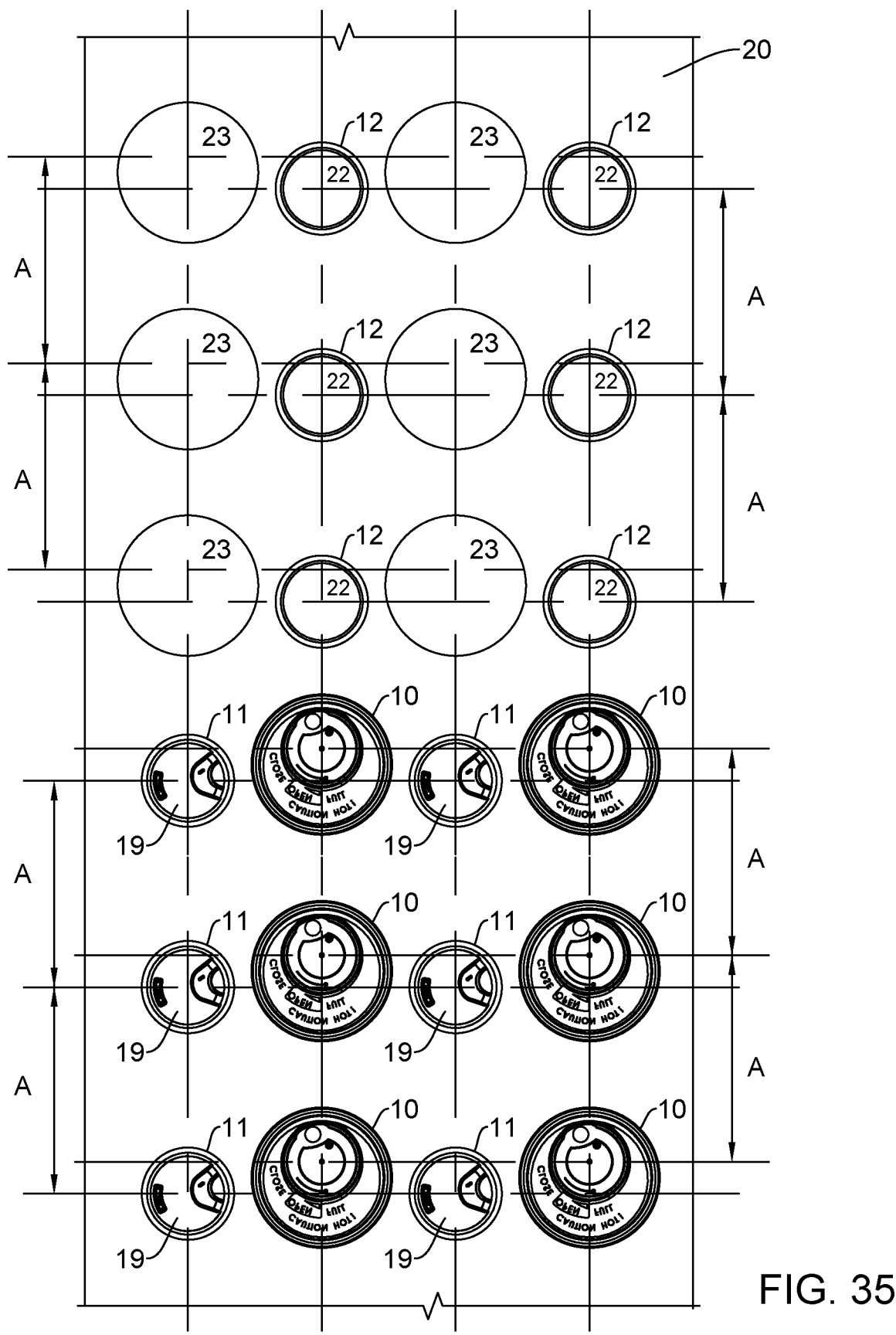

FIG. 35 is a top plan view of an eighth web layout after a first section of two sections of lower lid bodies and upper lid bodies are die-cut from the web and before a second section of two sections of lower lid bodies and upper lid bodies are die-cut from the web in the third alternating lower lid body-upper lid body field presentation according to the present invention.

Figure 36:
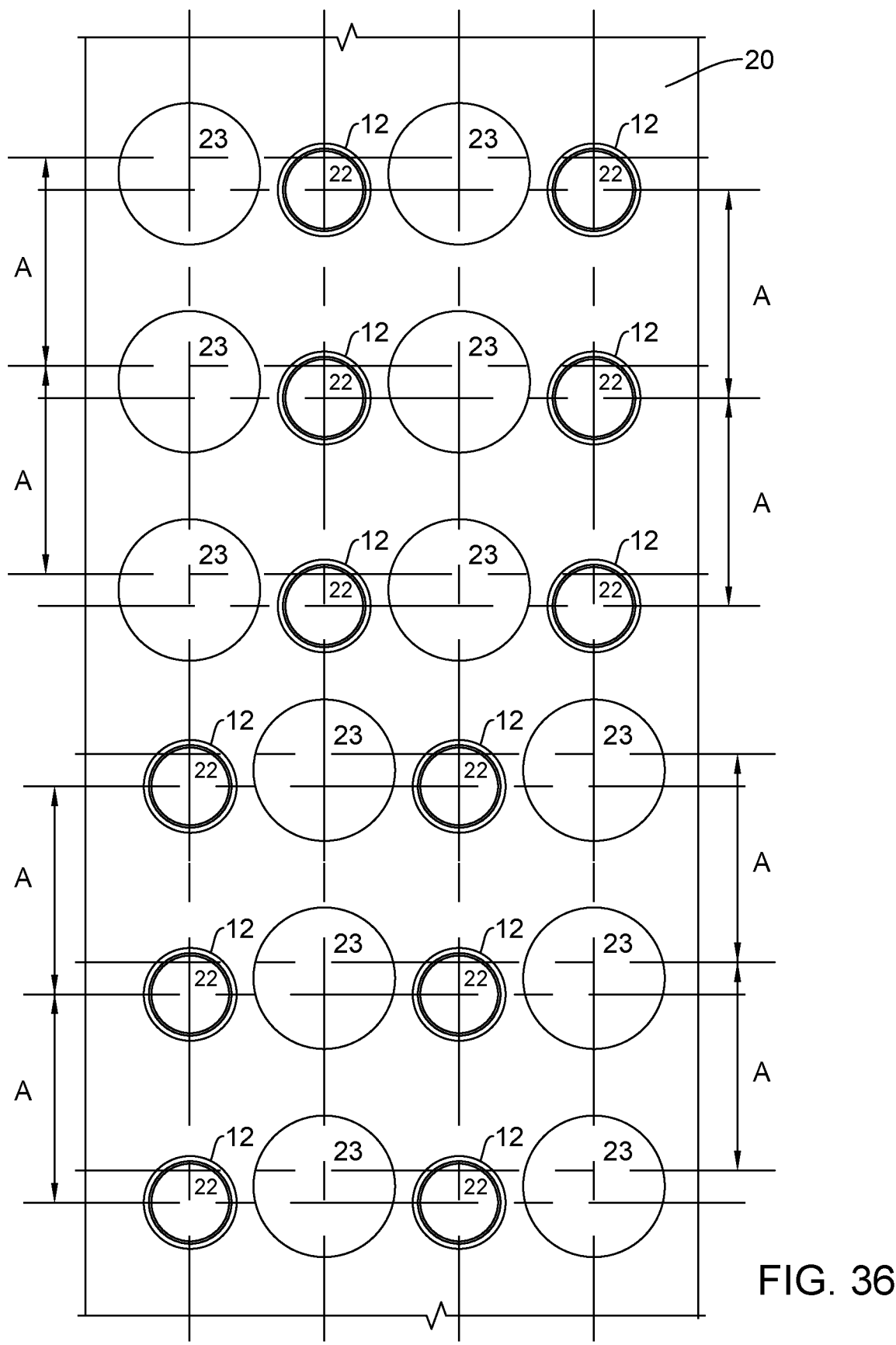

FIG. 36 is a top plan view of a ninth web layout after first and second sections of two sections of lower lid bodies and upper lid bodies are die-cut from the web in a third alternating aperture field presentation according to the present invention.

Figure 37:
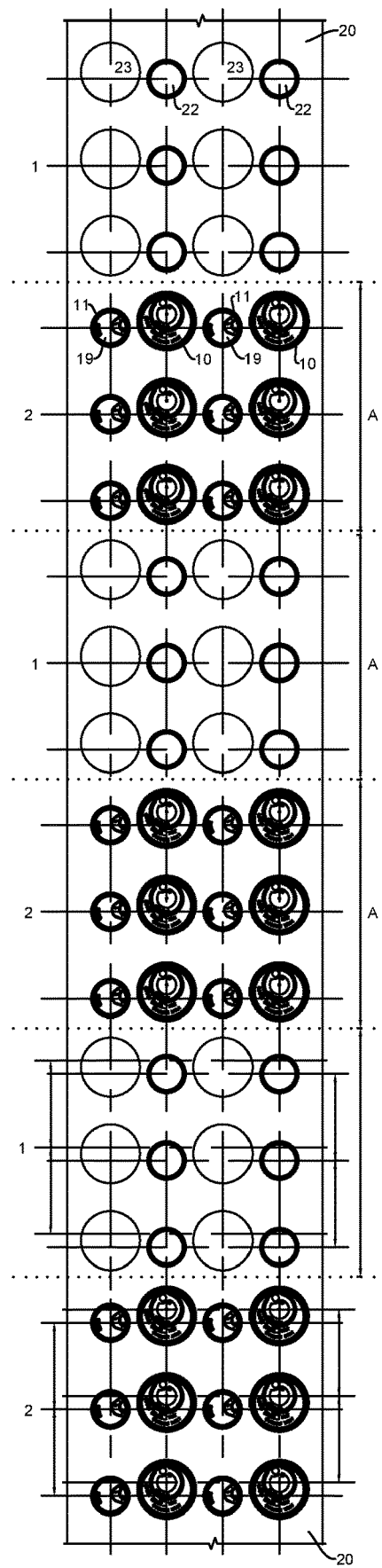

FIG. 37 is a top plan view of the eighth web layout extended to show three sets of two sections, each set showing a first of two sections of lower lid bodies and upper lid bodies die-cut from the web and before a second of two sections of lower lid bodies and upper lid bodies are die-cut from the web in the third alternating lower lid body-upper lid body field presentation according to the present invention.

Figure 38:
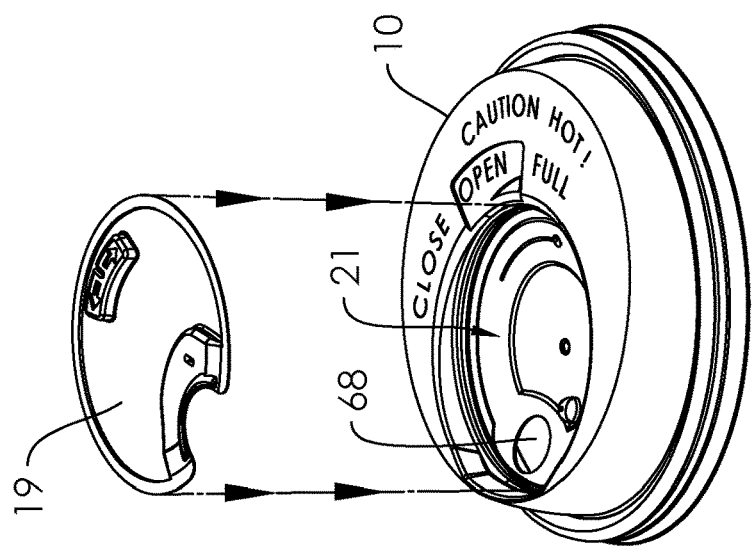

FIG. 38 is a first exploded top perspective view of a lid assembly formed according to the lid assembly methodology of the present invention showing an upper lid body or disk in exploded relation relative to a lower lid body or primary lid formation.

Figure 39:
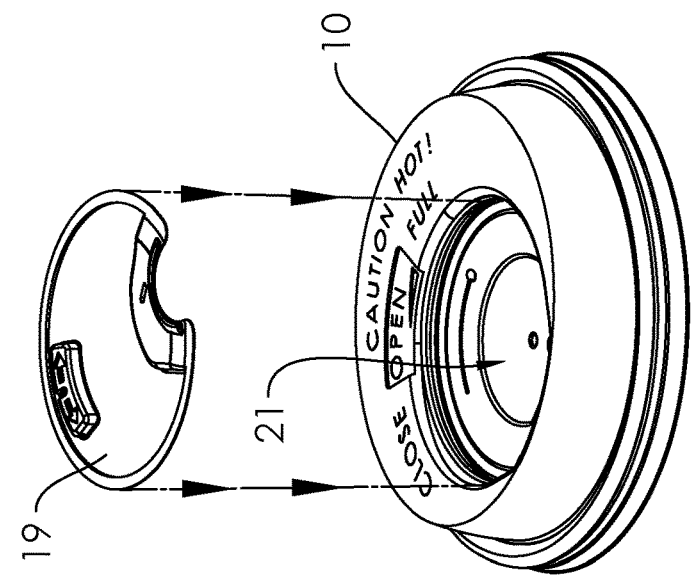

FIG. 39 is a second exploded top perspective view of a lid assembly formed according to the lid assembly methodology of the present invention showing an upper lid body or disk in exploded relation relative to a lower lid body or primary lid formation.

Figure 40:
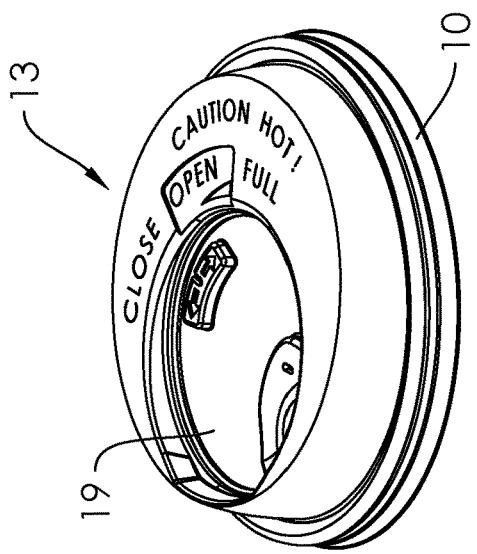

FIG. 40 is a top perspective view of a lid assembly formed according to the lid assembly methodology of the present invention showing an upper lid body or disk in assembled relation relative to a lower lid body or primary lid formation.

Figure 41:
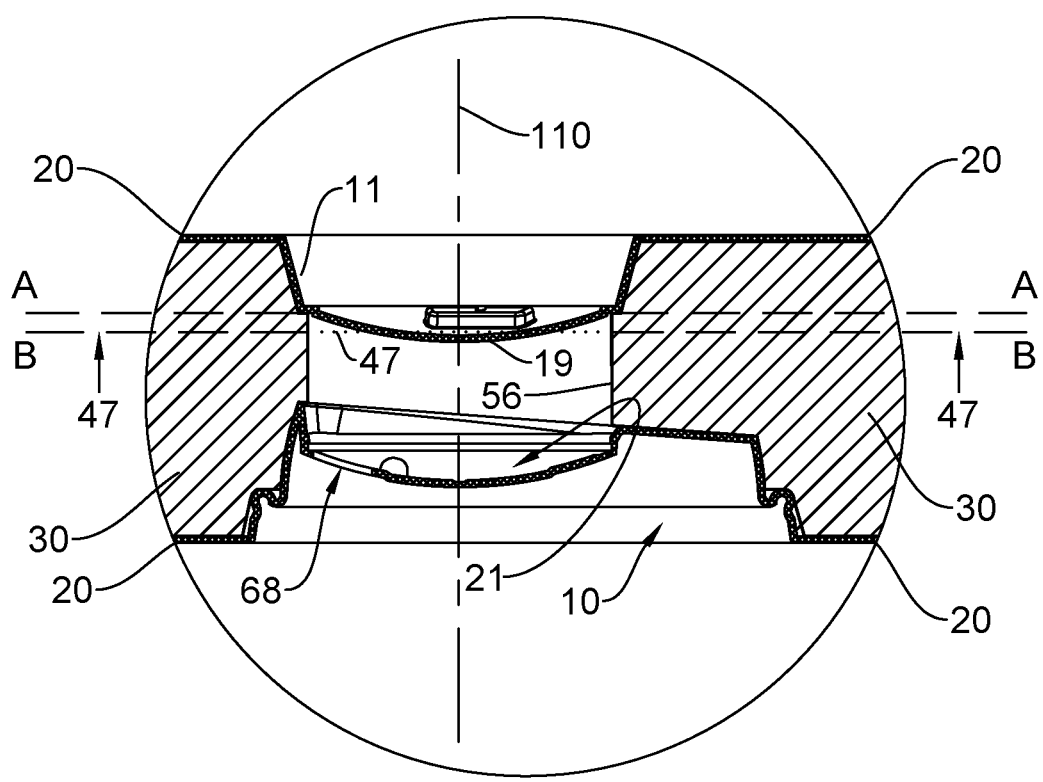

FIG. 41 is a first sequential enlarged schematic drawing showing in greater detail a web-attached lower lid body in axial alignment with a web-attached, support cone carrier element-supported upper lid body being positioned at the main base plate assembly site.

Figure 42:
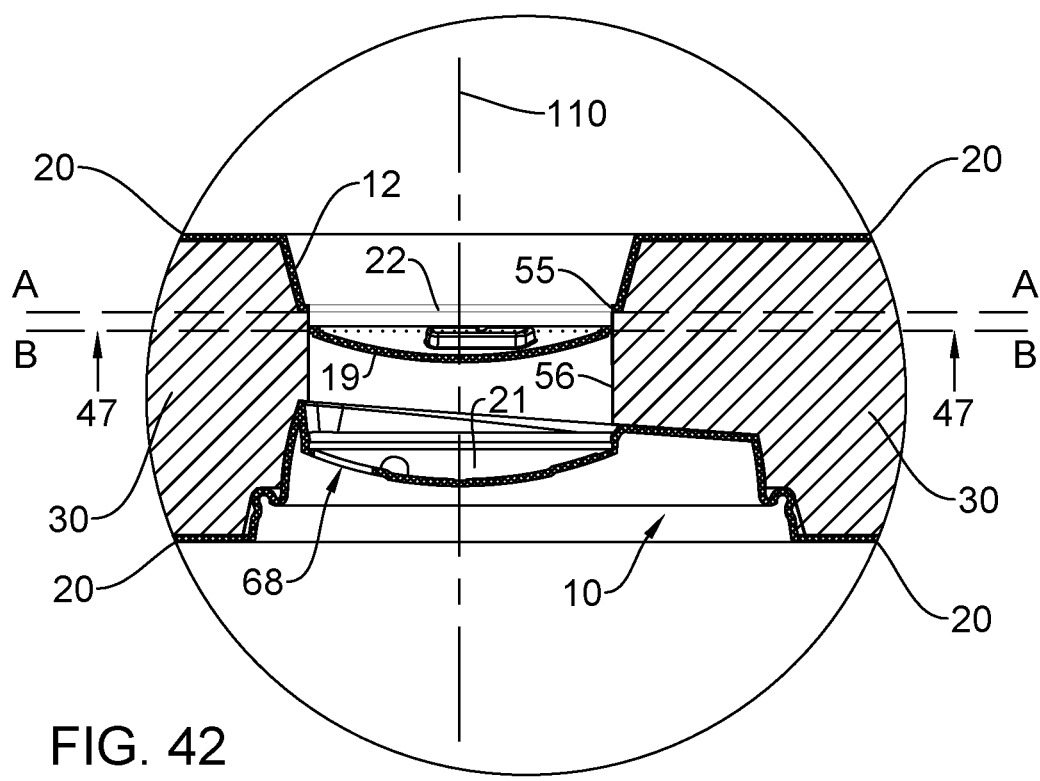

FIG. 42 is a second sequential enlarged schematic drawing showing in greater detail a web-attached lower lid body in axial alignment with a post-cut, web-attached, support cone carrier element with upper lid body removed therefrom and positioned at the main base plate assembly site.

Figure 43:
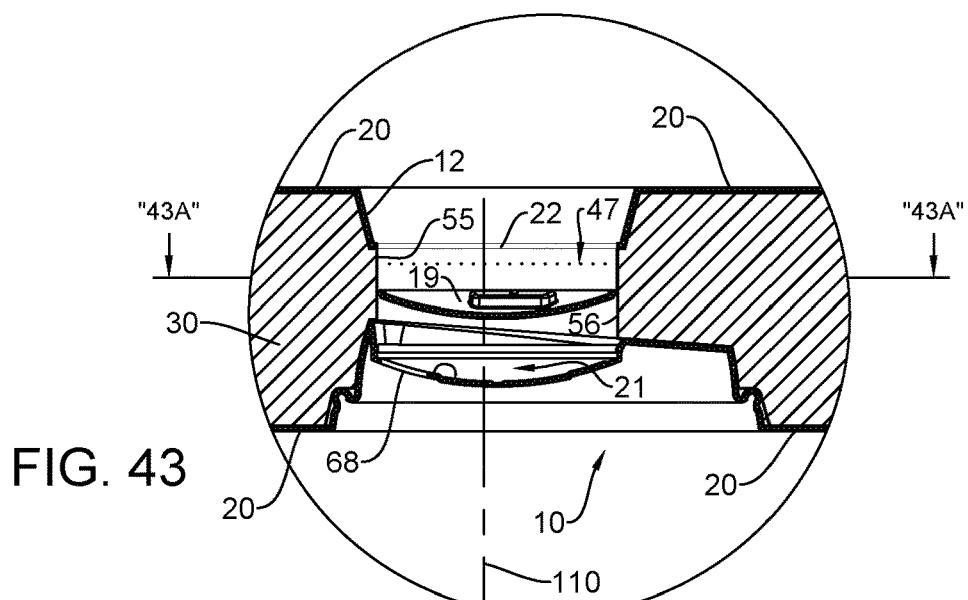

FIG. 43 is a third sequential enlarged schematic drawing showing in greater detail a web-attached lower lid body in axial alignment with a post-cut, web-attached, support cone carrier element with upper lid body removed therefrom and being directed into engagement with the lower lid body at the main base plate assembly site.

Figure 43B:
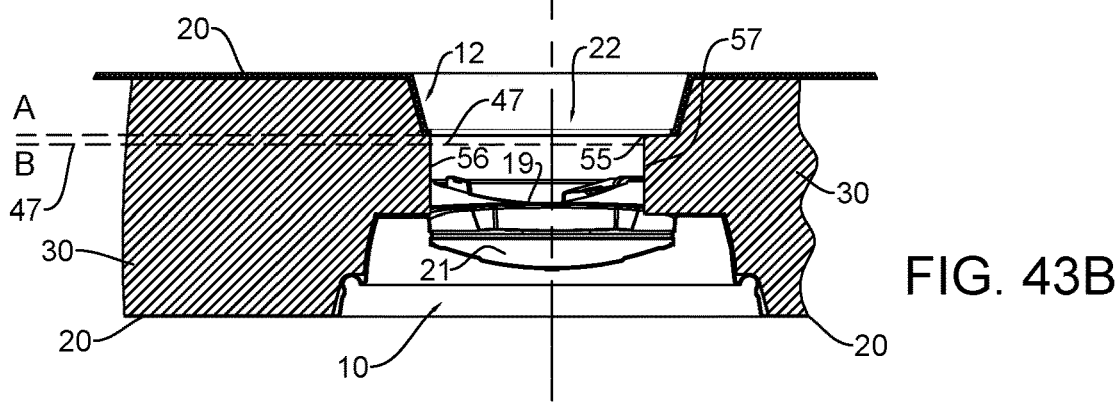
Figure 43A:
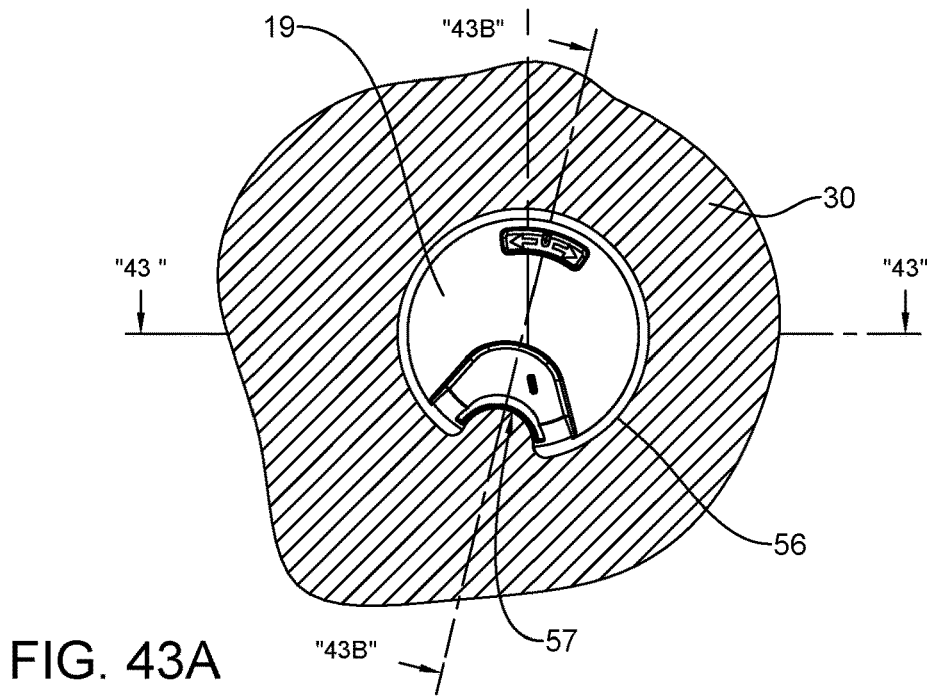

FIG. 43A is a cross-sectional view parallel to the plane of the main base plate showing the upper lid body positioned within the disk-guiding shaft of the main base plate as sectioned from FIG. 43.

FIG. 43B is a cross-sectional view orthogonal to the plane of the main base plate as sectioned from FIG. 43A.

FIG. 44 is a reduced cross-sectional view orthogonal to the plane of the main base plate depicting alternative methodology according to the present invention whereby a series of upper lid bodies or disks are positioned within the disk-guiding shaft of the main base plate for sequential insertion into lower lid bodies.

FIG. 44A is a cross-sectional view parallel to the plane of the main base plate showing the upper lid body positioned within the disk-guiding shaft of the main base plate as sectioned from FIG. 44 to depict a disk-feeding mechanism for feeding the series of upper lid bodies or disks positioned within the disk-guiding shaft into lower lid bodies.

Figure 44B:
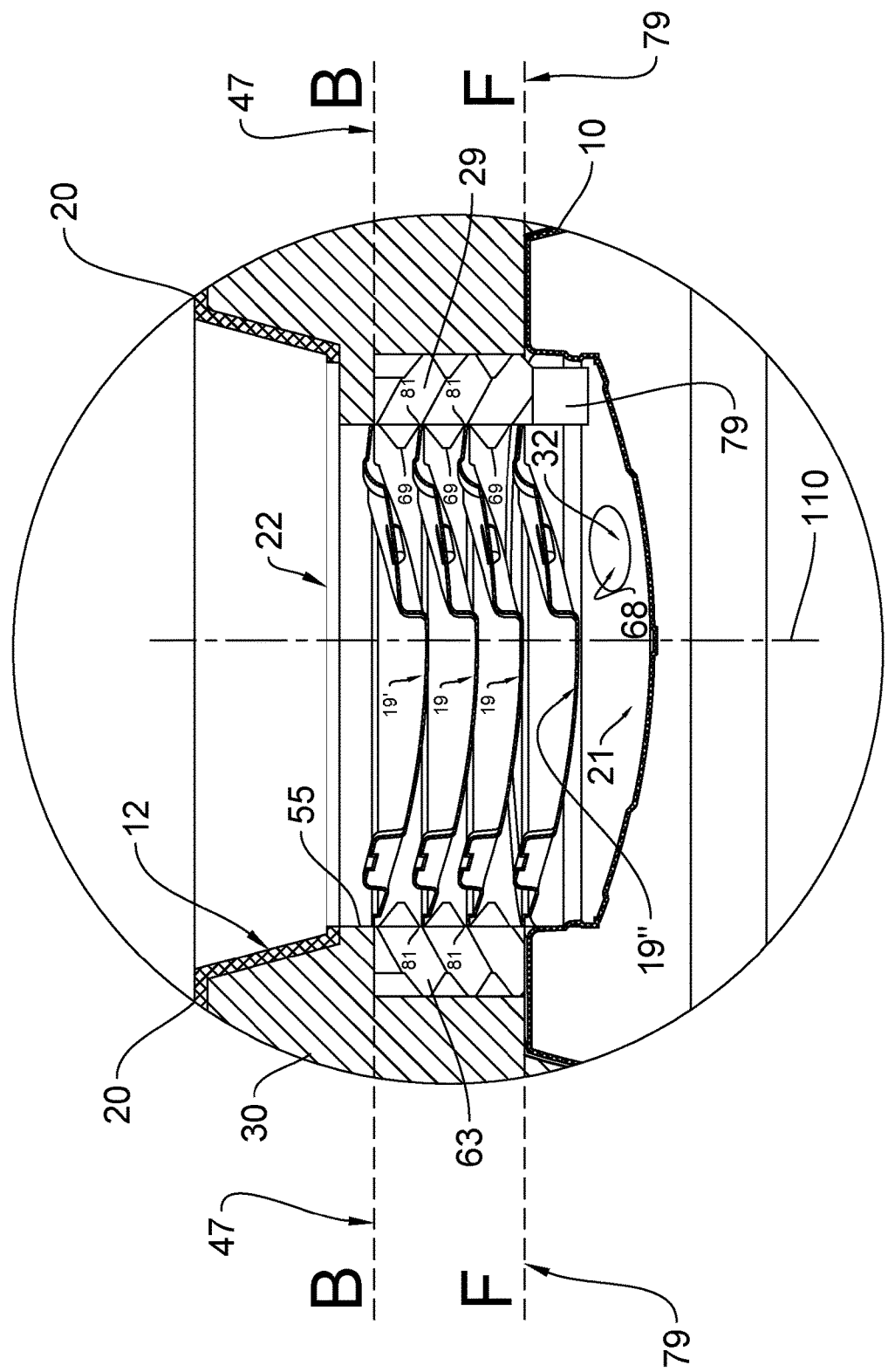

FIG. 44B is a second enlarged cross-sectional view orthogonal to the plane of the main base plate as enlarged from FIG. 44 depicting alternative methodology according to the present invention whereby a series of upper lid bodies or disks positioned within the disk-guiding shaft of the main base plate for sequential insertion into lower lid bodies.

Figure 45:
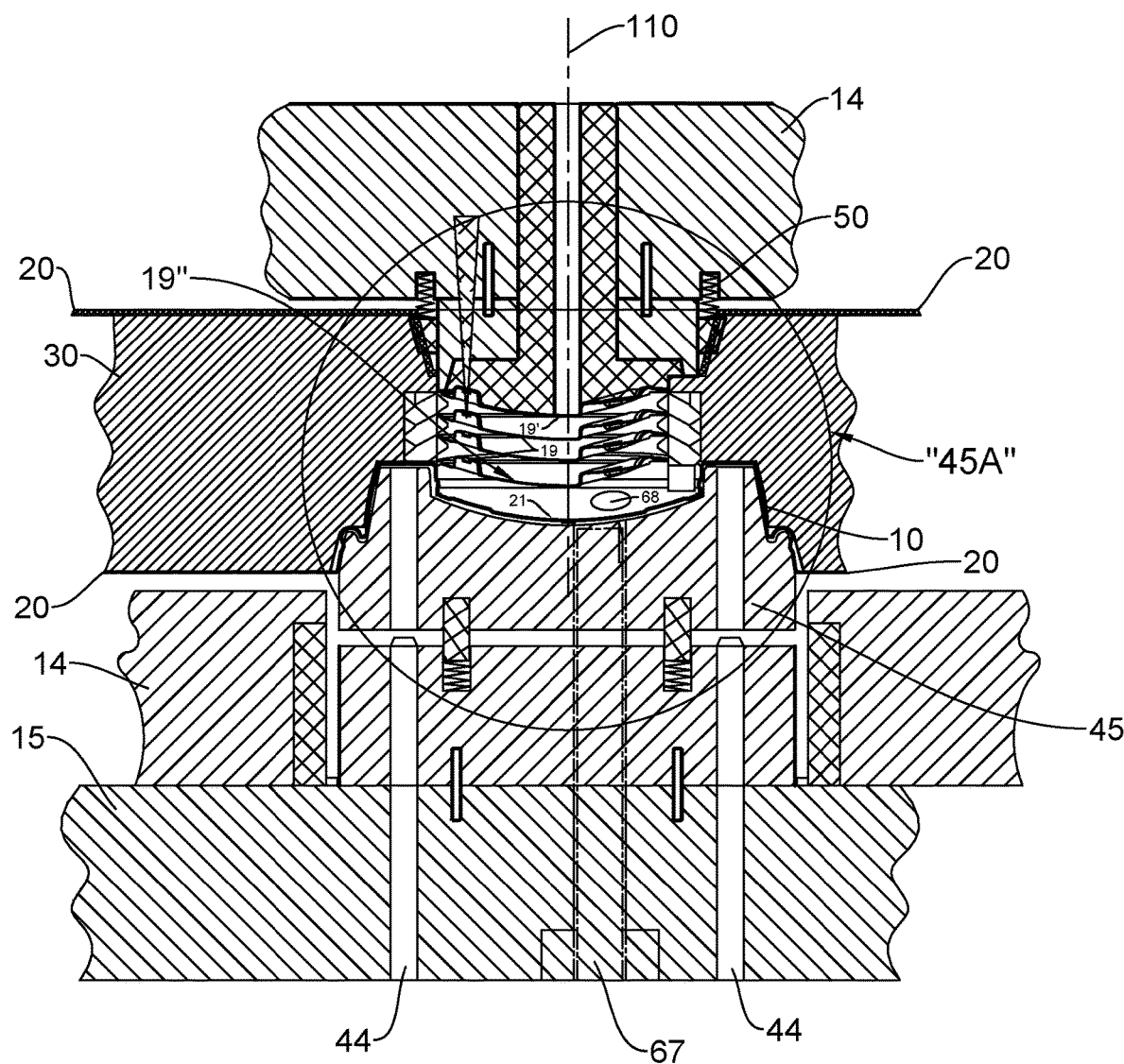

FIG. 45 is a cross-sectional view orthogonal to the plane of the first intermediate compactor plate, the main base plate, the second intermediate compactor plate, and the outer plate depicting alternative methodology whereby a series of upper lid bodies or disks are positioned within the disk-guiding shaft of the main base plate for sequential insertion into lower lid bodies and the first and second intermediate compactor plates are in engagement with the main base plate.

Figure 45A:
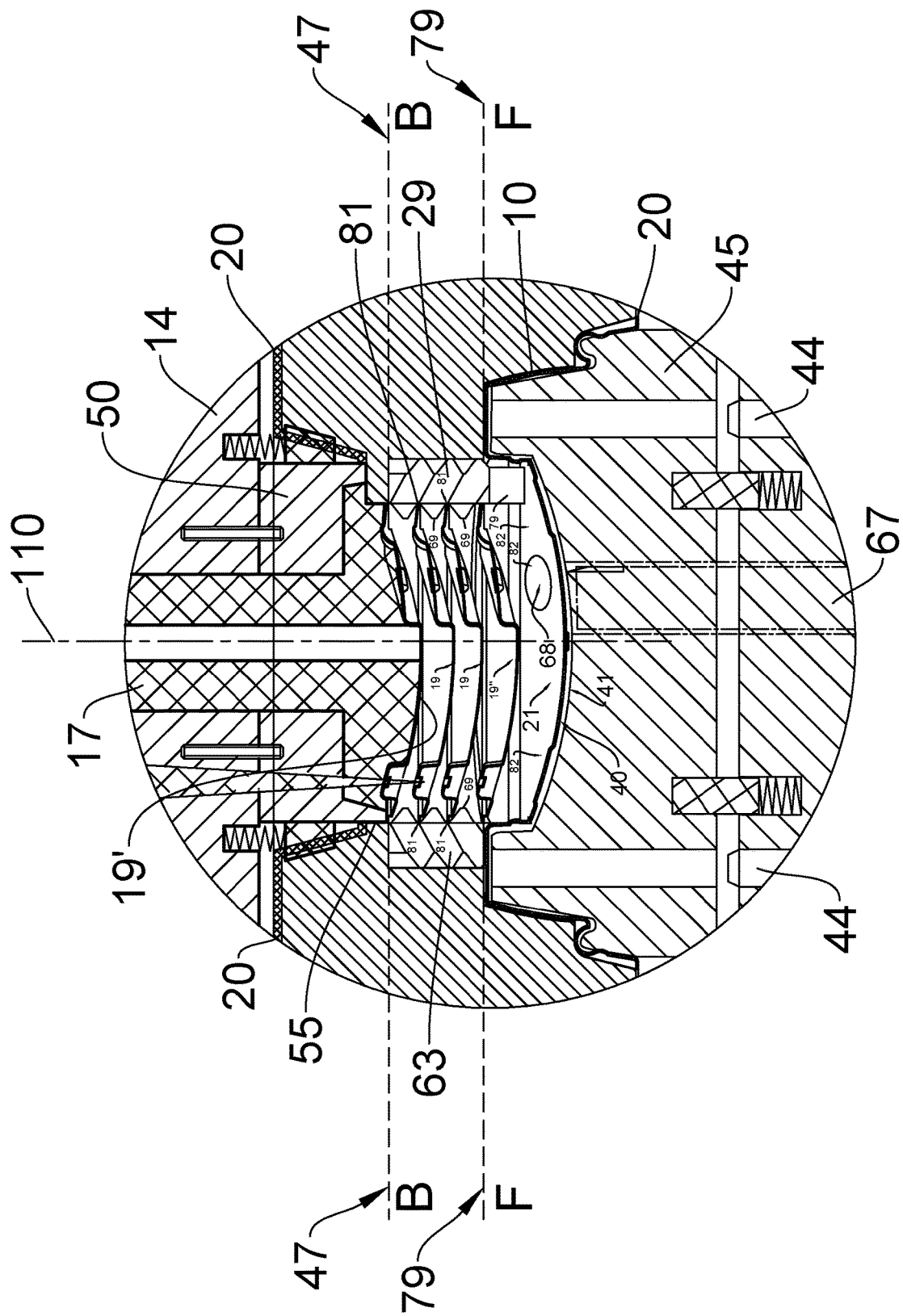

FIG. 45A is an enlarged cross-sectional view orthogonal to the plane of the main base plate as enlarged from FIG. 45 to depict in greater clarity the structures otherwise depicted in FIG. 45.

Figure 46:
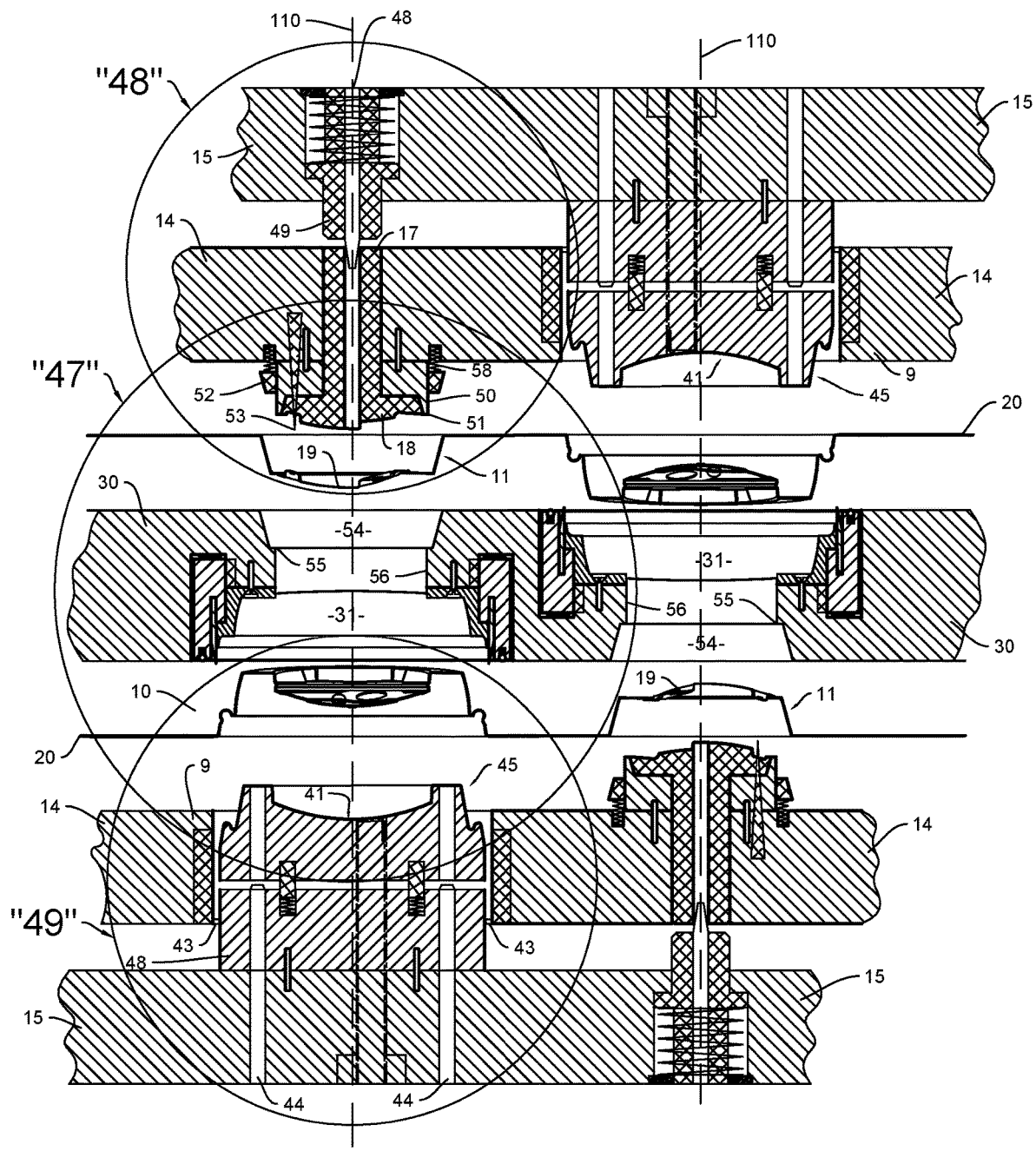

FIG. 46 is a cross-sectional view orthogonal to the plane of the main base plate depicting a staggered arrangement of lower lid bodies and upper lid bodies on the web in a pre-assembly position with axially aligned lower lid bodies and upper lid bodies in side-by-side relation, and the outer plates in partial engagement with the first and second intermediate compactor plates.

Figure 47:
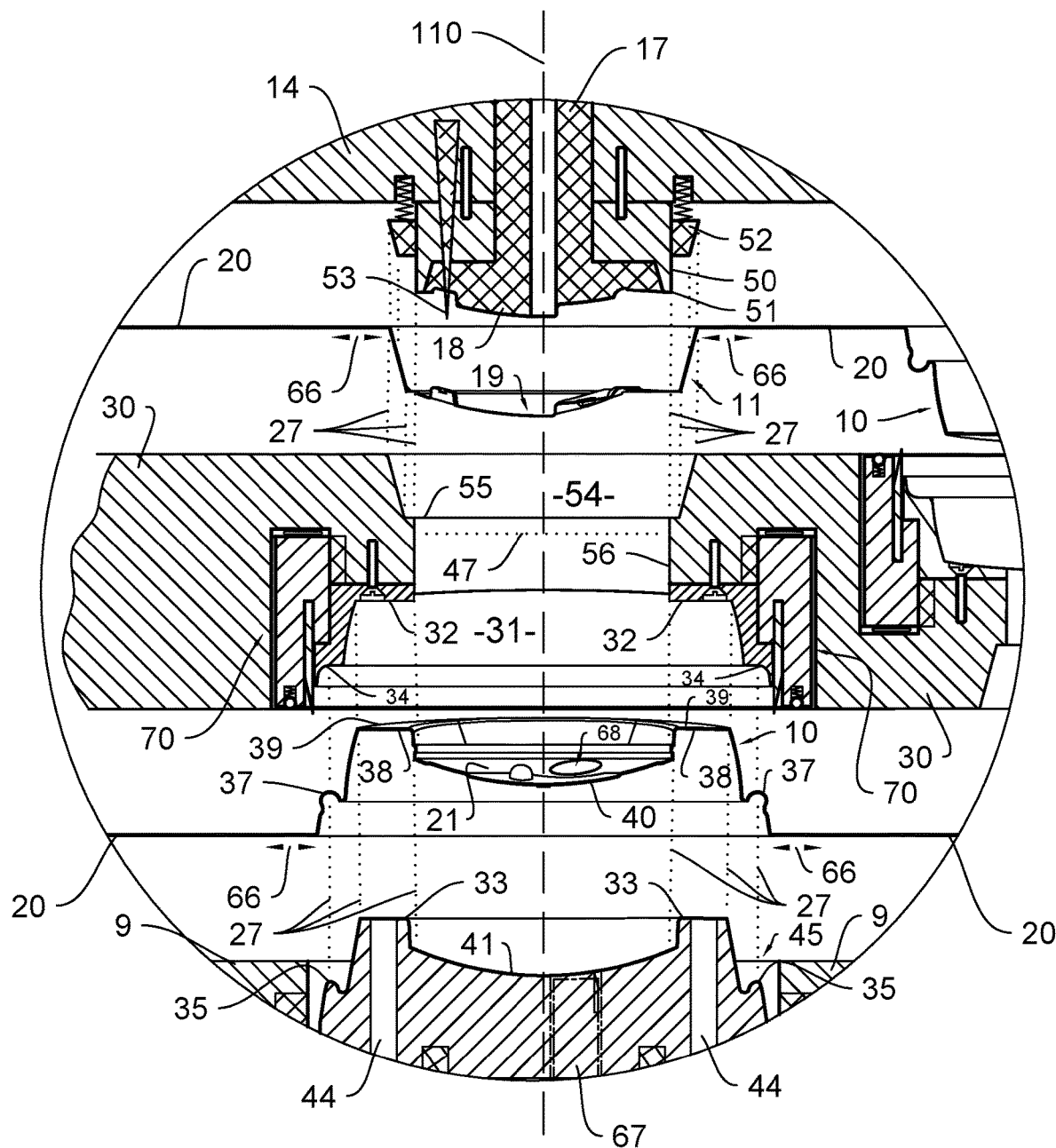

FIG. 47 is an enlarged cross-sectional view as enlarged from FIG. 46 to show in greater clarity the structures associated with the main base plate otherwise depicted in FIG. 46.

Figure 48:
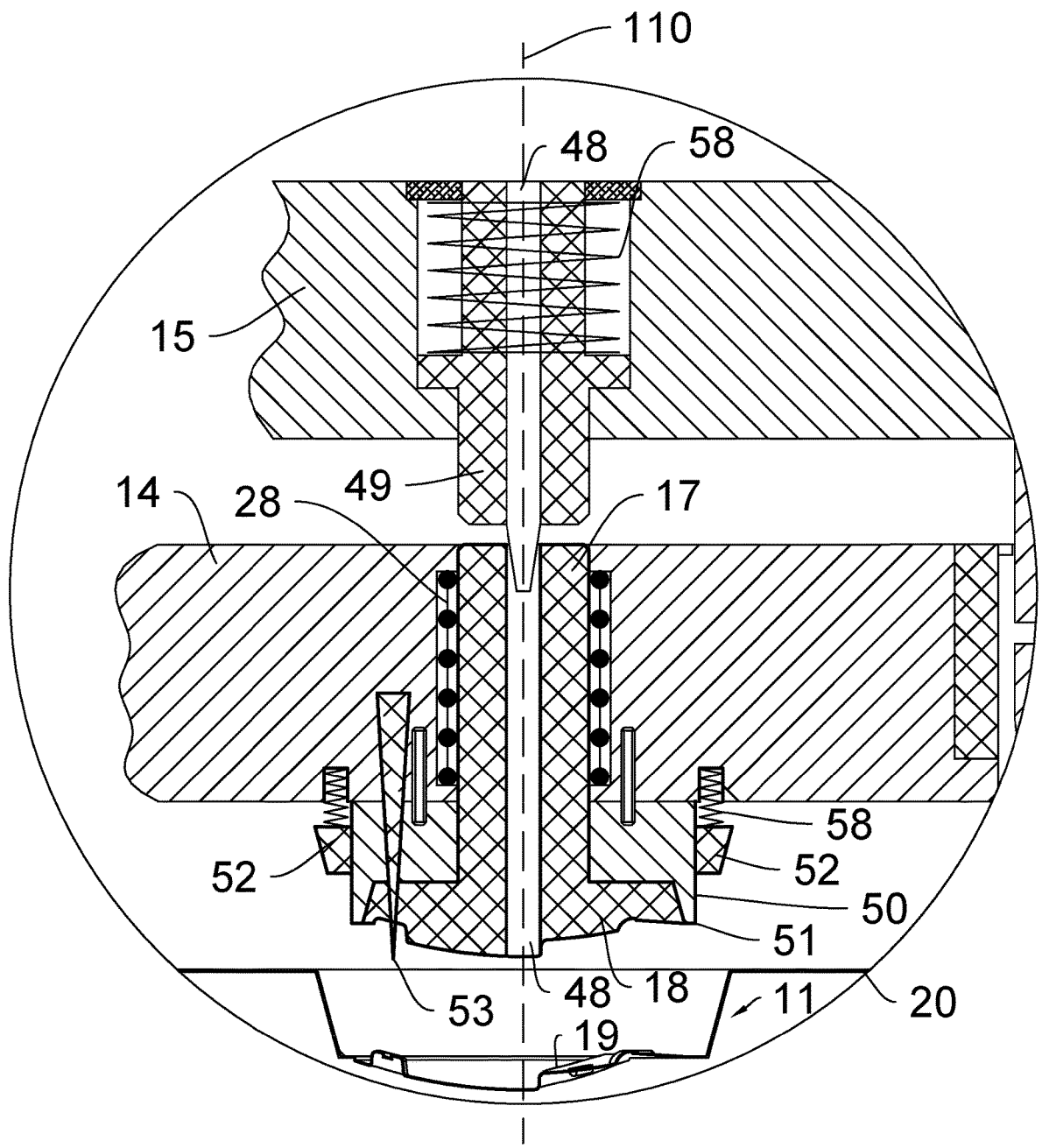

FIG. 48 is an enlarged cross-sectional view as enlarged from FIG. 46 to show in greater clarity the structures associated with the outer plate and the first intermediate compactor plate otherwise depicted in FIG. 46.

Figure 49:
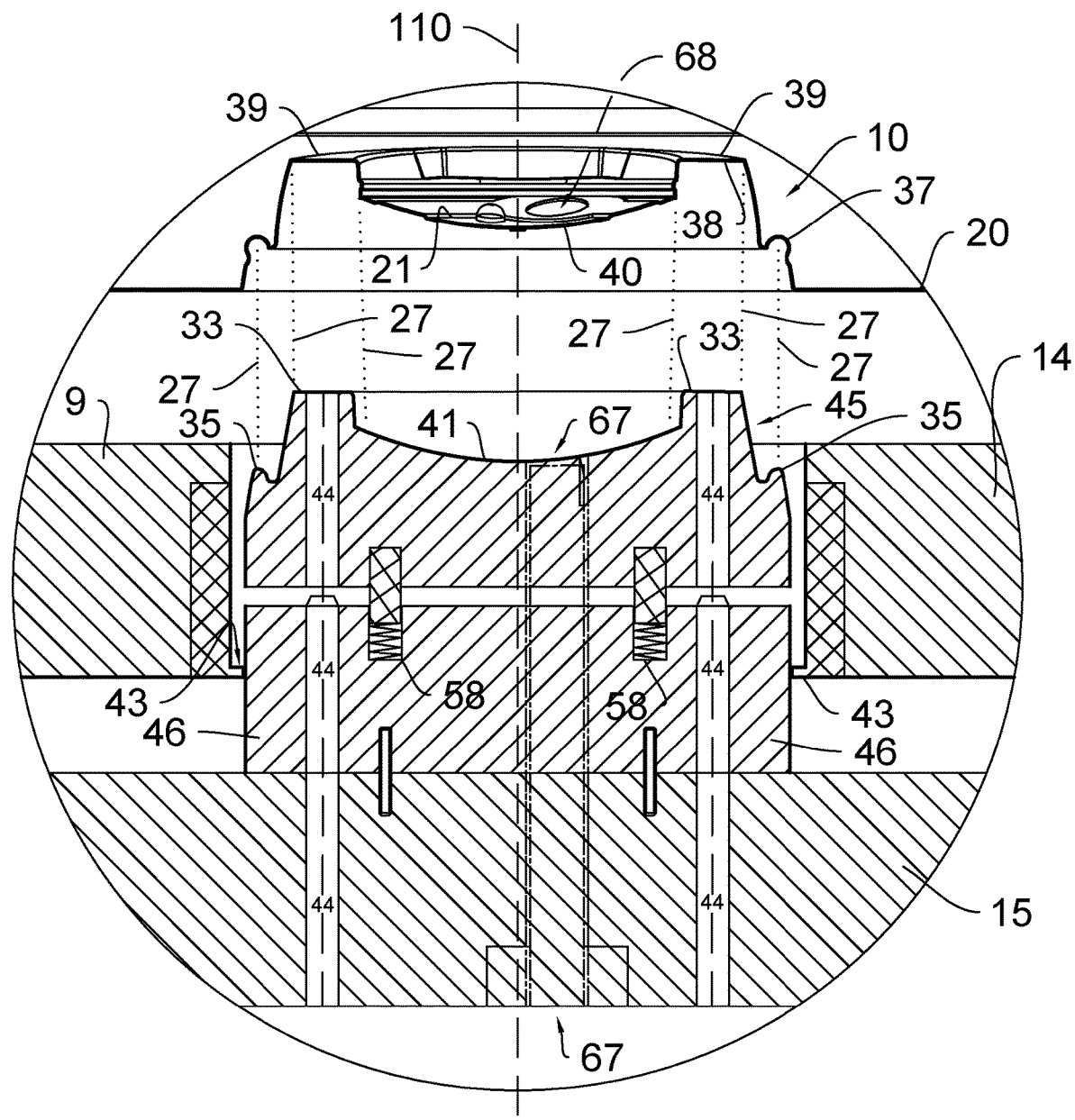

FIG. 49 is an enlarged cross-sectional view as enlarged from FIG. 46 to show in greater clarity the structures associated with the second intermediate compactor plate and the outer plate and otherwise depicted in FIG. 46.

Figure 50:
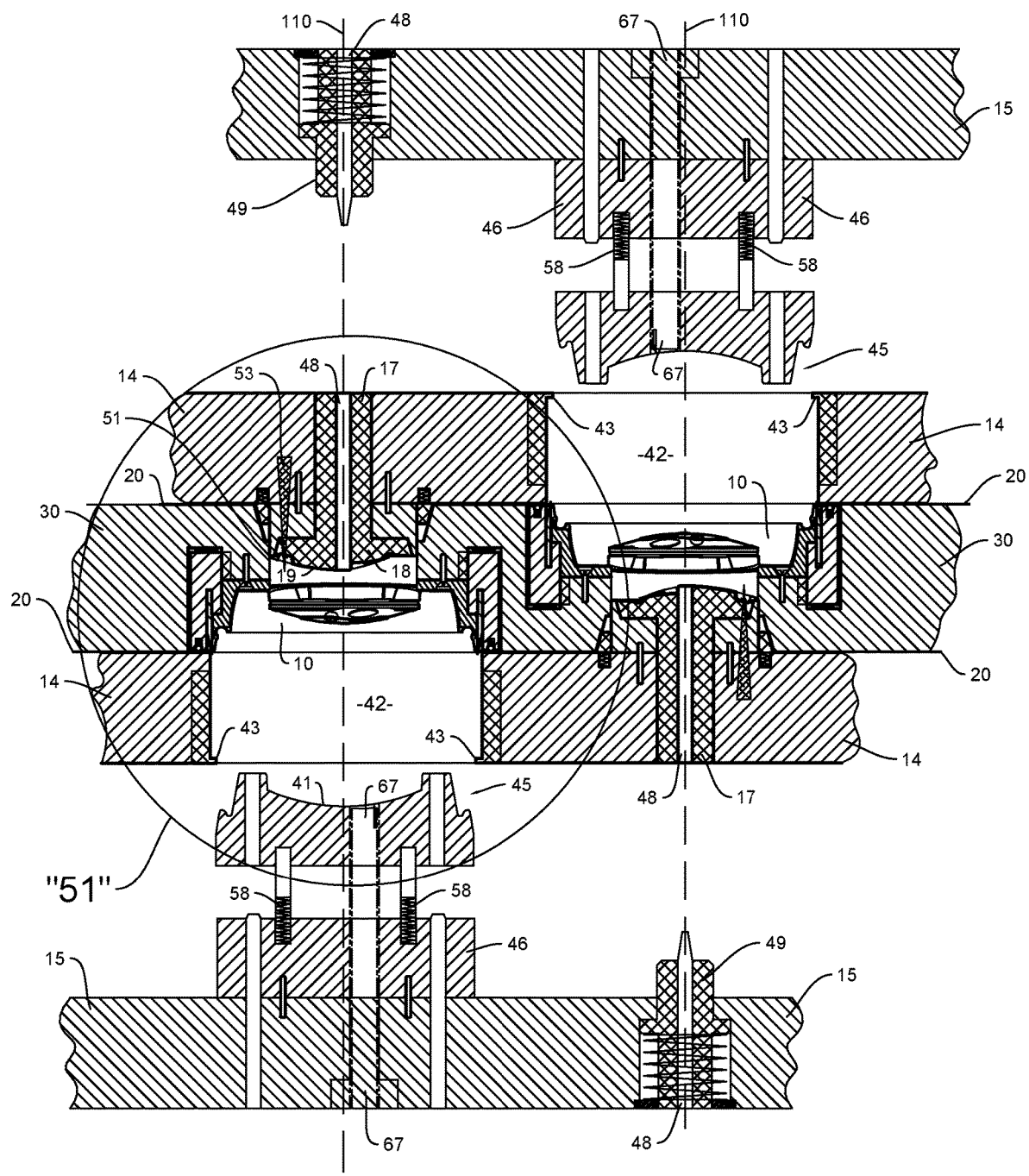

FIG. 50 is a cross-sectional view orthogonal to the plane of the main base plate depicting a staggered arrangement of lower lid bodies and upper lid bodies on the web in a pre-assembly position with axially aligned lower lid bodies and upper lid bodies in side-by-side relation, and the outer plates disengaged from the first and second intermediate compactor plates.

FIG. 51 is an enlarged cross-sectional view as enlarged from FIG. 50 to show in greater clarity the structures associated with the main base plate and first and second intermediate compactor plates otherwise depicted in FIG. 50.

FIG. 51A is an enlarged cross-sectional view as enlarged from FIG. 51 to show in greater clarity the structures associated with circular cutting mechanism associated with the main base plate otherwise depicted in FIG. 51.

Figure 52A:
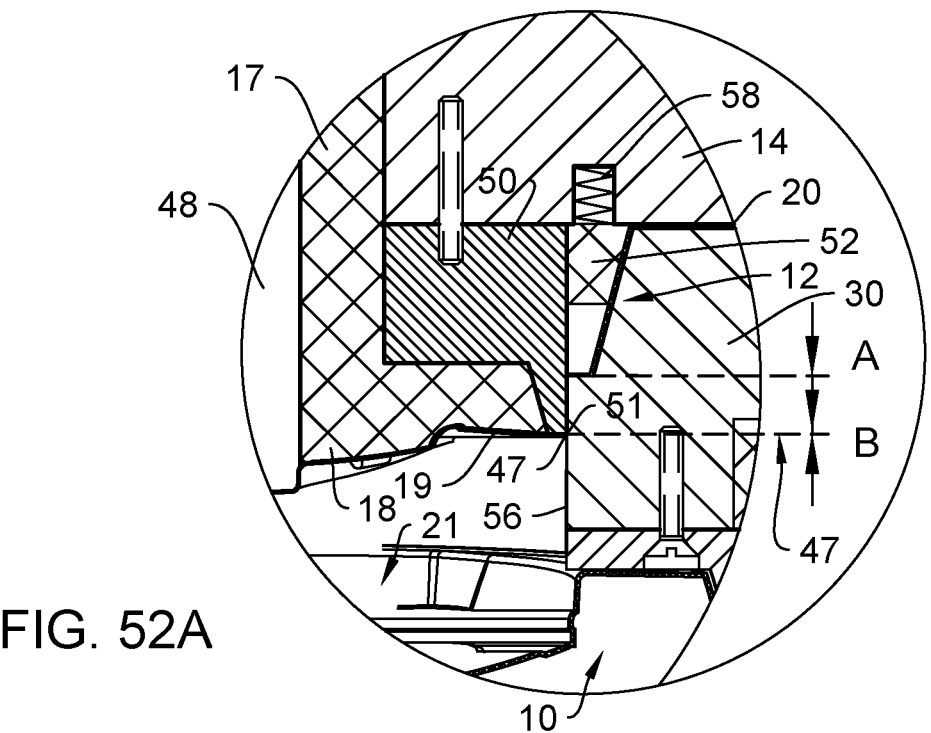
Figure 52:
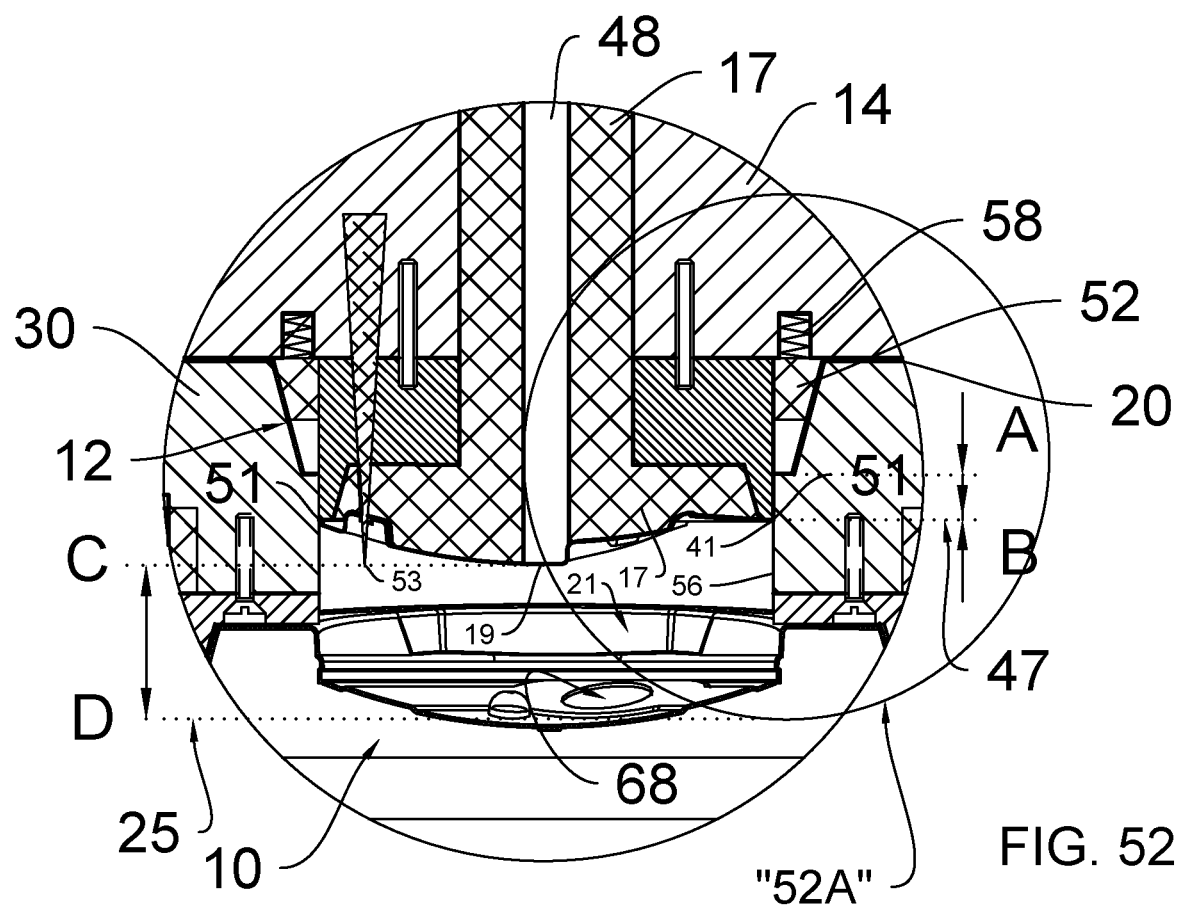

FIG. 52 is an enlarged cross-sectional view as enlarged from FIG. 51 to show in greater clarity the structures associated with the compactor shaft and the compactor head relative to the main base plate as otherwise depicted in FIG. 51.

FIG. 52A is an enlarged cross-sectional view as enlarged from FIG. 52 to show in greater clarity the structures associated with the compactor shaft and the compactor head relative to the main base plate as otherwise depicted in FIG. 52.

Figure 53:
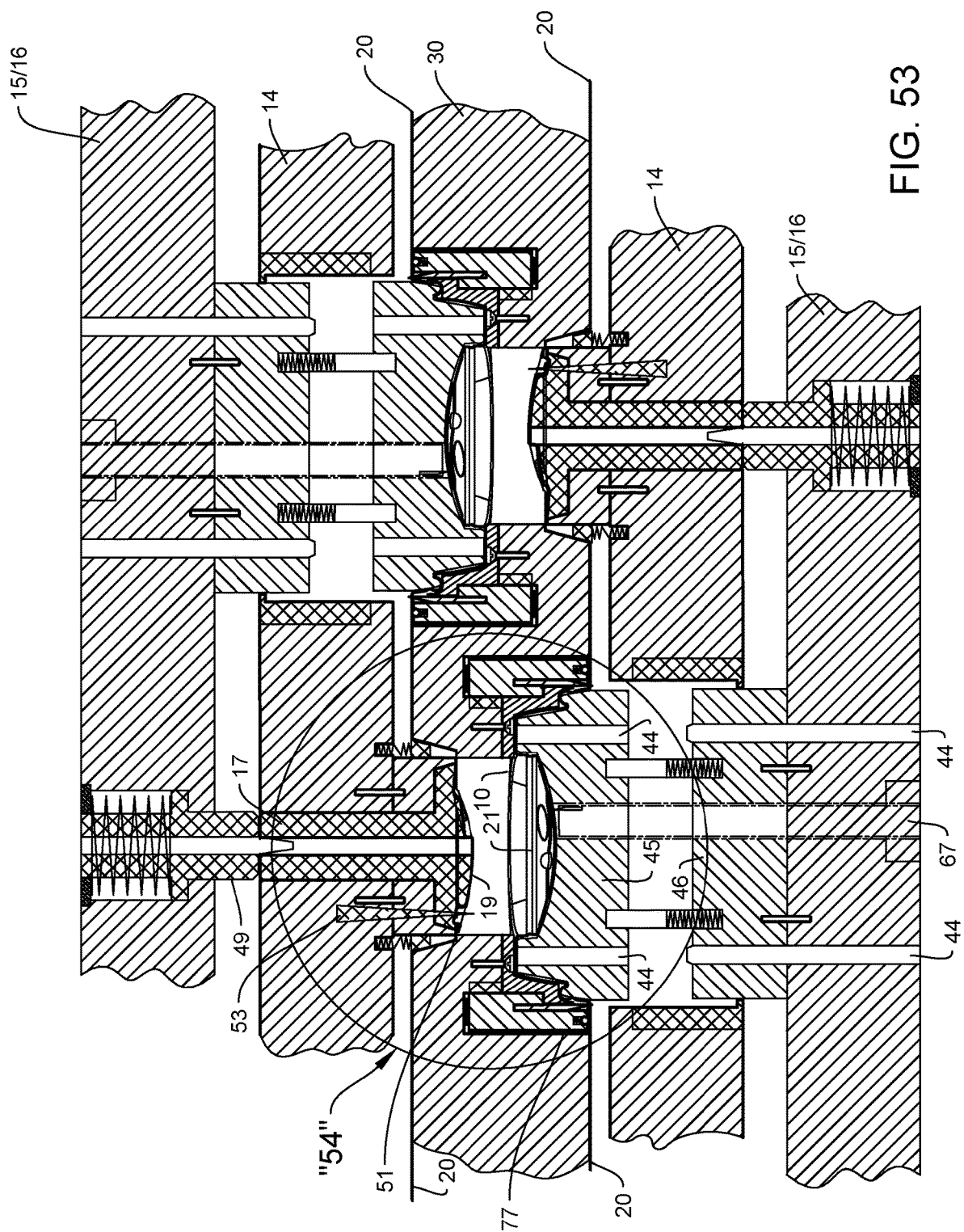

FIG. 53 is a cross-sectional view orthogonal to the plane of the main base plate depicting a staggered arrangement of lower lid bodies and upper lid bodies on the web in a pre-assembly position with axially aligned lower lid bodies and upper lid bodies in side-by-side relation, the precision alignment of lower lid body and upper lid body complete and the outer plates and first and second intermediate compactor plates being in a pre-punch position.

Figure 54:
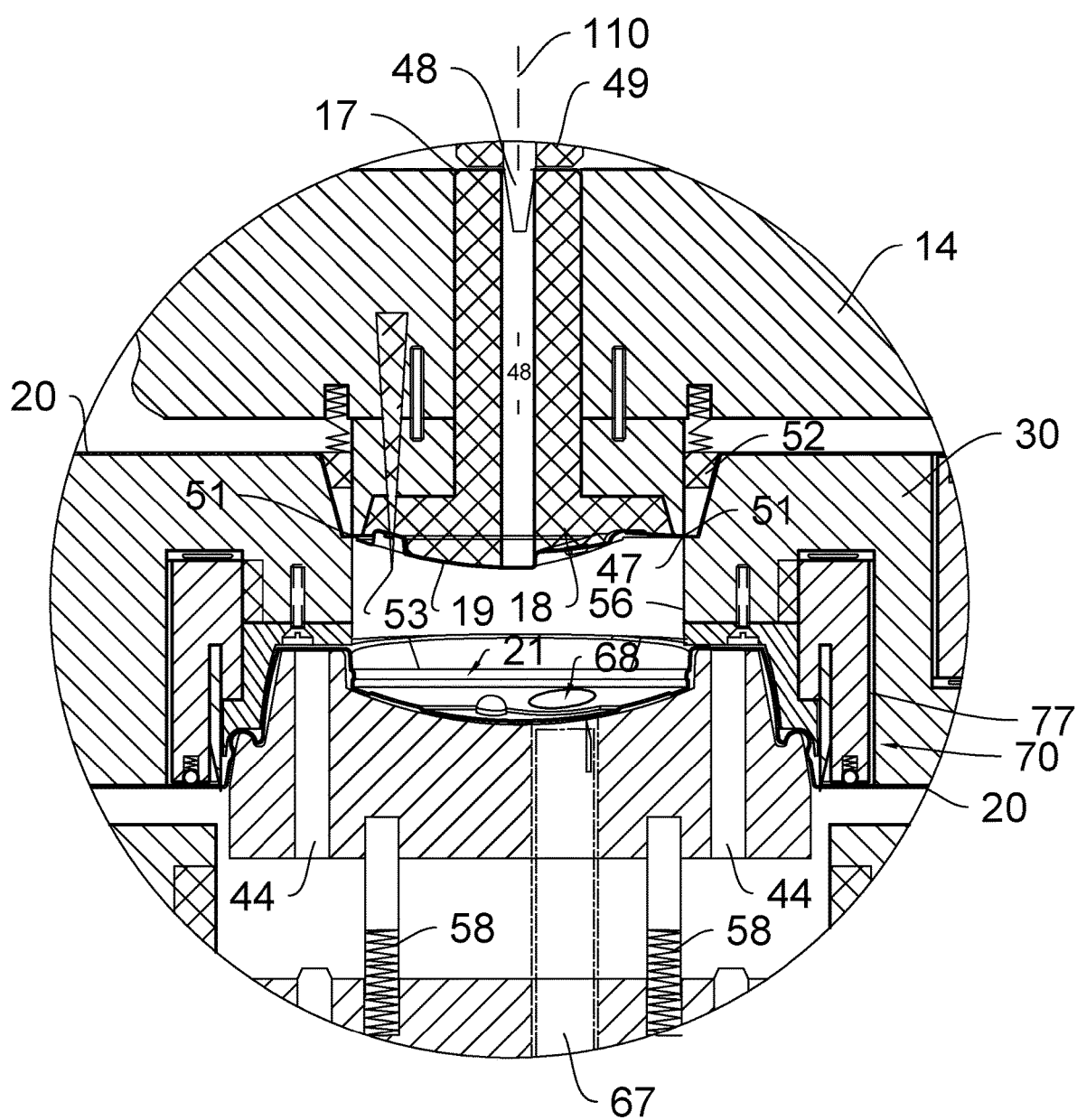

FIG. 54 is an enlarged cross-sectional view as enlarged from FIG. 53 to show in greater clarity the structures associated with the compactor shaft and the compactor head relative to the main base plate as otherwise depicted in FIG. 53.

Figure 55:
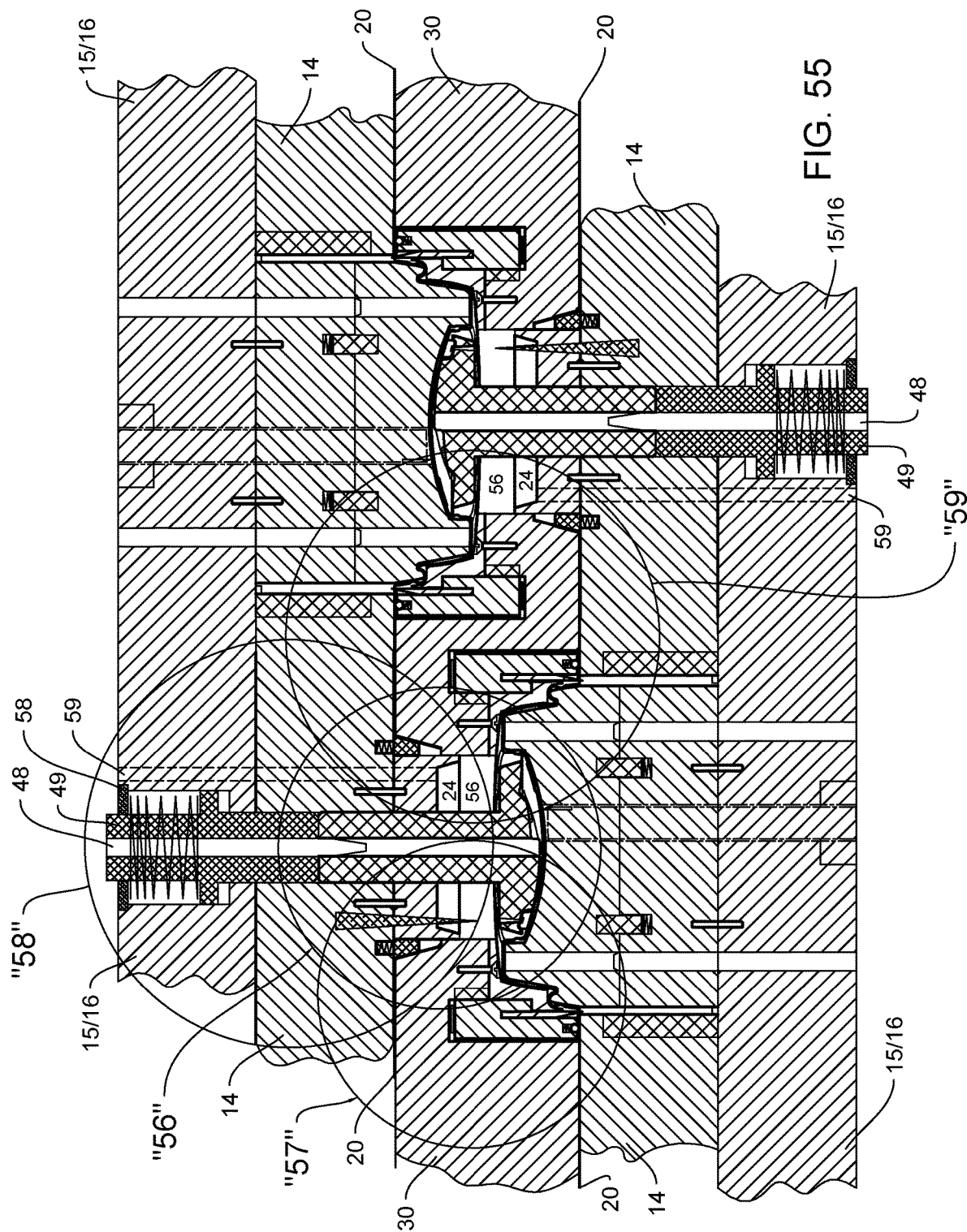

FIG. 55 is a cross-sectional view orthogonal to the plane of the main base plate depicting a staggered arrangement of lower lid bodies and upper lid bodies on the web in an assembly position with axially aligned lower lid bodies and upper lid bodies in side-by-side relation.

Figure 56:
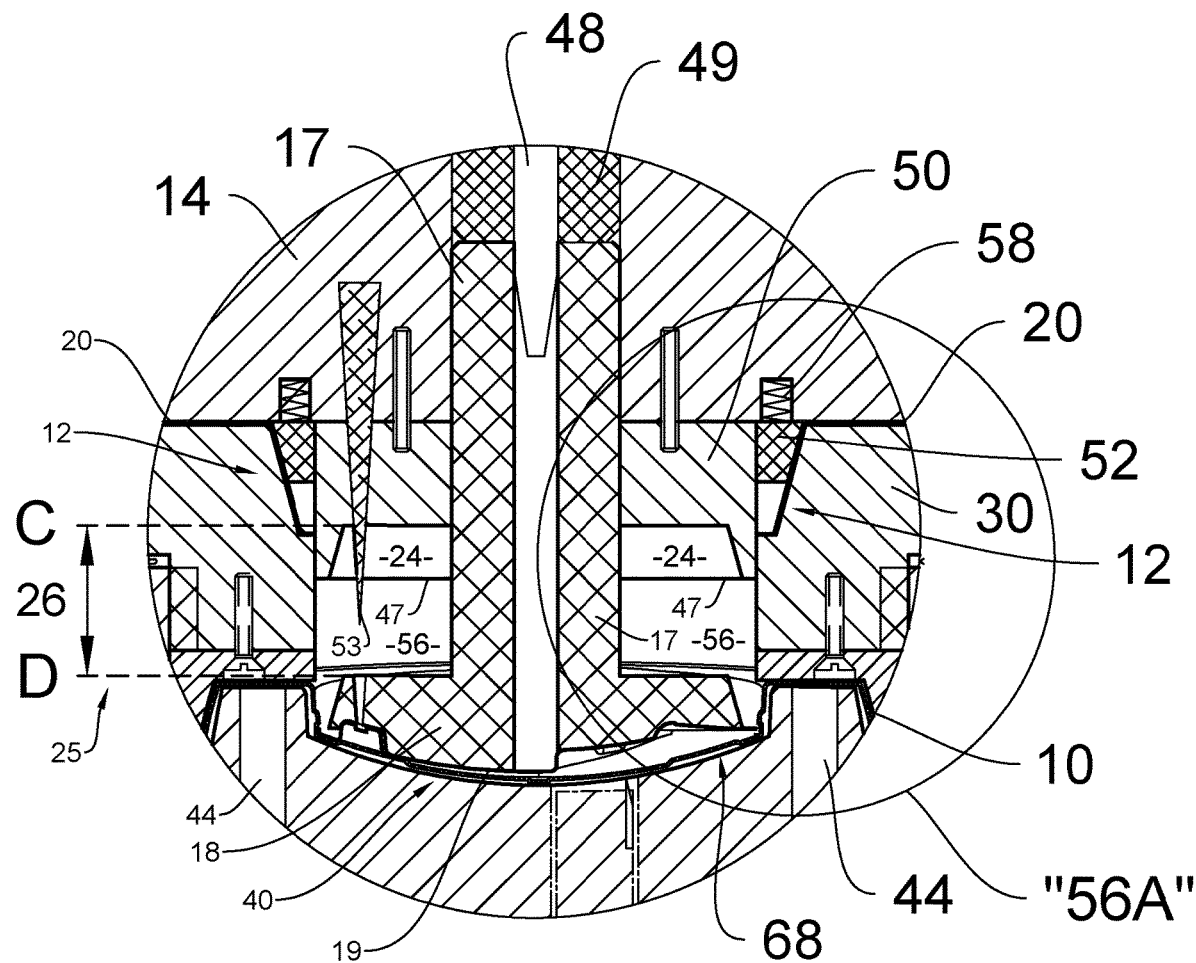

FIG. 56 is an enlarged cross-sectional view as enlarged from FIG. 55 to show in greater clarity the structures associated with the compactor shaft and the compactor head relative to the main base plate as otherwise depicted in FIG. 55.

Figure 56A:
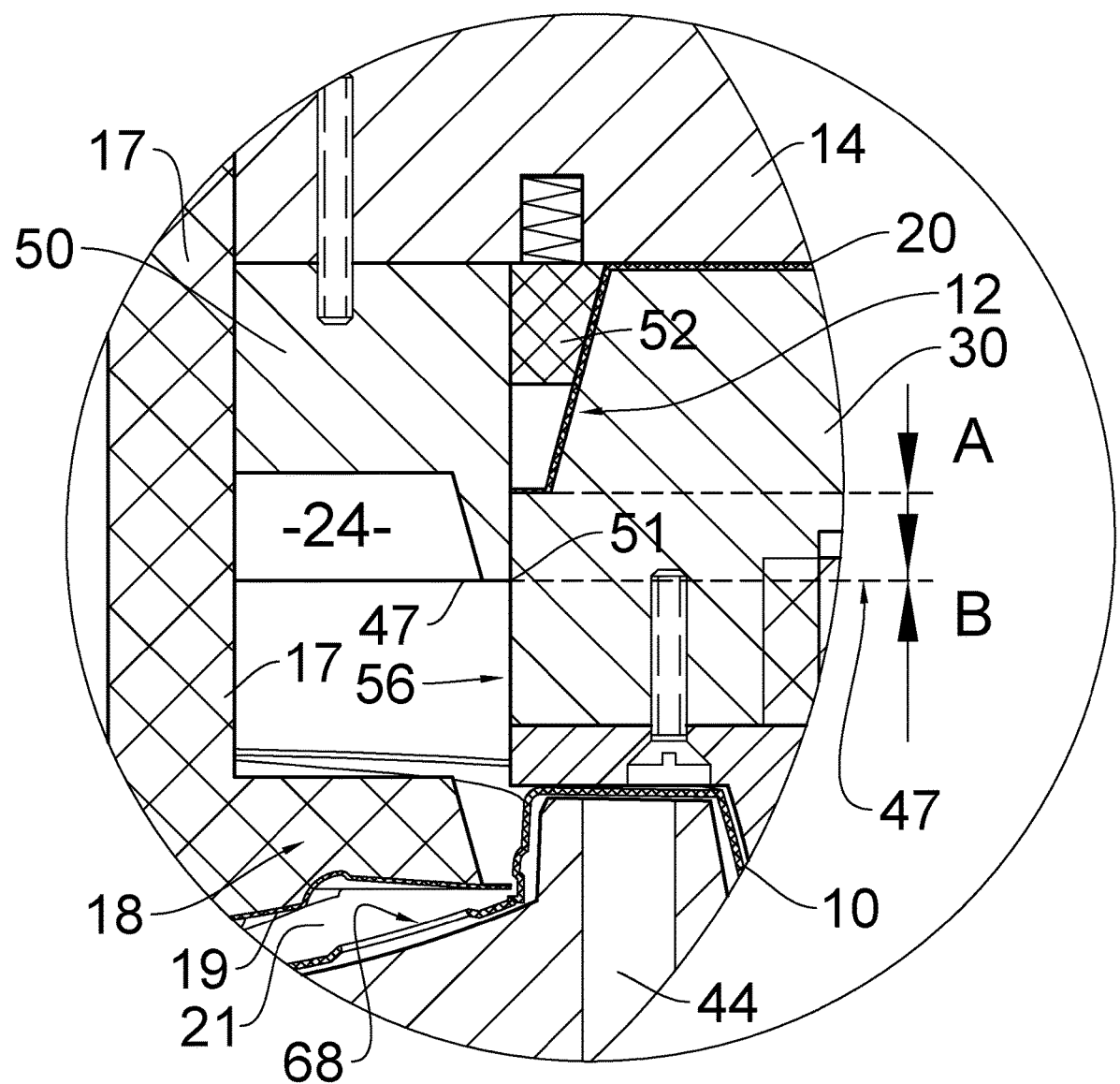

FIG. 56A is an enlarged cross-sectional view as enlarged from FIG. 56 to show in greater clarity the structures associated with the compactor shaft and the compactor head relative to the main base plate as otherwise depicted in FIG. 56.

Figure 57:
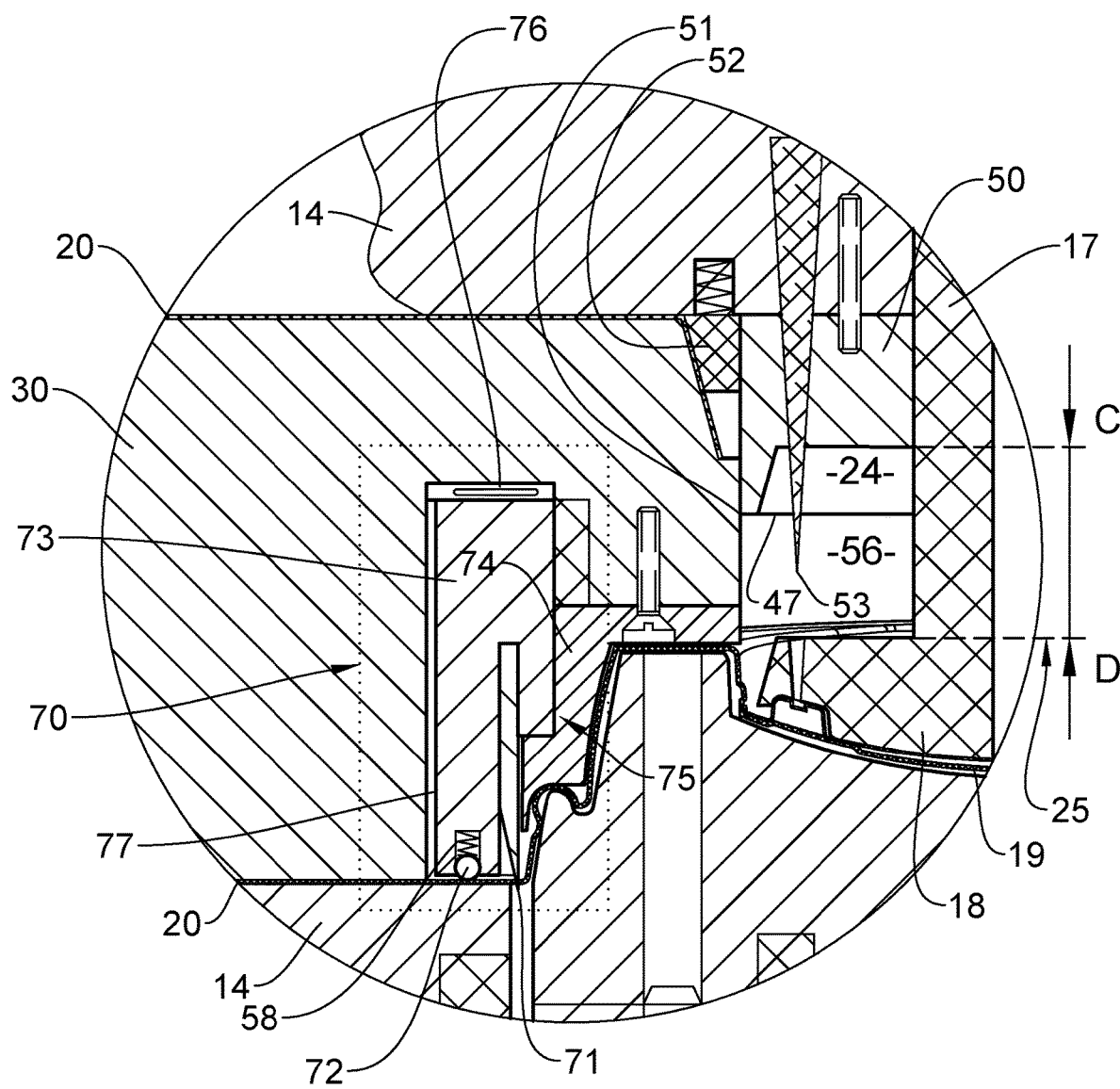

FIG. 57 is an enlarged cross-sectional view as enlarged from FIG. 55 to show in greater clarity the structures associated with a circular cutting mechanism relative to the compactor shaft, the compactor head, and the main base plate as otherwise depicted in FIG. 55.

Figure 58:
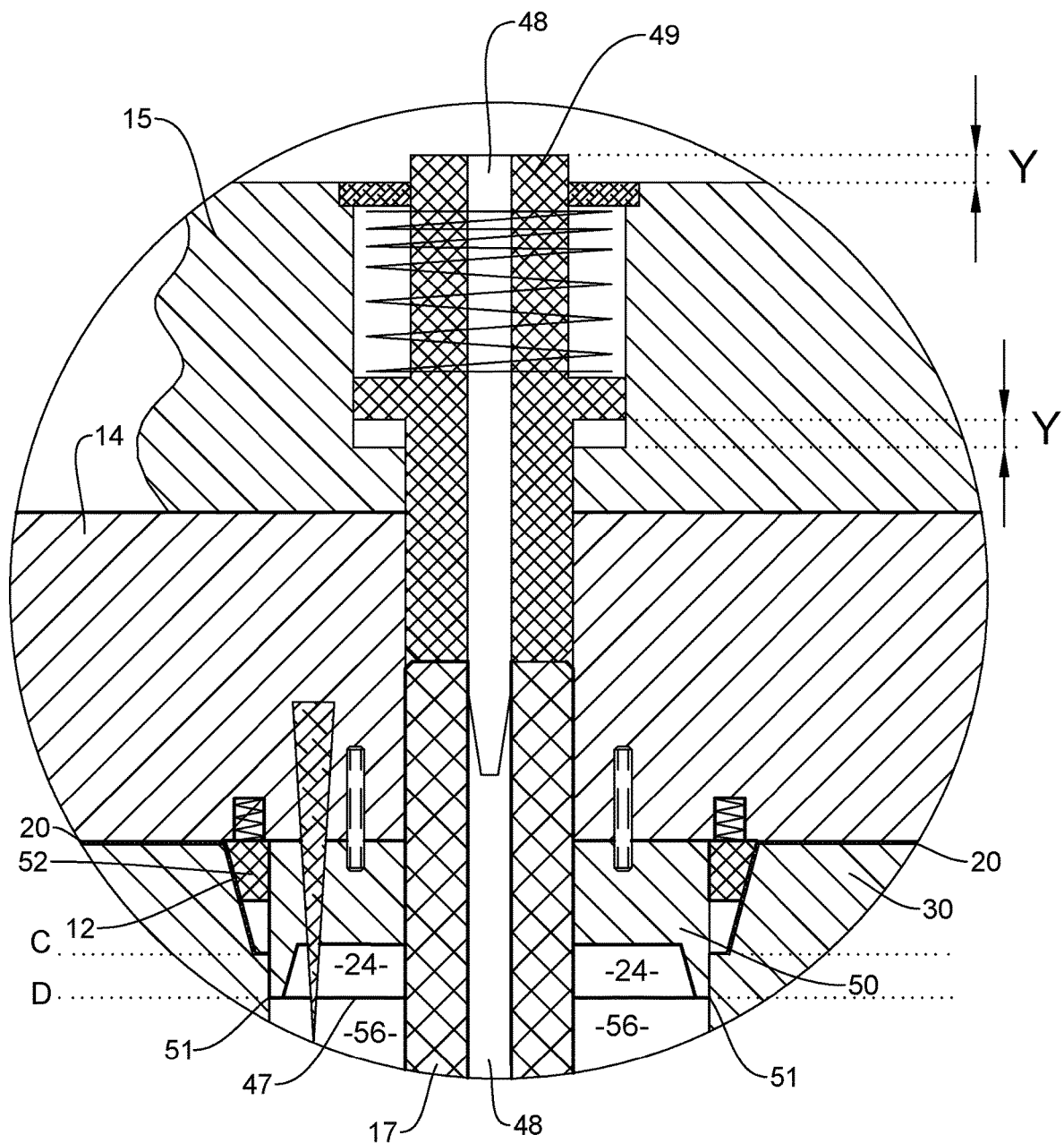

FIG. 58 is an enlarged cross-sectional view as enlarged from FIG. 55 to show in greater clarity the structures associated with end portions of the compactor shaft as associated with the first intermediate compactor plate and the compactor push pin associated with the outer plate as otherwise depicted in FIG. 55.

Figure 59:
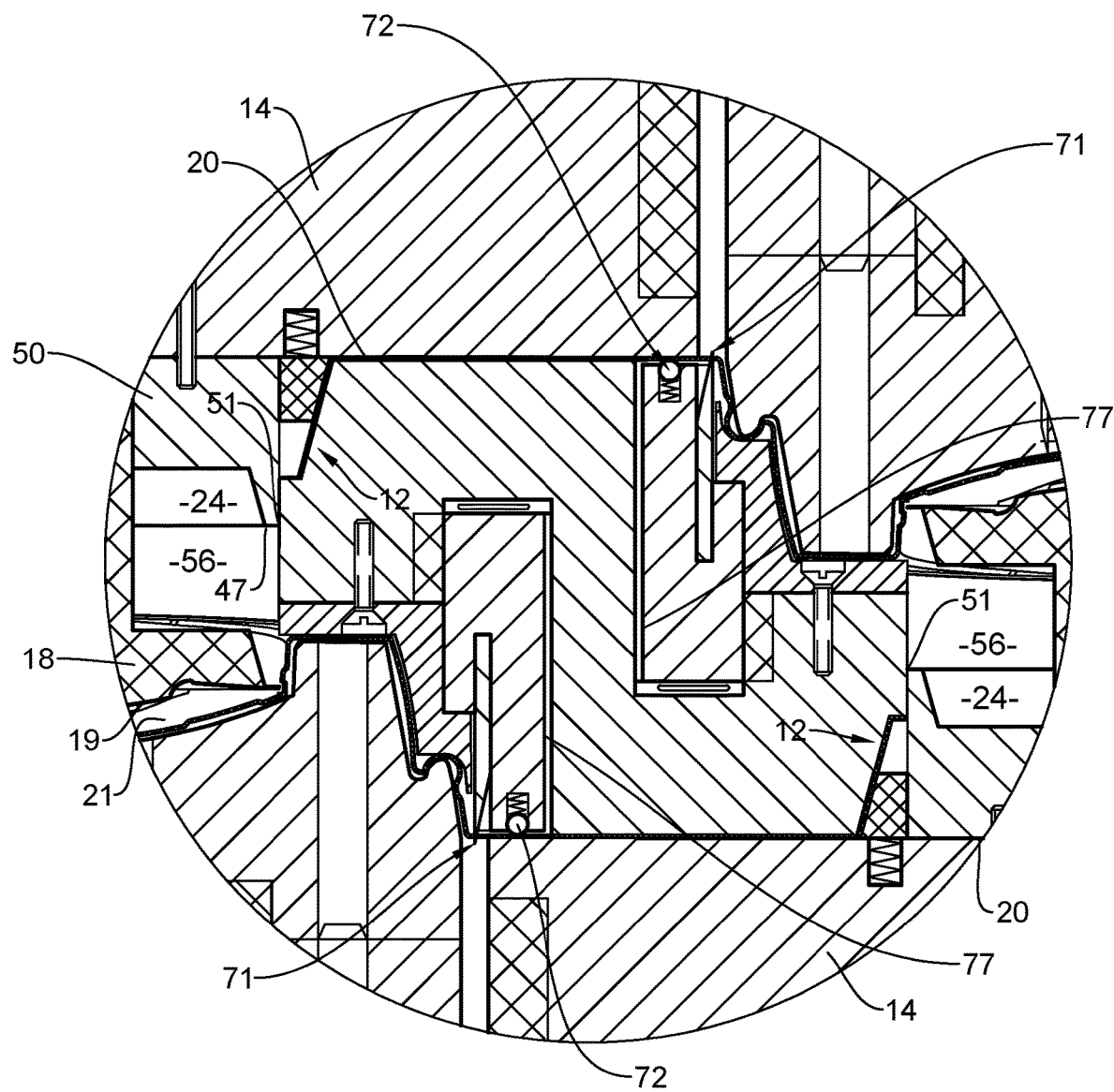

FIG. 59 is an enlarged cross-sectional view as enlarged from FIG. 55 to show in greater clarity the structures associated with the circular cutting mechanism relative to the main base plate as otherwise depicted in FIG. 55.

Figure 60:
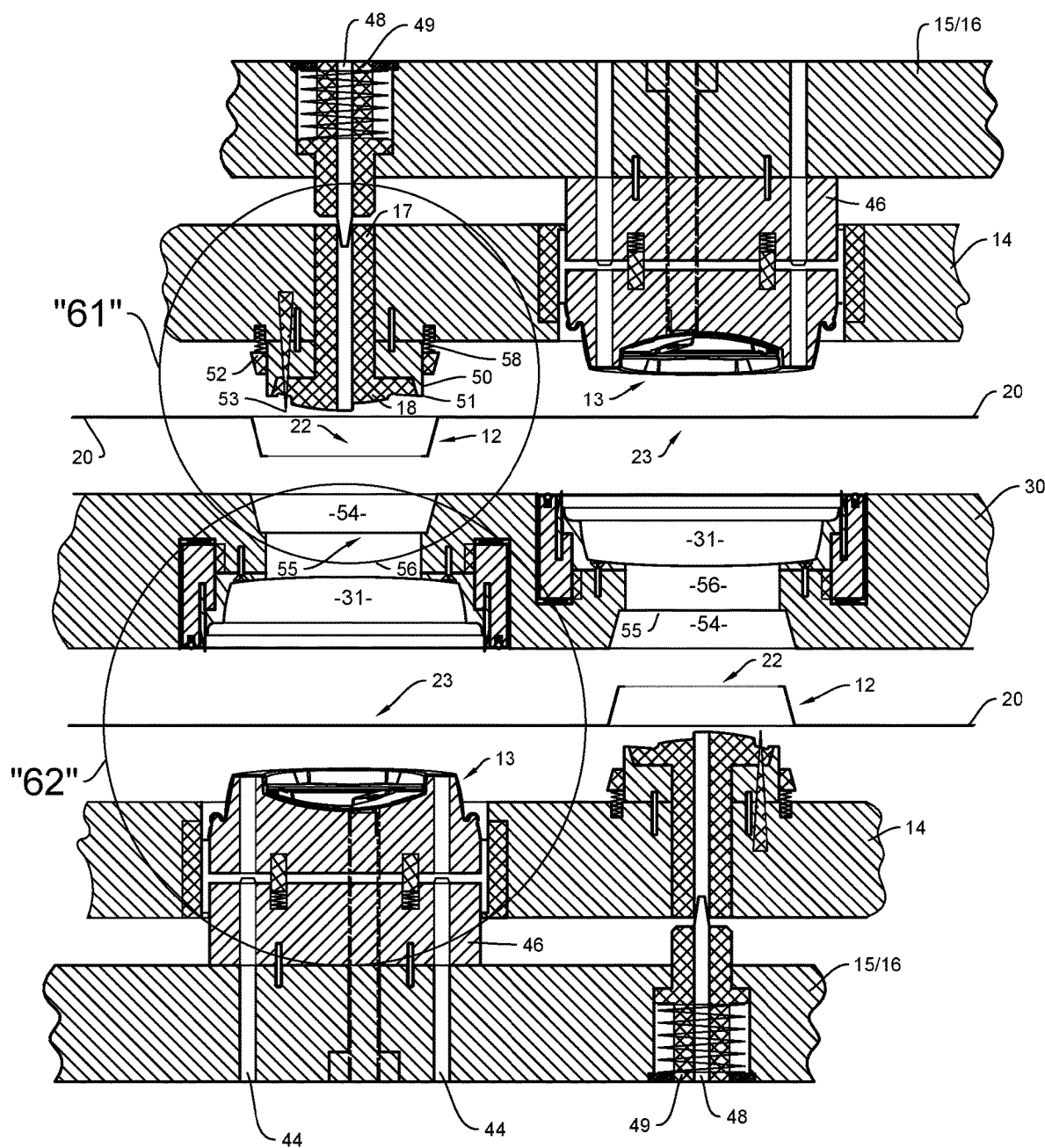

FIG. 60 is a cross-sectional view orthogonal to the plane of the main base plate depicting a staggered arrangement of lower lid bodies and upper lid bodies on the web in a post assembly position with axially aligned lower lid bodies and upper lid bodies in side-by-side relation.

Figure 61:
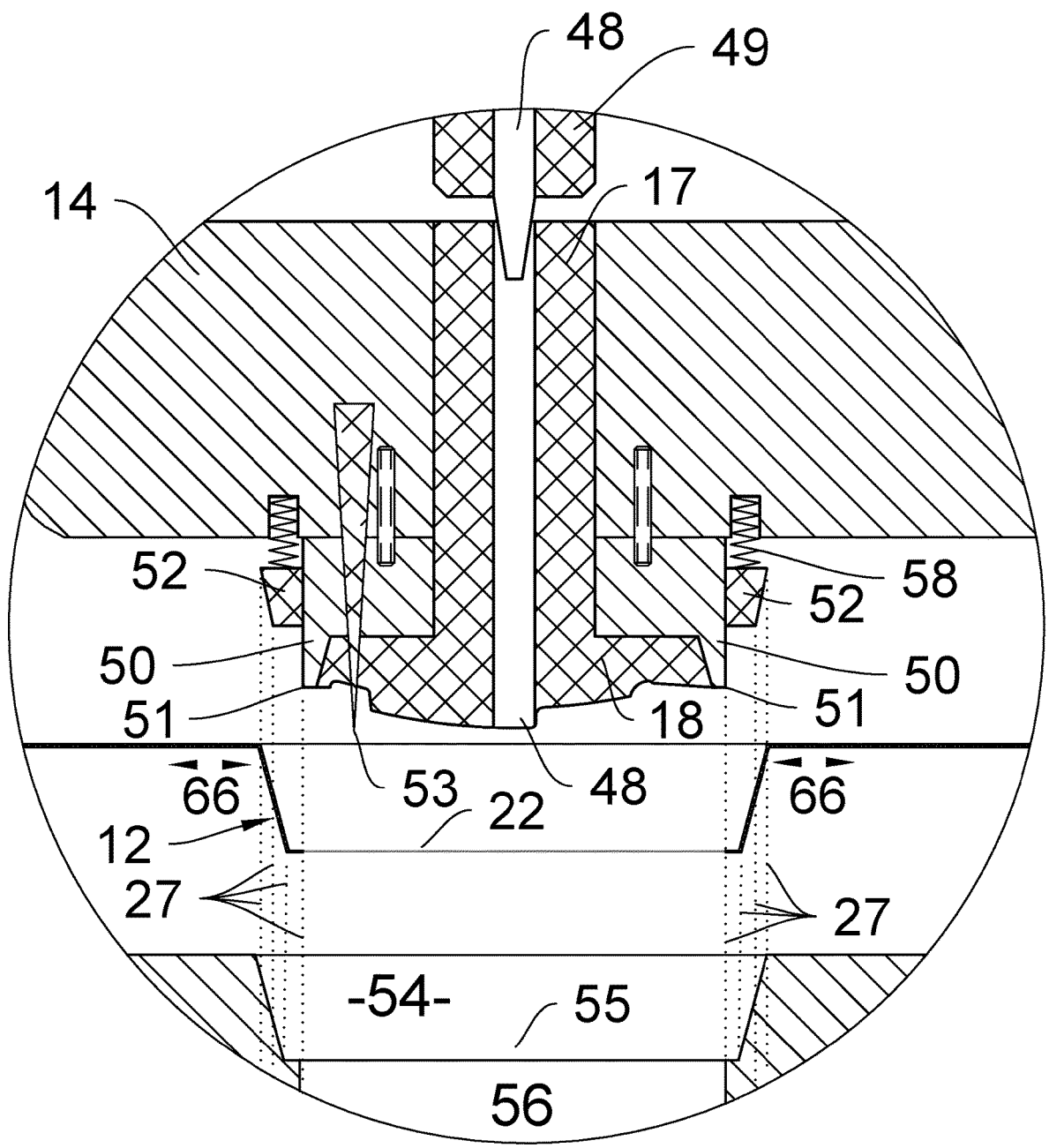

FIG. 61 is an enlarged cross-sectional view as enlarged from FIG. 60 to show in greater clarity the structures associated with the compactor shaft and the compactor head to the main base plate as otherwise depicted in FIG. 60.

Figure 62:
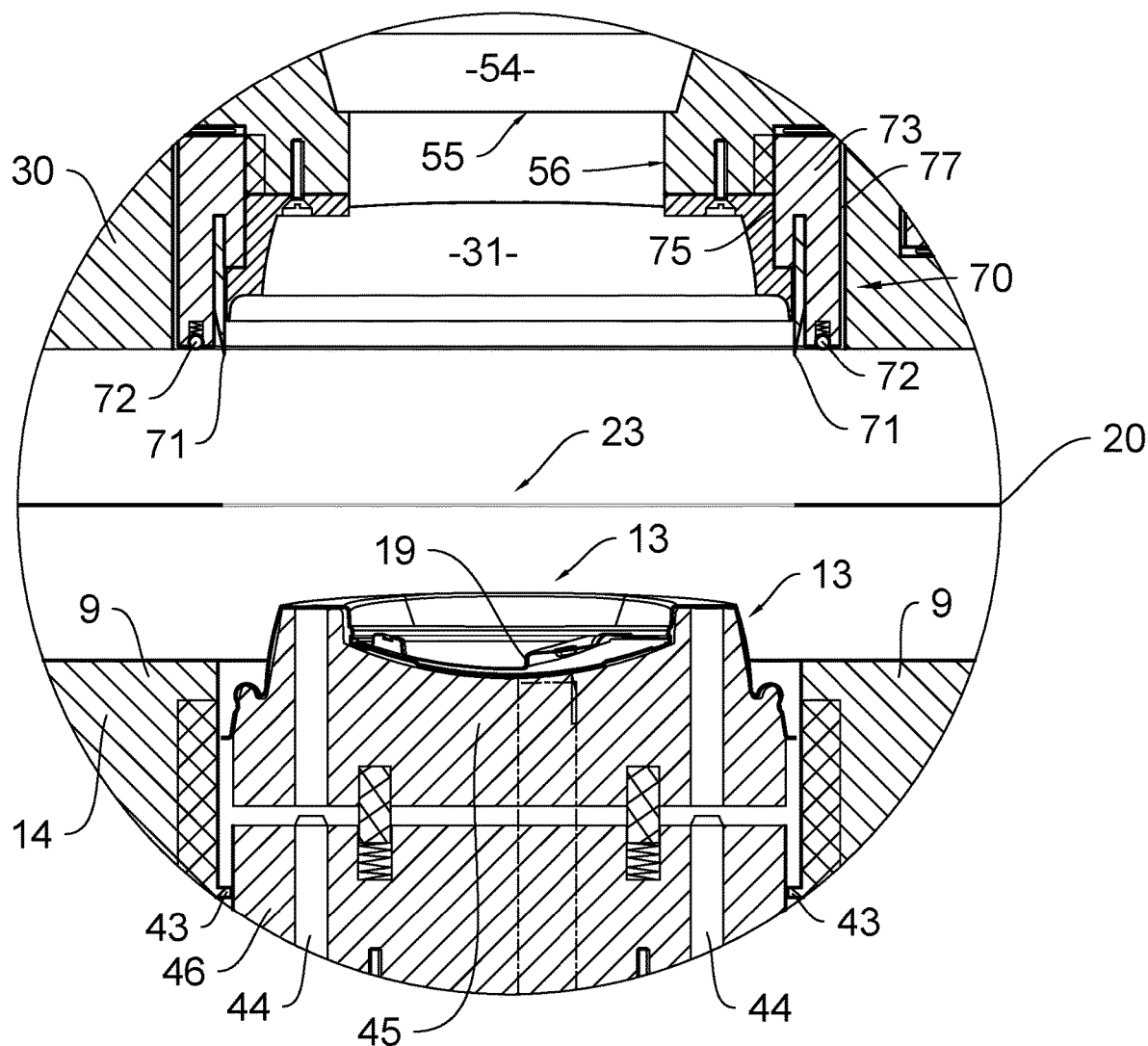

FIG. 62 is an enlarged cross-sectional view as enlarged from FIG. 60 to show in greater clarity the structures associated with the lid support body with an assembled lid assembly as otherwise depicted in FIG. 60.

Figure 63:
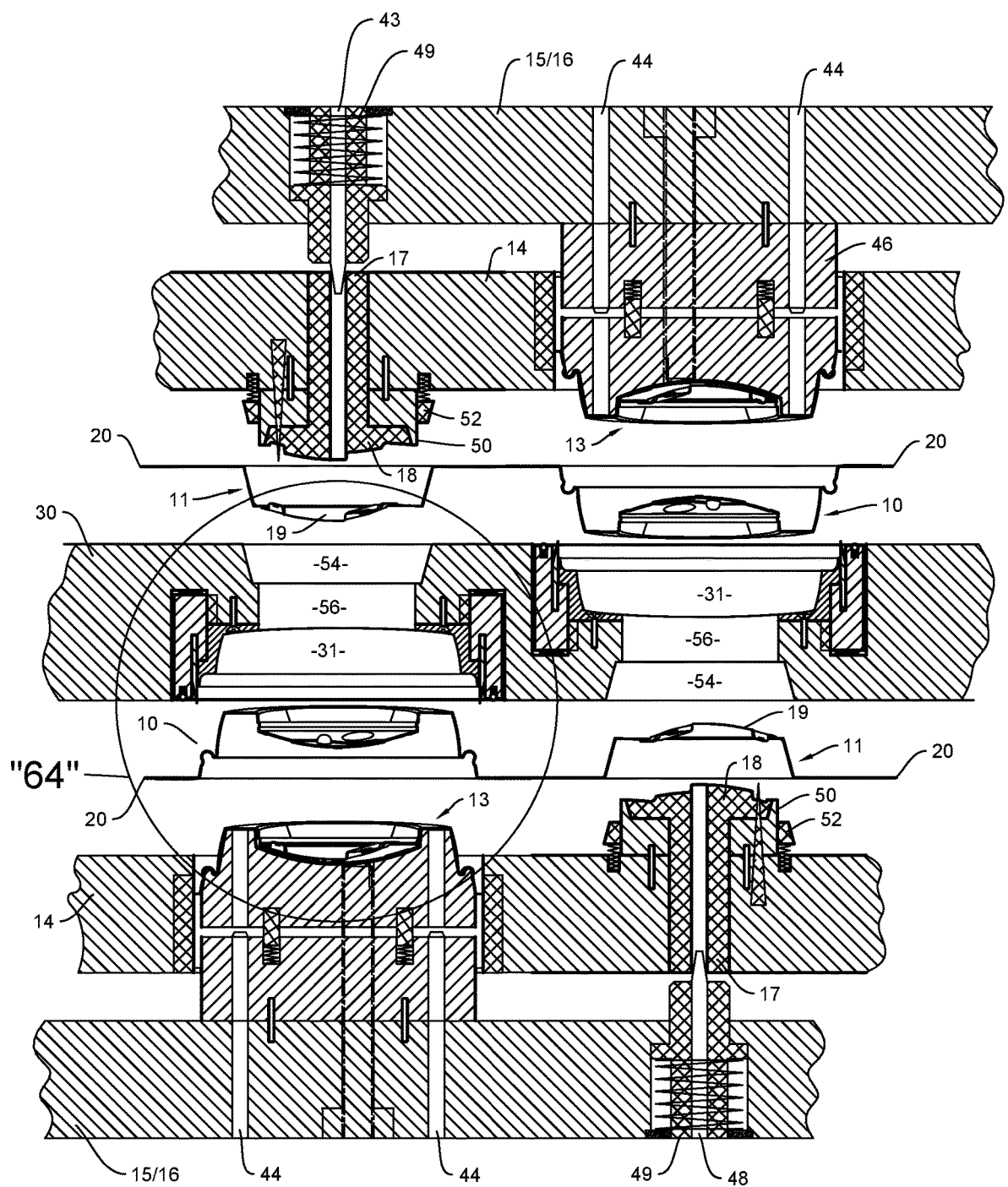

FIG. 63 is a cross-sectional view orthogonal to the plane of the main base plate depicting a staggered arrangement of lower lid bodies and upper lid bodies on the web in a newly indexed pre-assembly position with axially aligned lower lid bodies and upper lid bodies in side-by-side relation.

Figure 64:
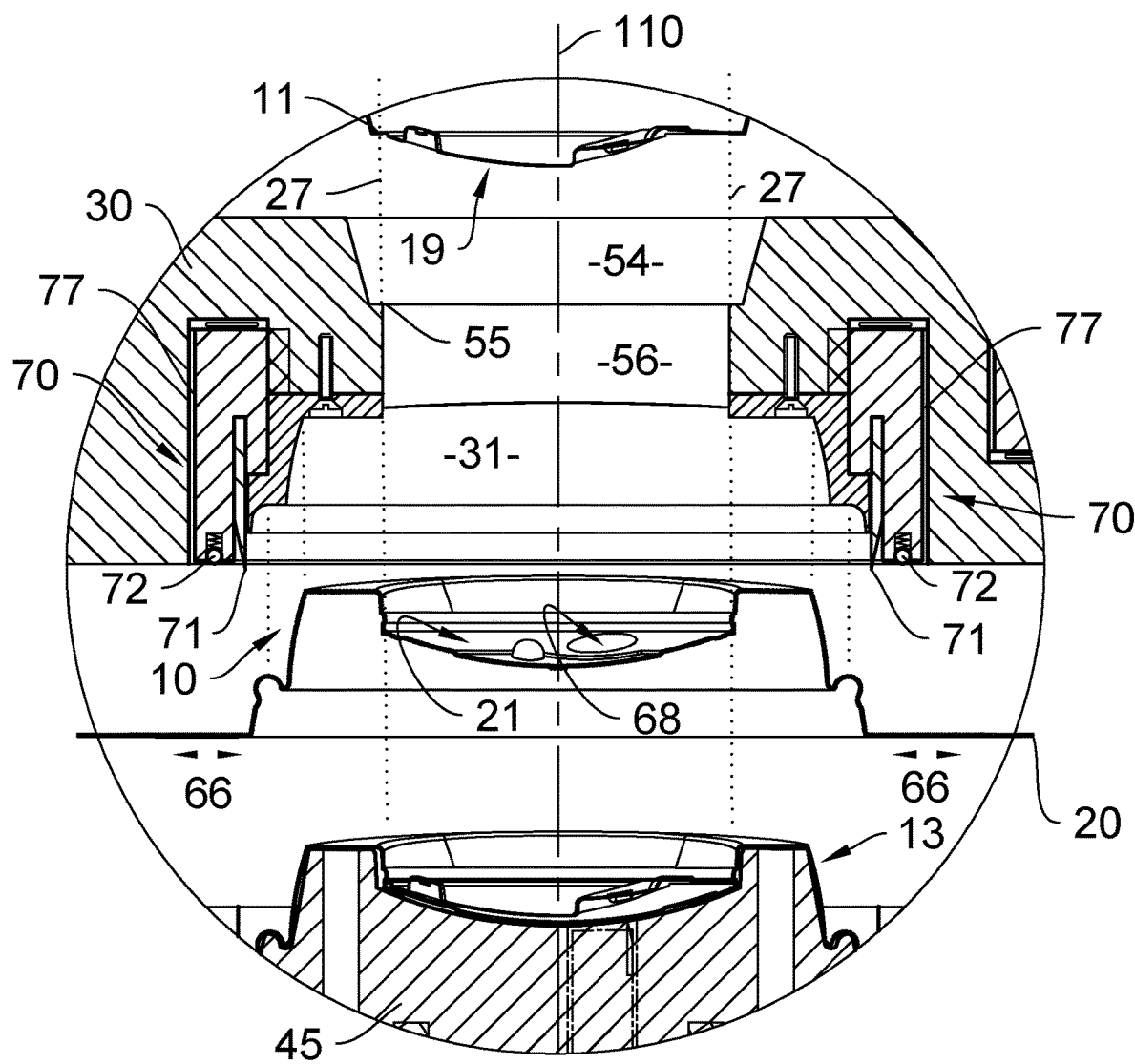

FIG. 64 is an enlarged cross-sectional view as enlarged from FIG. 63 to show in greater clarity the structures associated with newly indexed lower lid body and upper lid body positions relative to the main base plate as otherwise depicted in FIG. 63.

Figure 65:
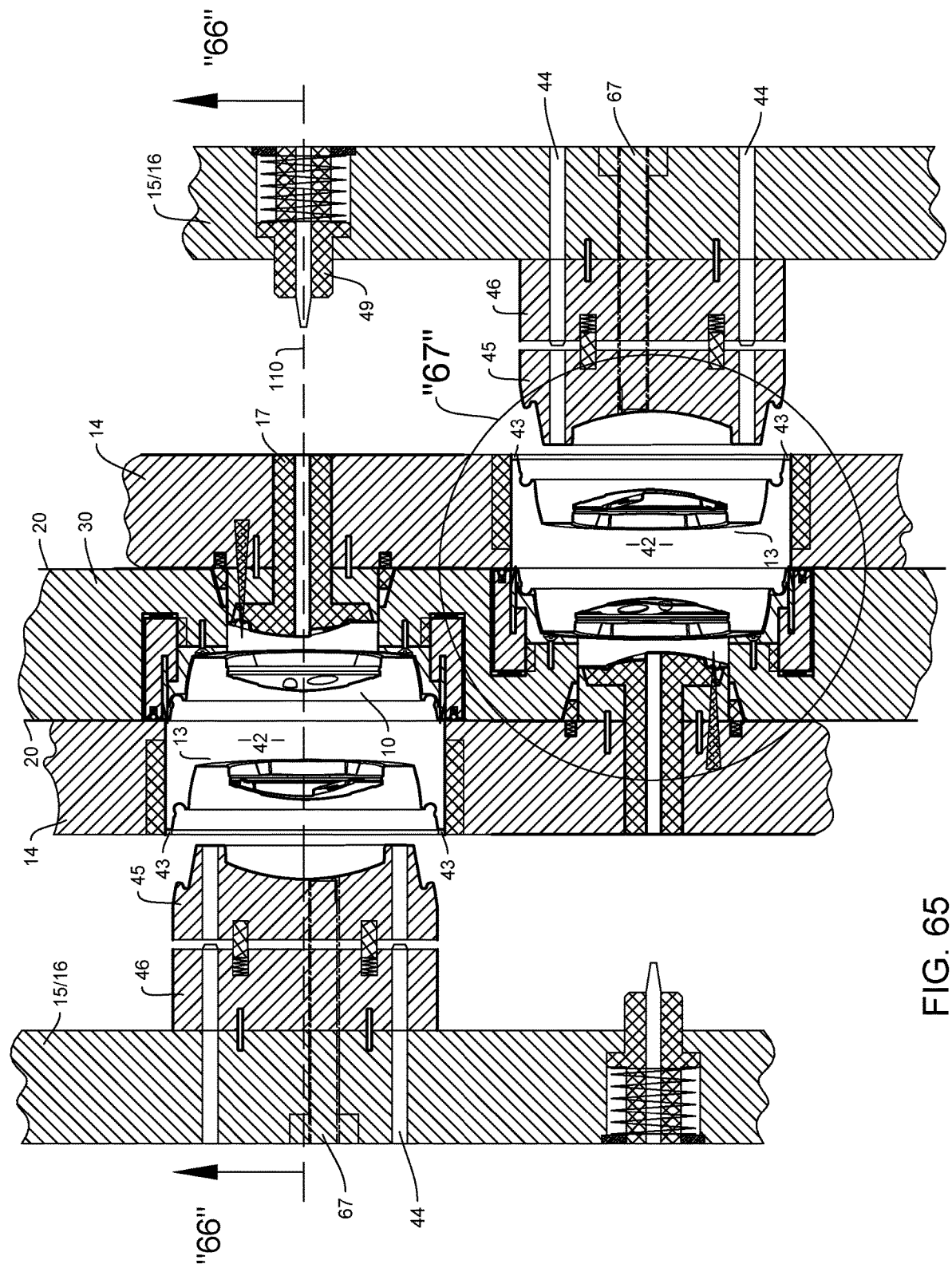

FIG. 65 is a cross-sectional view orthogonal to the plane of the main base plate (as sectioned from FIG. 66) to depict a staggered arrangement of lower lid bodies and upper lid bodies on the web with the first and second intermediate compactor plates in engagement with the main base plate and assembled lid assembles being removed from the lid support bodies via lid stripper elements or steps associated with the intermediate compactor plates.

Figure 1:
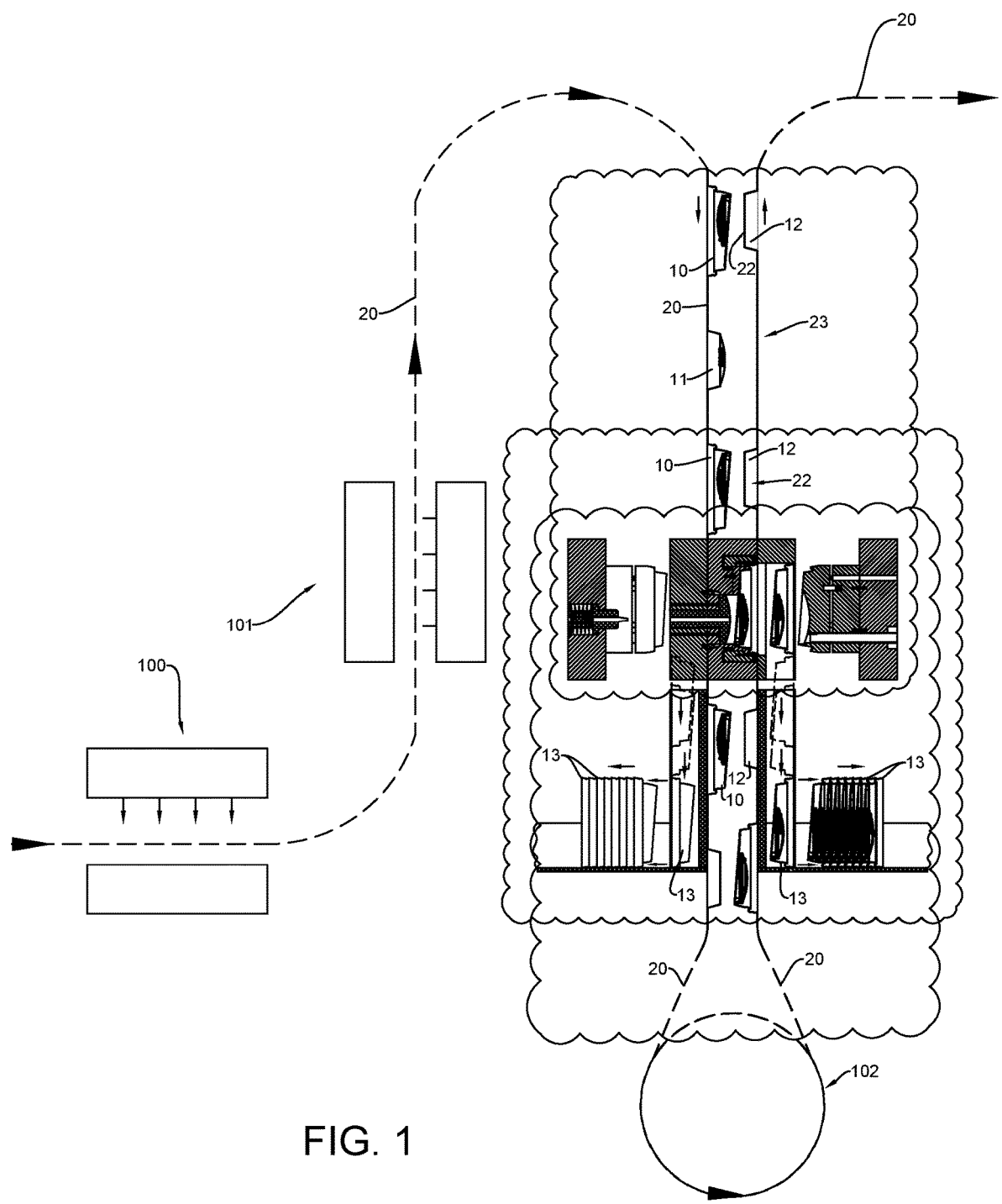
FIG. 1 is a schematic drawing showing a first introductory production line arrangement with a schematic side view depiction of a first all-in-one assembly station for punching+trimming+assembling+packaging lower lid bodies and upper lid bodies according to the present invention, the first all-in-one assembly station being shown in a first stage of production.
Figure 66:
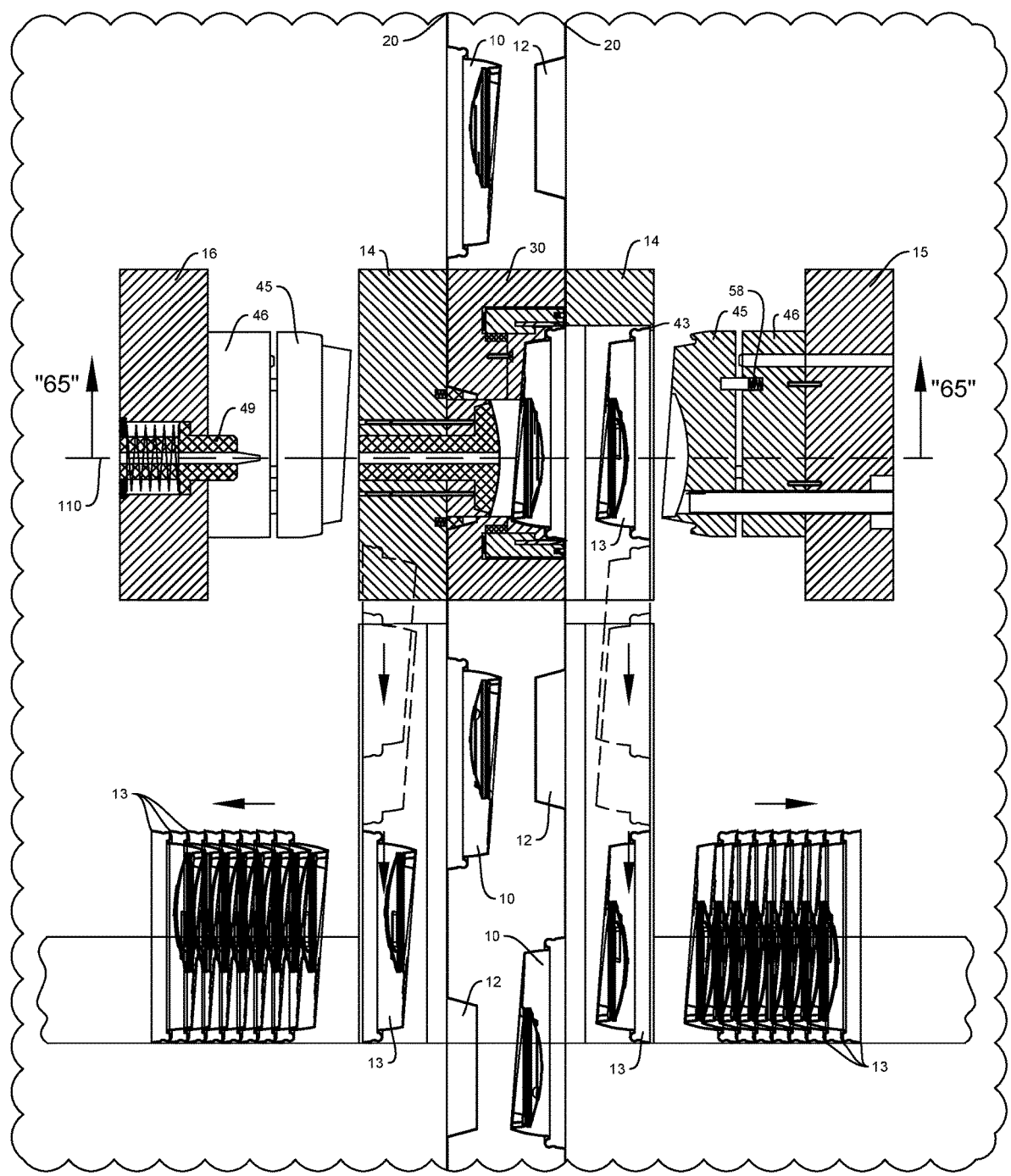

FIG. 66 is an enlarged view of the all-in-one assembly otherwise depicted in FIG. 1 to show in greater clarity post lid assembly activity whereby newly formed lid assemblies are directed down chutes to a packaging station.

Figure 67A:
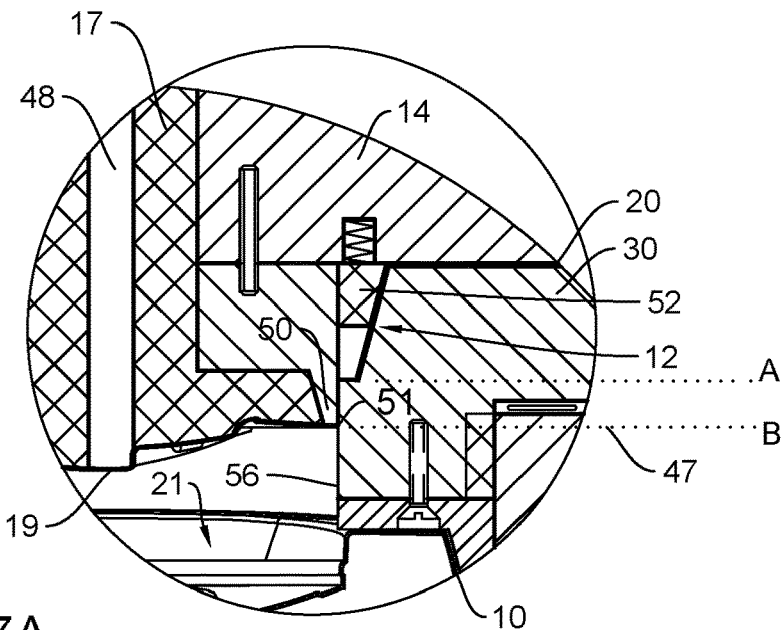
Figure 67:
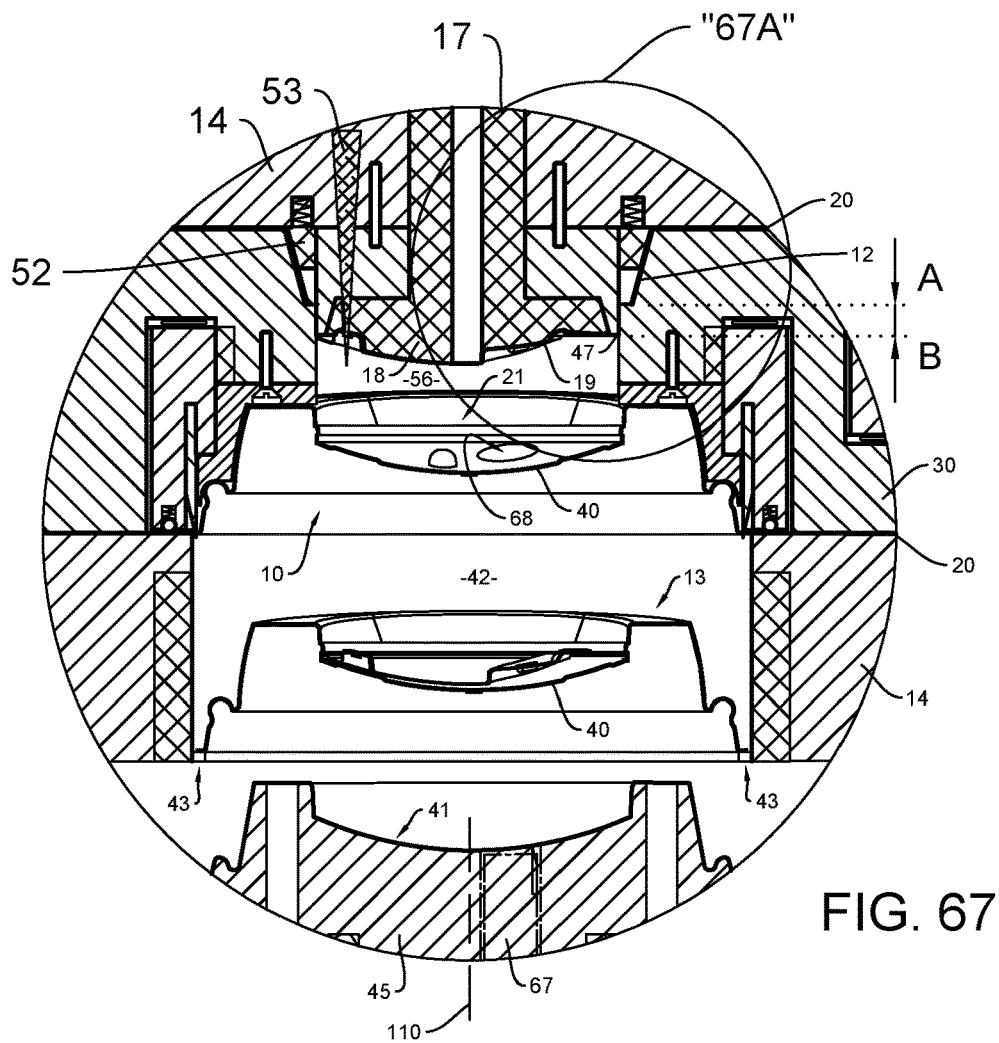

FIG. 67 is an enlarged cross-sectional view as enlarged from FIG. 65 to show in greater clarity assembled lid assembles being removed from the lid support bodies via lid stripper elements or steps associated with the intermediate compactor plates as otherwise depicted in FIG. 65.

FIG. 67A is an enlarged cross-sectional view as enlarged from FIG. 67 to show in greater clarity the compactor head retreated into the compactor head nest with a disk already punched for the next assembly as otherwise depicted in FIG. 67.

Figure 68:
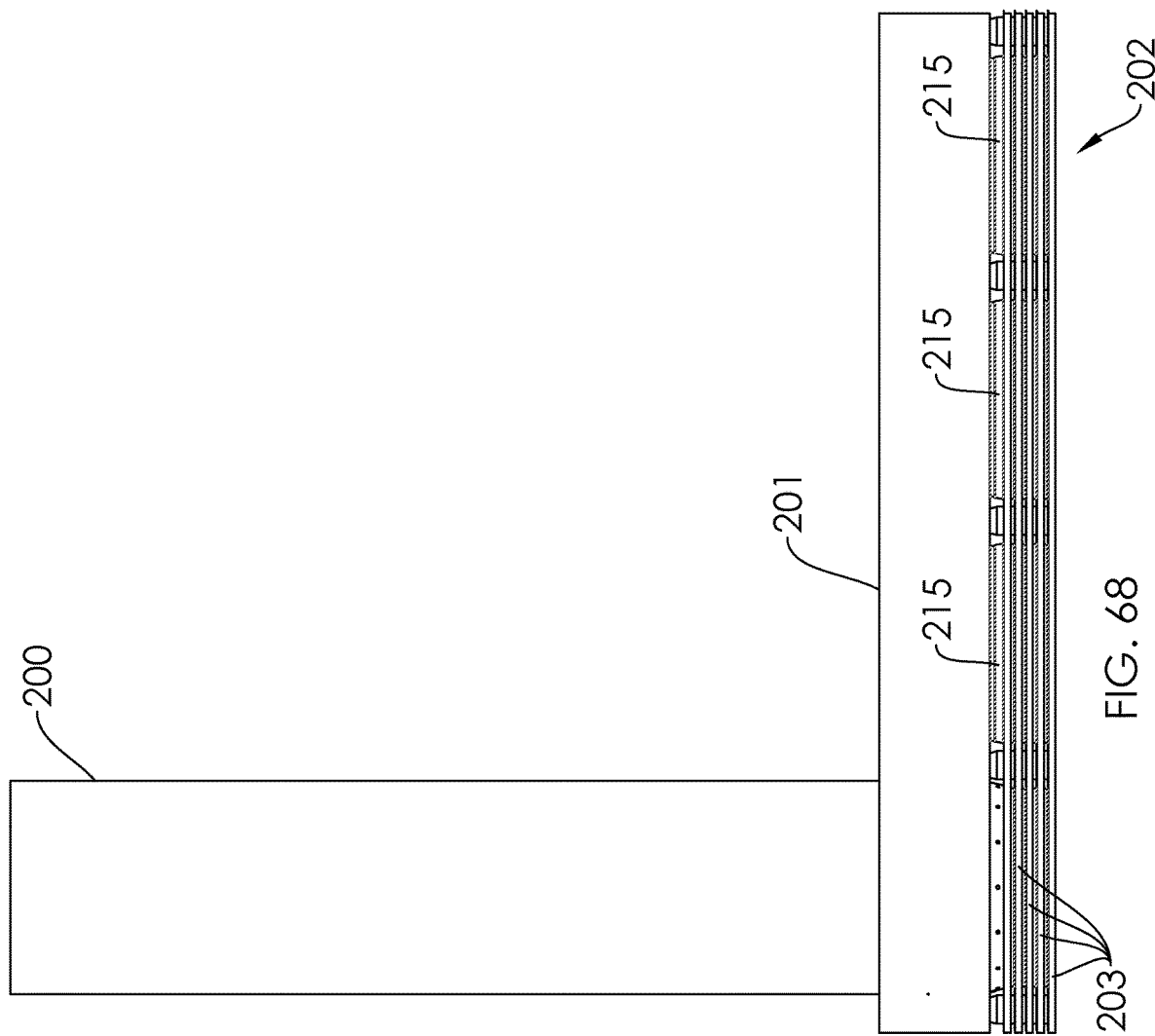

FIG. 68 is an elevational side view depiction of an alternative tool system according to the present invention for cutting lid bodies from stacked web sheets showing a tubular shaft, a shaft-receiving plate assembly, and a stack of web sheets.

Figure 69:
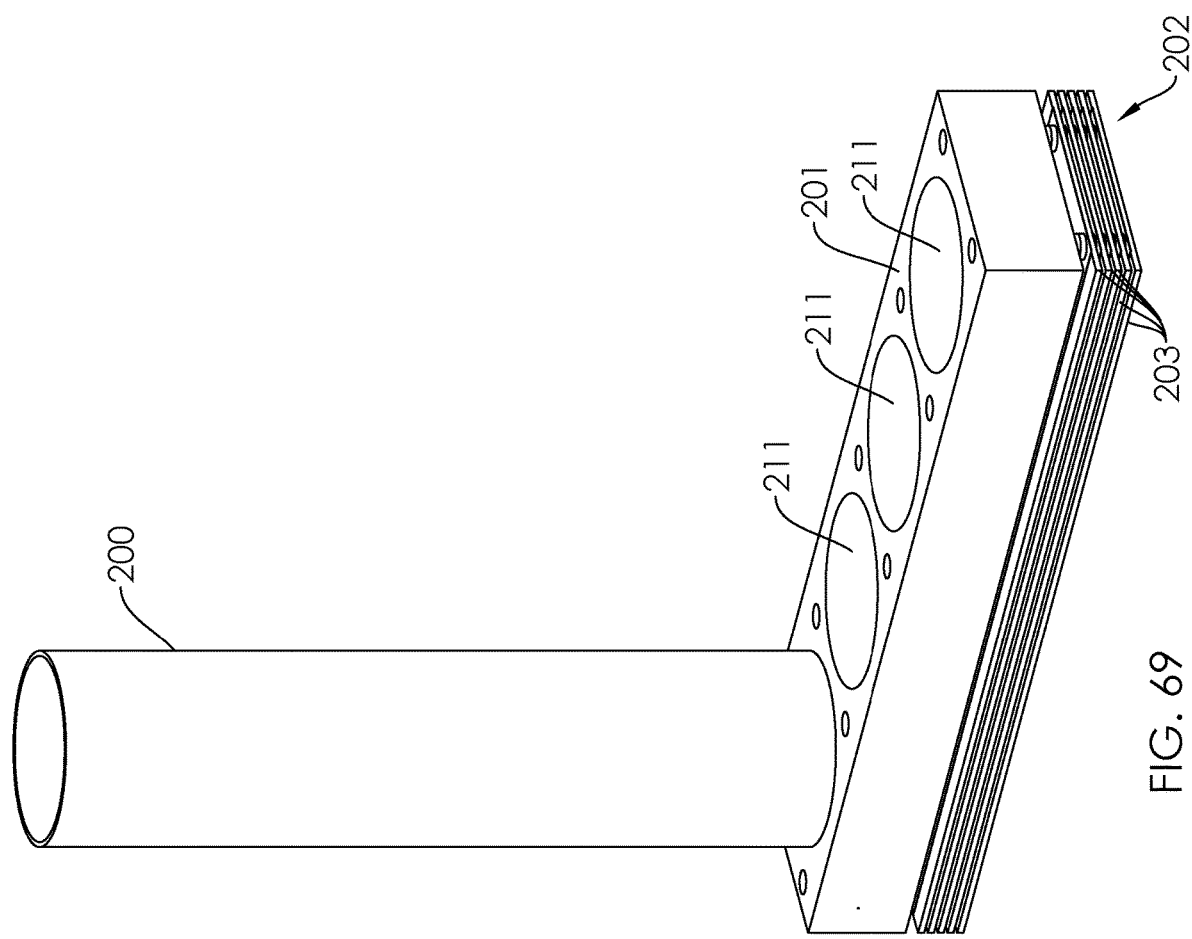

FIG. 69 is a first top perspective view of the alternative tool system according to the present invention for cutting lid bodies from stacked web sheets showing the tubular shaft, the shaft-receiving plate assembly, and the stack of web sheets.

Figure 70:
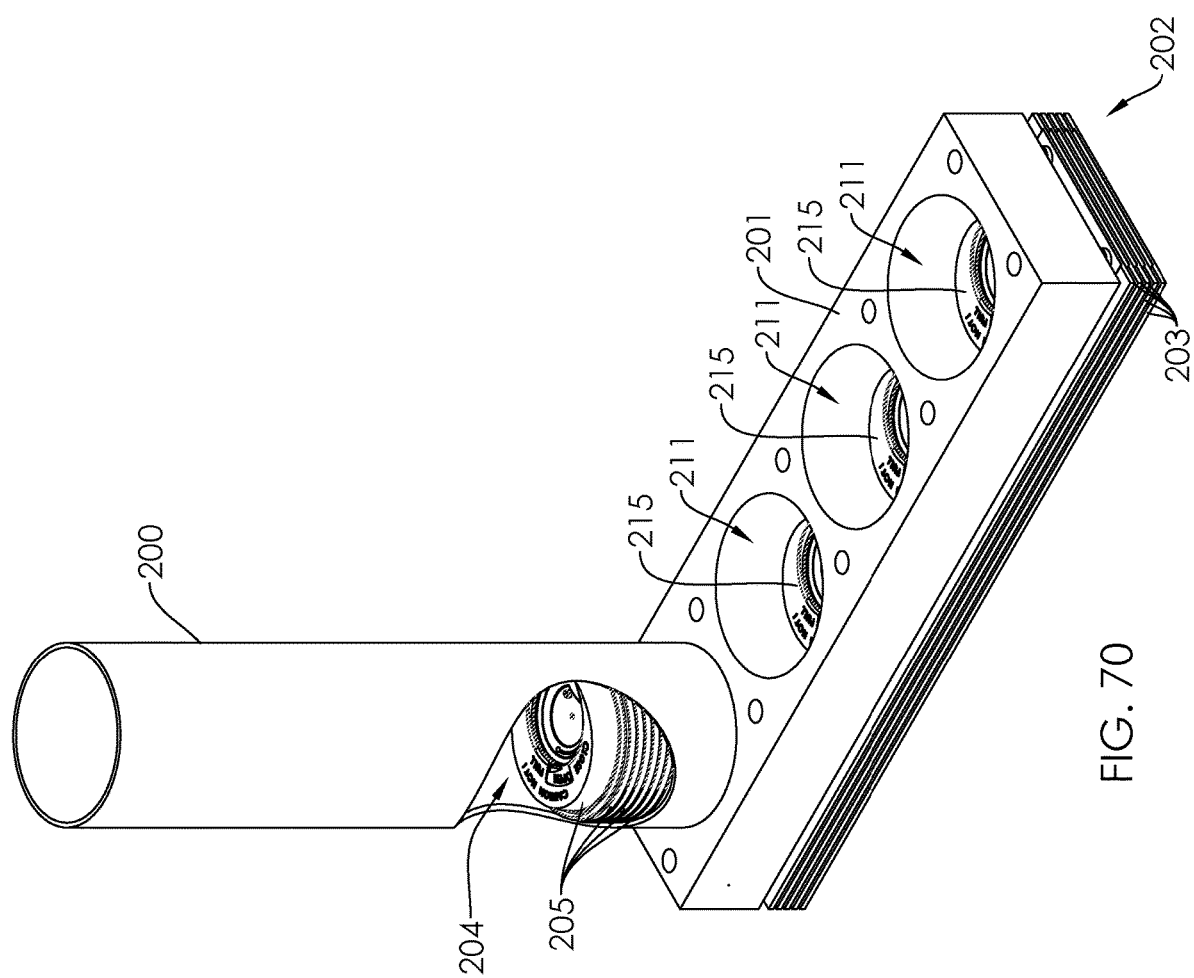

FIG. 70 is a second top perspective view of the alternative tool system according to the present invention for cutting lid bodies from stacked web sheets showing the tubular shaft with parts broken away to show an inner stack of cut lid formations; the shaft-receiving plate assembly, and the stack of web sheets with workpieces.

Figure 71:
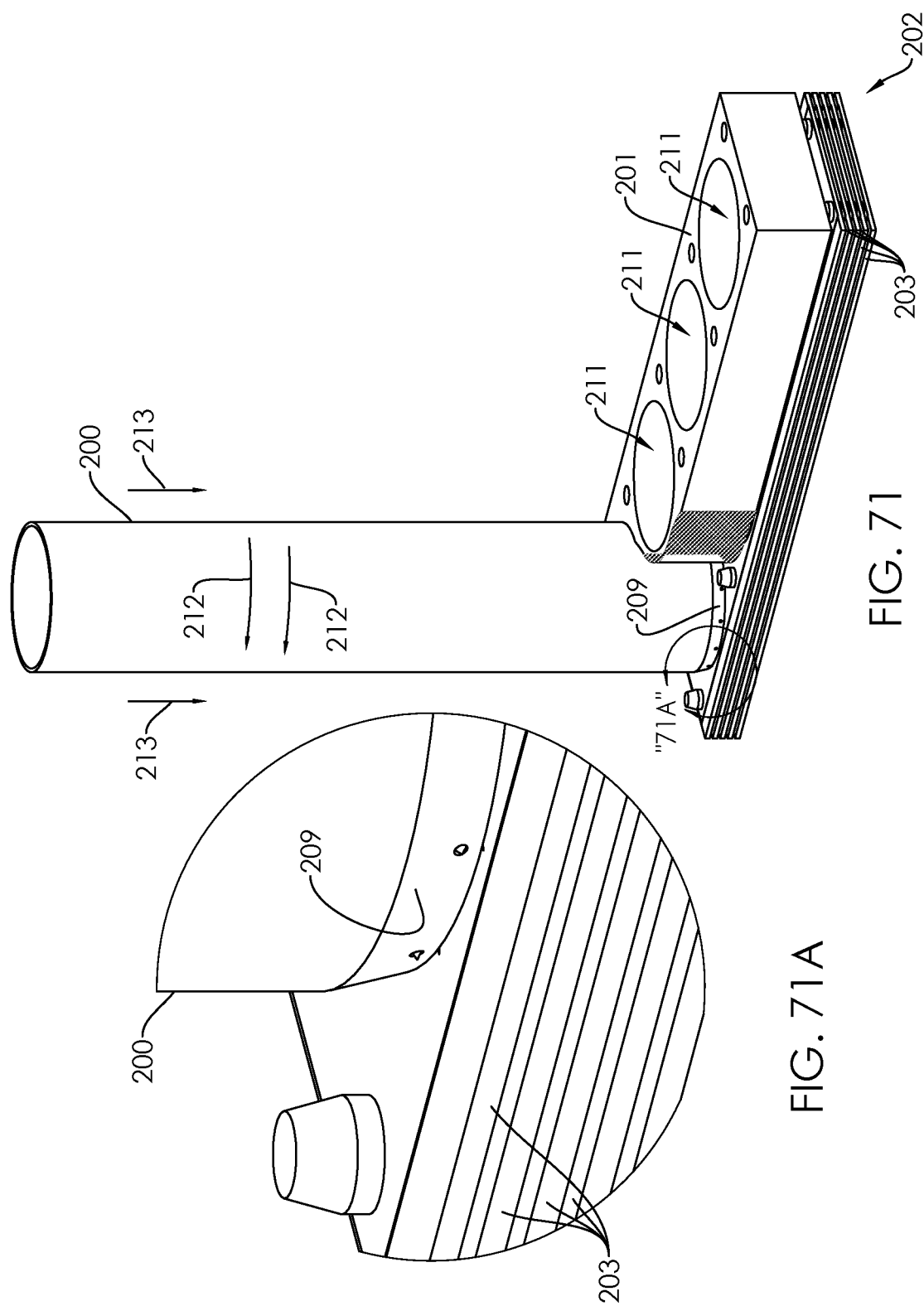

FIG. 71 is a third top perspective view of the alternative tool system according to the present invention for cutting lid bodies from stacked web sheets showing the tubular shaft; the shaft-receiving plate assembly with parts broken away to show the end of the tubular shaft; and the stack of web sheets.

FIG. 71A is an enlarged, fragmentary sectional view as enlarged and sectioned from FIG. 71 to show in greater clarity the end of the tubular shaft engaging an upper most web sheet from the stack of web sheets.

Figure 72:
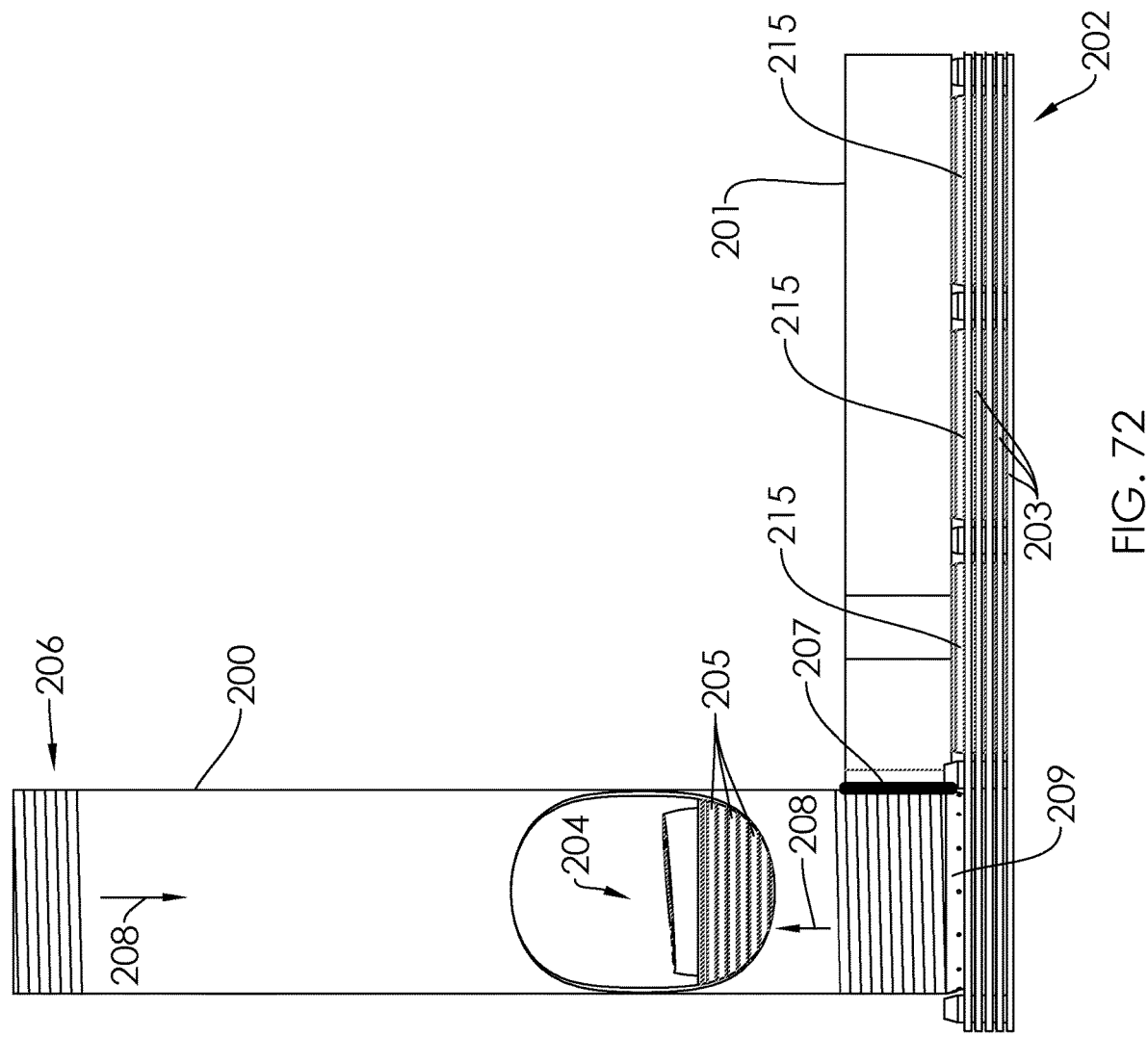

FIG. 72 is a first sequential side view depiction of the alternative tool system according to the present invention for cutting lid bodies from stacked web sheets showing the tubular shaft with parts broken away to show an inner stack of cut lid formations and external threads; a shaft-receiving plate assembly with parts broken away to show the end of the tubular shaft and a stack of web sheets positioned in inferior adjacency to the shaft-receiving plate assembly.

FIG. 73 is a second sequential side view depiction of the alternative tool system according to the present invention for cutting lid bodies from stacked web sheets showing the tubular shaft with parts broken away to show an inner stack of cut lid formations and external threads; a shaft-receiving plate assembly; and a stack of web sheets positioned in inferior adjacency to the shaft-receiving plate assembly, the end of the tubular shaft having been driven through the stack of web sheets via the shaft-receiving plate assembly.

FIG. 74 is a side view depiction of the tubular shaft positioned relative to a fragmentary shaft-receiving plate assembly with parts broken away to show the end of the tubular shaft as positioned in superior adjacency to a stack of web sheets.

FIG. 74A is an enlarged sectional view as enlarged and sectioned from FIG. 74 to show in greater clarity the end of the tubular shaft outfitted with a cutting implement for cutting through the stack of web sheets FIG. 75 is a side view depiction of the tubular shaft of the alternative tool system according to the present invention.

FIG. 75A is an enlarged sectional view as enlarged and sectioned from FIG. 75 to show in greater clarity the end of the tubular shaft outfitted with a cutting implement for cutting through a stack of web sheets.

Figure 76:
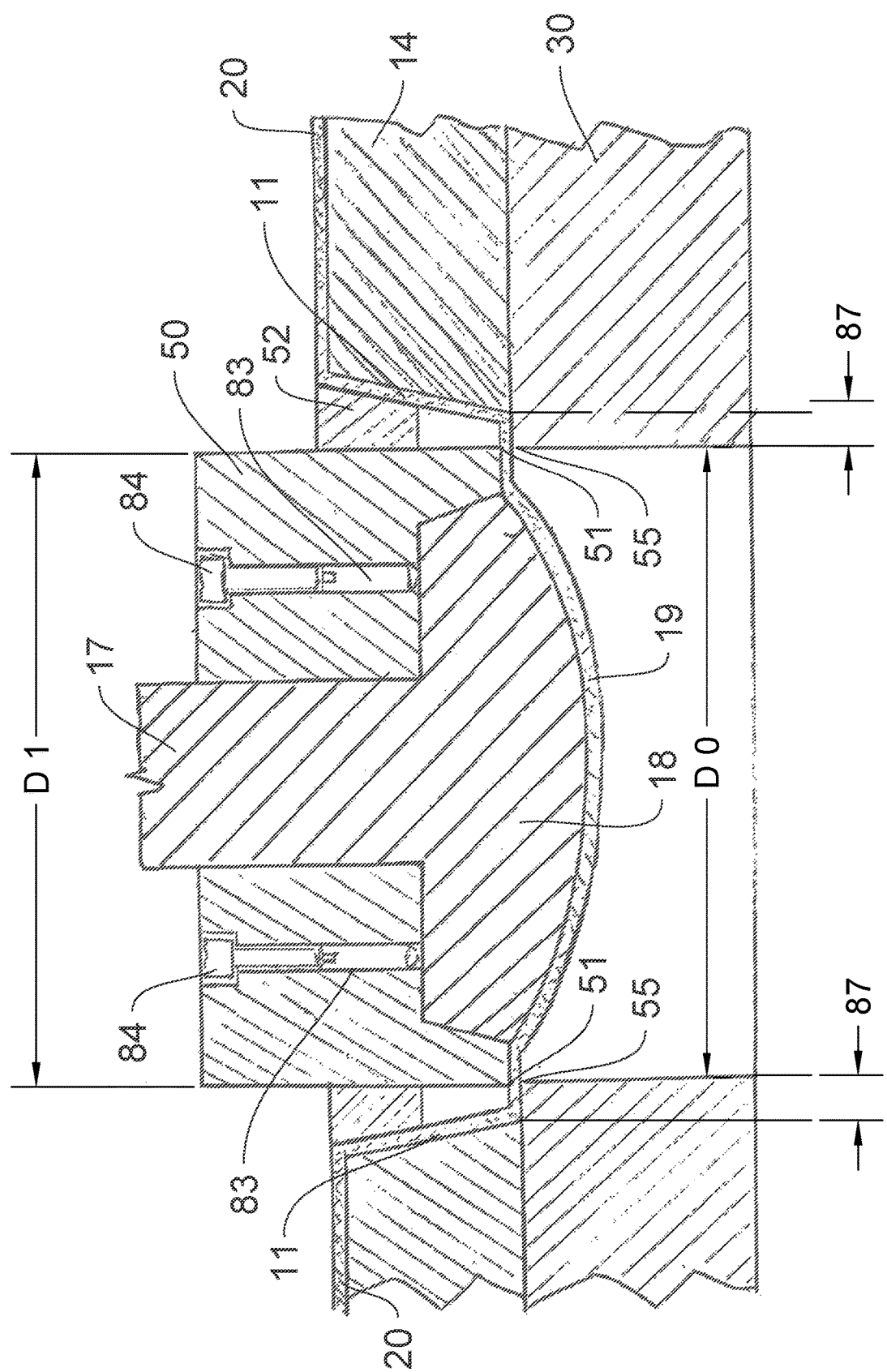

FIG. 76 is an enlarged first sequential schematic depiction of a compactor head adjustment mechanism according to the present invention, the adjustment mechanism being shown before the compactor head is adjusted.

Figure 77:
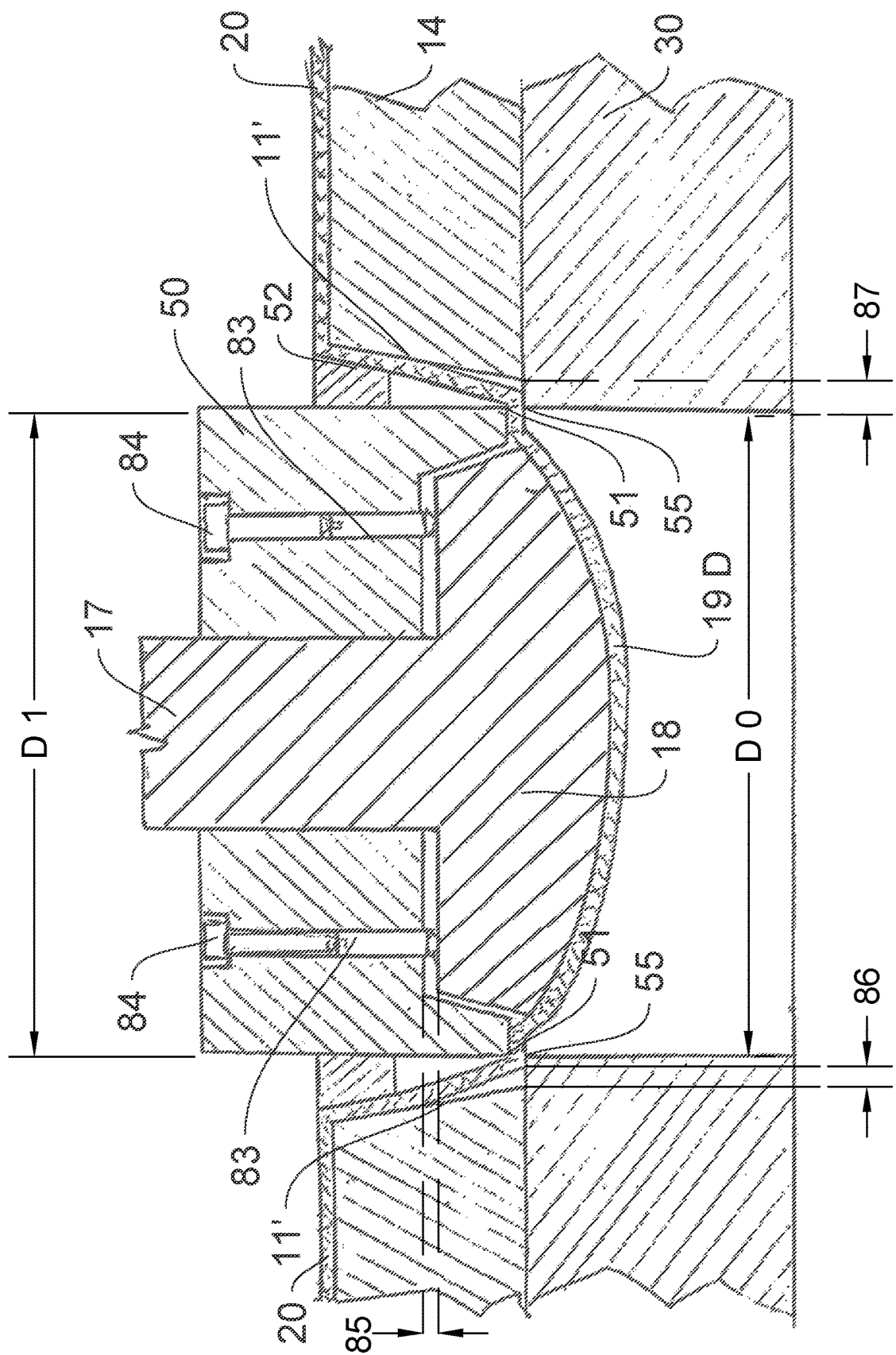

FIG. 77 is an enlarged second sequential schematic depiction of the compactor head adjustment mechanism according to the present invention, the adjustment mechanism being shown after the compactor head is adjusted.

Figures 78, 79:
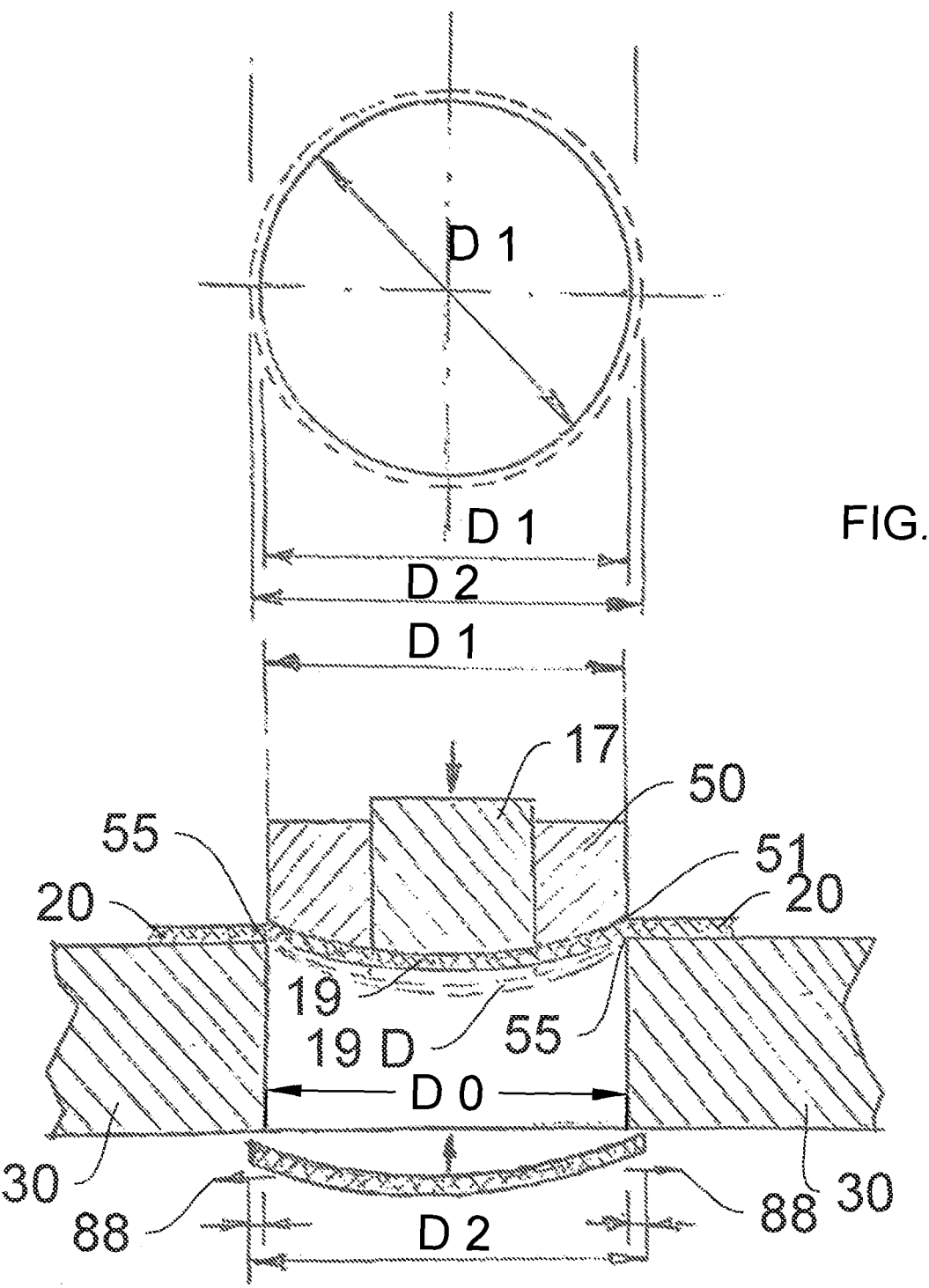

FIG. 78 is a top depiction showing relative diameters of a resilient upper lid body or disk material construction in both actuated and relaxed states.

FIG. 79 is a schematic depiction of an actuated upper lid body or disk being removed from a disk-guiding shaft and returning to a relaxed material configuration from an actuated (compressed) material configuration.

DETAILED DESCRIPTION OF THE PREFERRED SYSTEM AND METHODOLOGY

Referring now to the drawings with more specificity, the following specifications generally describe certain systemic production line arrangements and methods of forming composite articles or two-workpiece assemblies supported thereby as well as certain methods for precision part adjustments, including part trimming methods. The production line arrangements and methods of composite article formation according to the present invention preferably involve single station or so-called "all-in-one" assembly station methodology whereby a continuous web 20 carries web blanks through a thermoforming station 100 for forming lower lid bodies or primary lid formations as at 10 and upper lid bodies or disks as at 19 (i.e. first and second workpieces 10 and 19, respectively).

The upper lid bodies or disks 19 are carried by a support cone carrier element 11 (the support cone carrier element with attached disk element 19 is referenced at 11). The upper lid bodies or disks 19 are insertable into the lower lid bodies or primary lid formations 10 for assembly into lid assemblies 13. The upper lid bodies or disks 19 are removed from the web 20 via the single station assembly methodology as carried by the support cone carrier element 11. Once the disks 19 are removed from the support cone carrier element 11, the support cone carrier element is referenced at 12 as generally illustrated and referenced in introductory FIGS. 1 and 2.

Before entry into the all-in-one assembly station, the lower lid bodies or primary lid formations 10 and/or upper lid bodies or disks 19 may preferably be directed through a pre-punch station as at 101 for die-cutting or punching sip holes, air vents, or other secondary apertures therein. The lower lid bodies or primary lid formations 10 and the upper lid bodies or disks 19, supported and carried by the support cone carrier elements 11, are arranged on the web 20 in spaced relation to one another in an alternating manner as generally depicted in FIGS. 1, 2, 4, 7, 11, 12, 13, 14, 17, 19, 22, and 25. The web 20 carrying the lower lid bodies or primary lid formations 10 and the upper lid bodies or disks 19 is preferably directed through a loop mechanism 102 in certain preferred embodiments such that alternating lower lid bodies or primary lid formations 10 and upper lid bodies or disks 19 are directed into axial alignment (as at assembly alignment axis 110) with one another for assembly of the upper lid bodies or disks 19 into the lower lid bodies or primary lid formations 10 during a single cutting and disk-to-lid insertion movement.

In this regard, and central to the practice of the present invention, is a substantially simultaneous, dual-action (with sequential momentary delays as may be required), cut-from-web and disk-to-lid or workpiece to workpiece assembly step. In other words, when the upper lid body or disk 19 is cut from the web 20, it is directed (e.g. pushed (i.e. not carried)) into assembled relation with the lower lid body or primary lid formation 10 also being separated (e.g. cut) from the web 20 during one clap-like, to-and-fro, or back and forth tooling movement within the all-in-one assembly station(s) according to the present invention.

As prefaced above, the upper lid bodies or disks 19 are never carried for later assembly with the lower lid bodies or primary lid formations 10, but directed axially after being removed from the web 20 into assembled relation with the lower lid bodies or primary lid formations 10. The assembled lower lid bodies or primary lid formations 10 and upper lid bodies or disks 19 thus form lid assemblies 13, which lid assemblies 13 are collected and preferably directed into a stacked relation or manner as generally depicted in FIGS. 1, 2, 4, 7, 11, 12, 14, 17, 19, 22, and 25 for packaging purposes. These basic production line principles are generally demonstrated in introductory FIGS. 1 and 2.

After the dual cutting-assembling action of the all-in-one assembly station(s), the disk-departed support cone carrier elements 12 (i.e. support cone carrier element without disk 19) of the web 20 continue in the web flow direction of the web 20 with disk-departed apertures as at 22 in alternating relation with lower lid body-departed apertures as at 23. A series of upper lid bodies or disks 19 and associated disk-departed apertures or disk holes 22; and lower lid bodies 10 and associated lower lid body-departed apertures or lid holes 23 are comparatively illustrated and referenced in FIGS. 27-37 as being circular in formation, but such circular shapes are exemplary for ease or brevity of illustration. Other aperture shapes are contemplated as falling within the ambit of these specifications and inventive concepts being described.

Further comparatively referencing FIGS. 1-6, the reader will there consider an introductory or first production line arrangement with a schematic side view depiction of a first all-in-one assembly station for punching+trimming+assembling+packaging lower lid bodies 10 and upper lid bodies 19 according to the present invention. The first exemplary production line arrangement shows a thermoforming station as at 100, a pre-trimming station as at 101 (for forming or punching sip holes, air holes, and/or other secondary aperture formations); and a first all-in-one assembly station for lower lid bodies or primary lid formations 10 and upper lid bodies or disks 19 (initially supported by support cone carrier elements 11) as arranged on the web 20 in alternating rows as otherwise variously and comparatively depicted in FIGS. 27-37.

It will be understood from a comparative consideration of FIGS. 27-37 that the present invention contemplates multiple variations of alternating rows of multiple lower lid bodies or primary lid formations 10 and upper lid bodies or disks 19 as well as singularly alternating rows of singular lower lid bodies or primary lid formations 10 and upper lid bodies or disks 19. For example, it is contemplated that five consecutive rows of lower lid bodies or primary lid formations 10 may alternate with a corresponding five consecutive rows of upper lid bodies or disks 19. Top perspective depictions of an exemplary upper lid body or disk 19 relative to an exemplary lower lid body or primary lid formation 10 are generally and comparatively depicted in FIGS. 38-40.

In such an arrangement, each print of five consecutive rows of lower lid bodies or primary lid formations 10 will advance through the disk-punching side of the all-in-one assembly station represented on the left side of FIGS. 1, 2, 3, and 4 and then flip over through the loop mechanism 102 to be indexed in at the lid side of the all-in-one assembly station shown on the right side. At the same time, a print of five consecutive rows of upper lid bodies or disks 19 may be indexed in on the disk-punching side of the all-in-one assembly station, shown on the left. Effectively, the all-in-one assembly station will align five consecutive rows of upper lid bodies or disks 19 against a corresponding five consecutive rows of lower lid bodies or primary lid formations 10.

Figure 3:
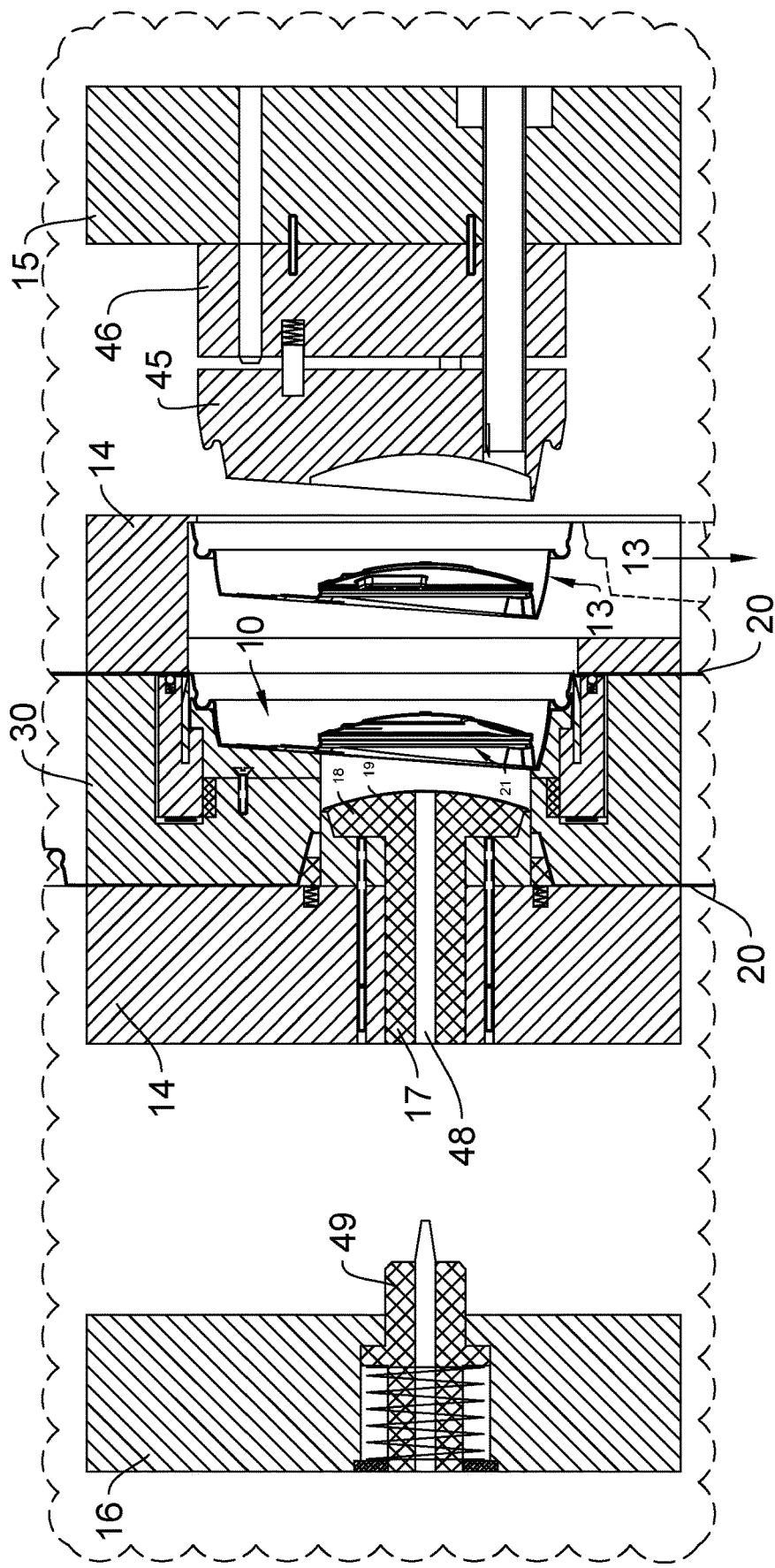
FIG. 3 is an enlarged schematic drawing as enlarged from FIG. 2 to more clearly show from left-to-right an outer plate, a first intermediate compactor plate, a main base plate, a second intermediate compactor plate, and an outer pin support plate of the first all-in-one assembly station according to the present invention.

Referencing FIG. 3, the reader will there consider a first representative all-in-one assembly station according to the present invention. The outer pin support plate 16 comprises a compactor push pin as at 49. The outer pin support plate 16 opposes a first intermediate compactor plate 14 with a compactor shaft 17 with a compactor head 18 in axial alignment with the compactor push pin 49. The compactor shaft 17 preferably comprises a compactor push pin vacuum/pressure access channel or tunnel 48. The first intermediate compactor plate 14 opposes a centrally-located immovable or stationary main base plate 30, which main base plate 30 is the site of upper lid body 19 to lower lid body 10 assembly via access opening 42 of the second intermediate compactor plate 14.

The second intermediate compactor plate 14 opposes the main base plate 30 and interfaces between the main base plate 30 and an outer plate 15 having a lid support base 46 and a lid support body 45. The reader will note that the (arcuate) disk 19 is insertable into a lid depression 21 (thermo) formed in the lower lid body 10 via the (arcuate) compactor head 18, which lid depression 21 comprises a rear or inner depression surface 40 (opposing a lid support depression top surface 41) and a top or outer depression surface. The compactor head 18 opposes inner or rear disk surface and the outer or frontal disk surface opposes the rear or inner depression surface when the lower lid bodies 10 and the upper lid bodies 19 are placed into axial alignment for forming lid assemblies 13.

Figure 4:
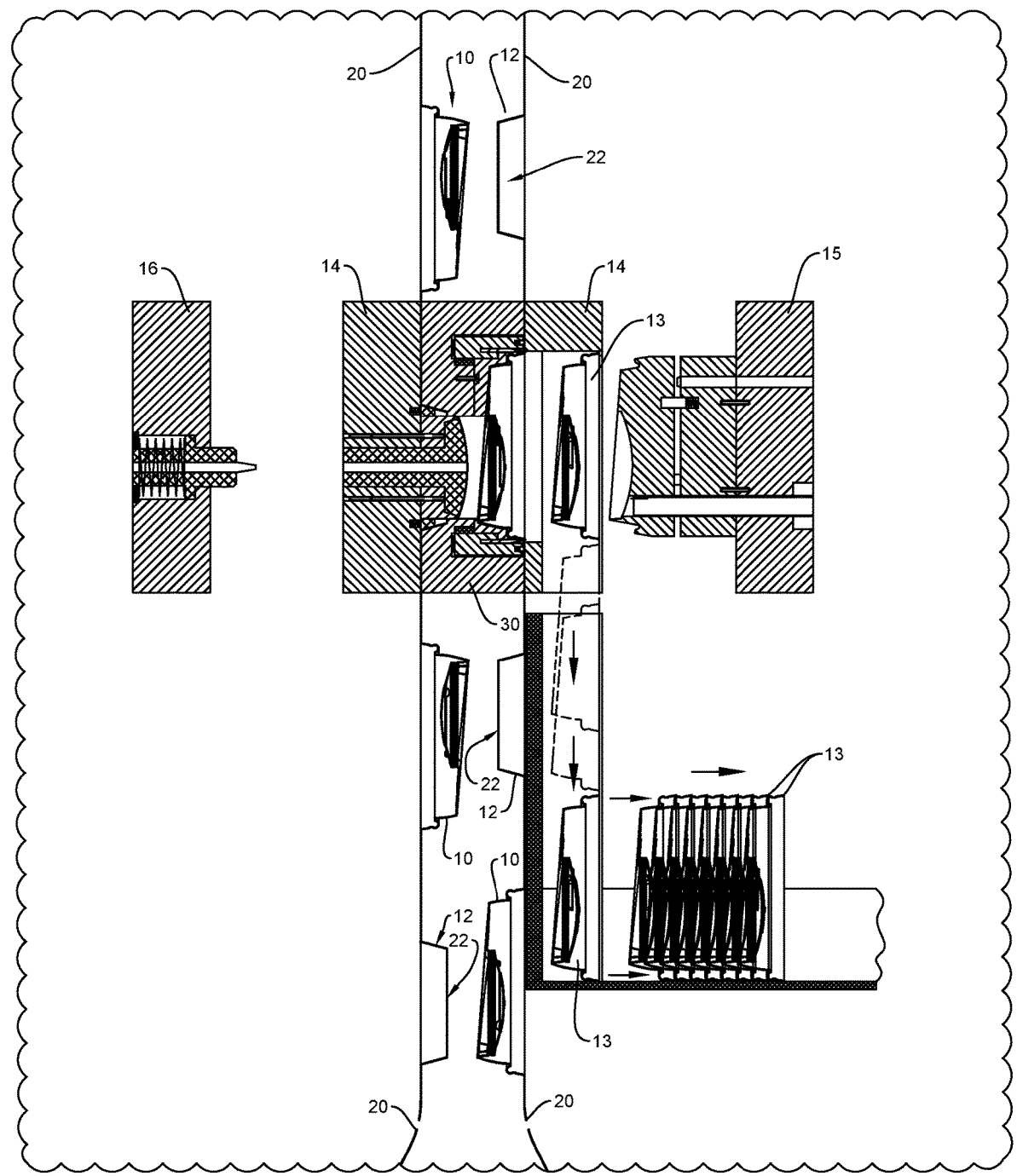
FIG. 4 is an enlarged schematic drawing as enlarged from FIG. 2 to more clearly show the outer plate, the intermediate compactor plates, the main base plate, and the outer pin support plate of the first all-in-one assembly station with web-directed elements and composite articles or lid assemblies being stacked according to the present invention.

Comparatively referencing FIGS. 3 and 4, the reader will further note that the (continuous) web 20 travels intermediate the first and second intermediate compactor plates 14 and the main base plate 30 for axially aligning the lower lid bodies 10 and the upper lid bodies or disks 19 within the assembly cavity of the main base plate 30, characterized by comprising a conical countersink chamber or portion as at 54, a disk-guiding shaft as at 56, and a lid nest as at 31. In the first exemplary production line arrangement, the web 20 travels in a first direction intermediate the first intermediate compactor plate 14 and the main base plate 30; loops as at loop mechanism 102; and travels in a second direction opposite the first direction intermediate the main base plate 30 and the second intermediate compactor plate 14. In the first production line arrangement depicted in FIG. 3, assembled lid assemblies 13 may exit the second intermediate compactor plate 14 and be directed to a packaging site or station of the all-in-one assembly station where successive lid assemblies 13 are further re-directed into stacked relation.

Figure 2:
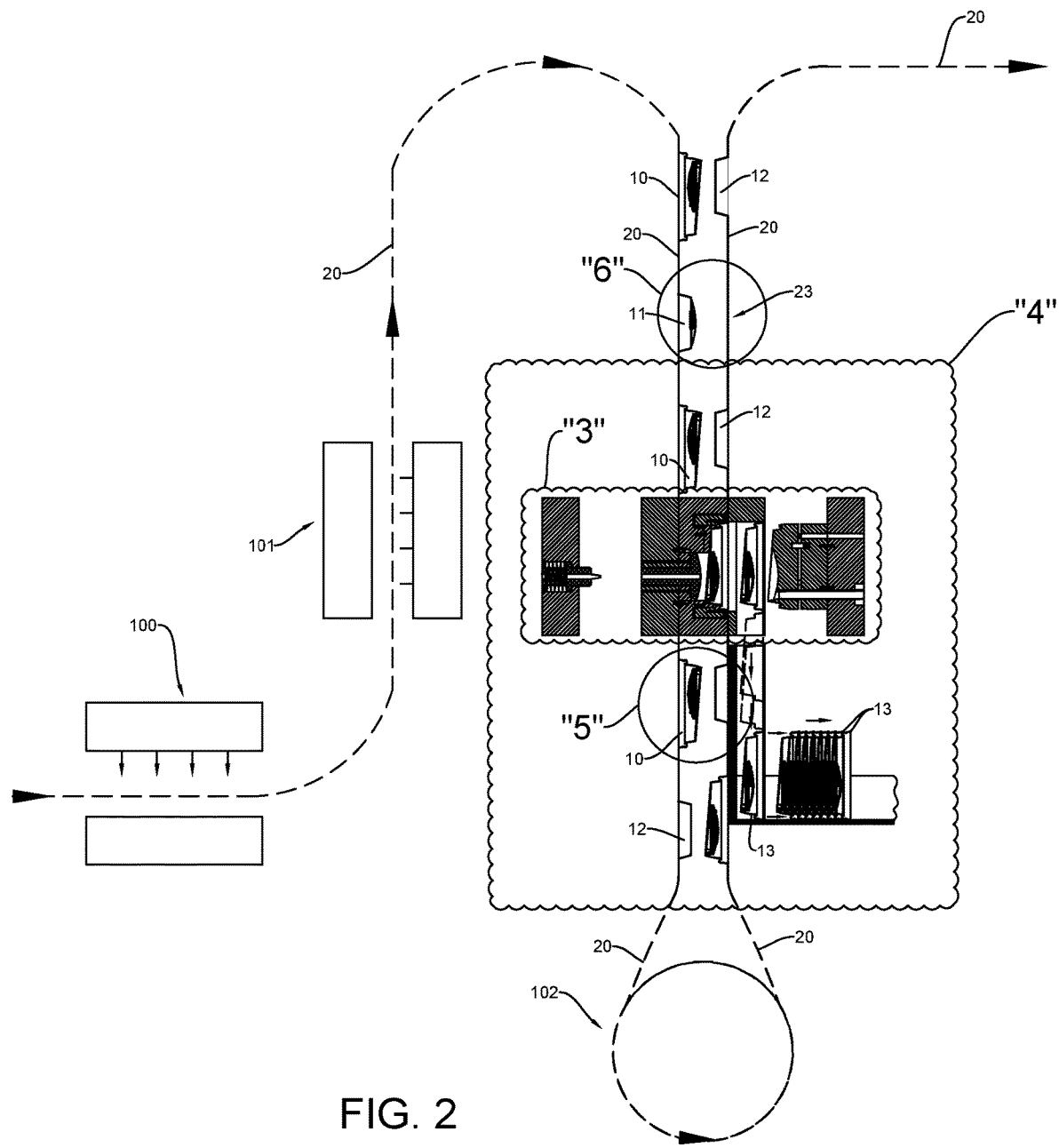
FIG. 2 is a schematic drawing showing the first introductory production line arrangement with a schematic side view depiction of the first all-in-one assembly station for trimming and assembling lower lid bodies and upper lid bodies according to the present invention, the first all-in-one assembly station being shown with parts removed for ease in understanding.
Figure 5:
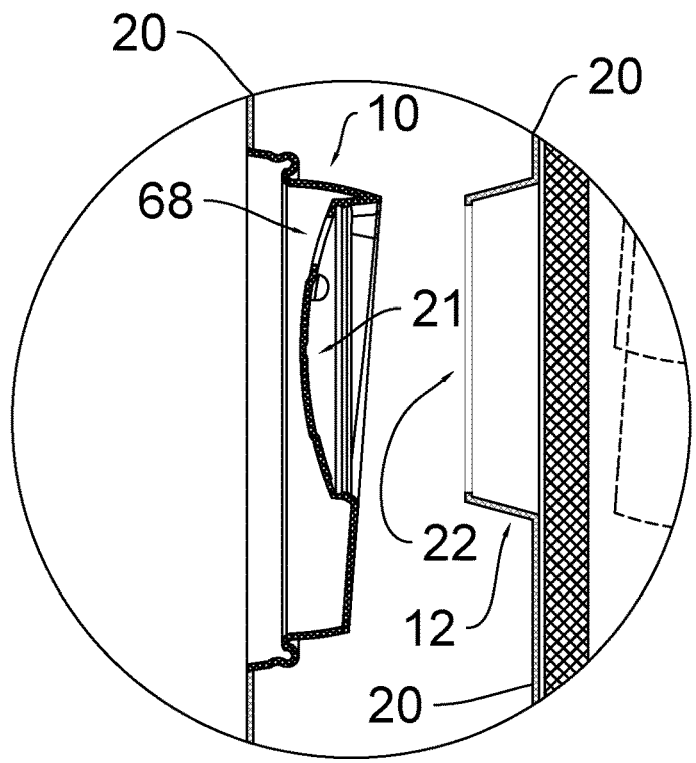
FIG. 5 is an enlarged schematic drawing as enlarged from FIG. 2 to more clearly show a downwardly-directed, web-attached lower lid body juxtaposed adjacent an upwardly-directed, post-cut, web-attached support cone carrier element with upper lid body removed therefrom.
Figure 6:
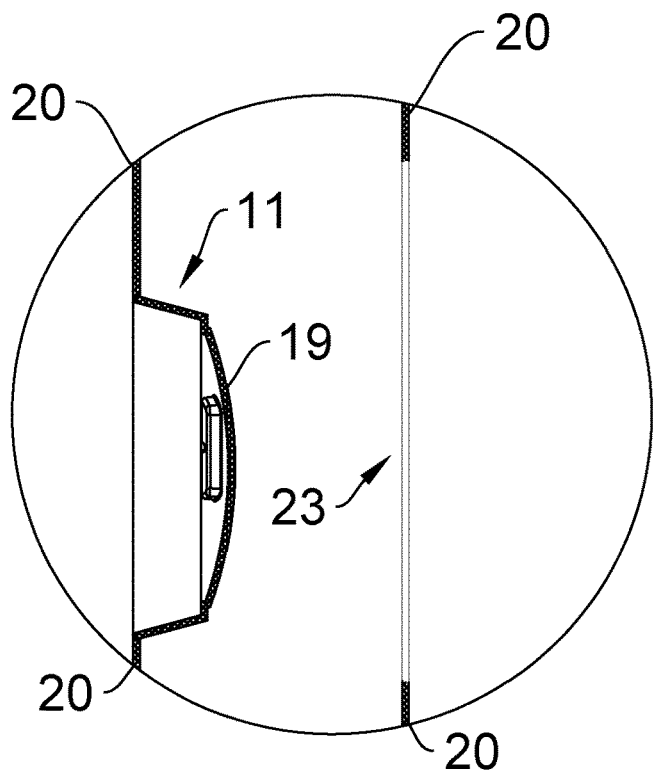
FIG. 6 is an enlarged schematic drawing as enlarged from FIG. 2 to more clearly show a downwardly-directed, web-attached support cone carrier element with upper lid body juxtaposed adjacent an upwardly-directed, post-cut, web-based lower lid body-departed aperture.

Comparatively referencing FIGS. 2 and 5, the reader will see that upper lid bodies or disks 19 traversing the first intermediate compactor plate 14 and main base plate 30 are removed from the support cone carrier elements 11 such that when support cone carrier elements 12 (without disks 19) traverse the loop mechanism 102 and pass lower lid bodies 10 just passing the first intermediate compactor plate 14 and main base plate 30, disk-departed apertures 22 are fleetingly in axial alignment with the lid depressions 21, which lid depressions 21 may be preferably provided with a lid sip hole 68 as preferably pre-punched via the pre-punch station 101. Comparatively referencing FIGS. 2 and 6, the reader will see that support cone carrier elements 11 (with disks 19) prior to entry through the first intermediate compactor plate 14 and main base plate 30 are fleetingly in axial alignment with lower lid body-departed apertures 23 formed after assembly of the lid assemblies 13.

Comparatively referencing FIGS. 7-10, the reader will consider a second production line arrangement with a schematic side view depiction of a second all-in-one station for punching+trimming+assembling+packaging lower lid bodies or primary lid formations 10 and upper lid bodies or disks 19 according to the present invention. The second production line arrangement according to the present invention provides two thermoforming stations 100 and two pre-trimming or pre-punching stations 101 (for forming or punching sip holes, air holes, and/or other secondary aperture formations) with two webs 20 (e.g. differently colored webs 20) being directed therethrough in a uniform direction from opposite sides of the same all-in-one assembly station thereby eliminating the loop mechanism 102.

The second production line arrangement according to the present invention is believed highly beneficial for high volume production in which composite articles or two-piece lid assemblies 13 are provided in two alternating colors (i.e. lower lid bodies or primary lid formations 10 provided with first coloration and upper lid bodies or disks 19 provided with second coloration different than the first coloration). For example, the application may call for white lower lid bodies or primary lid formations 10 with black upper lid bodies or disks 19, and vice versa. If a first thermoforming station 100 forms lower lid bodies 10 and upper lid bodies 19 from a web 20 with first coloration, the second thermoforming station 100 may form lower lid bodies 10 and upper lid bodies 19 with second coloration.

Figure 7:
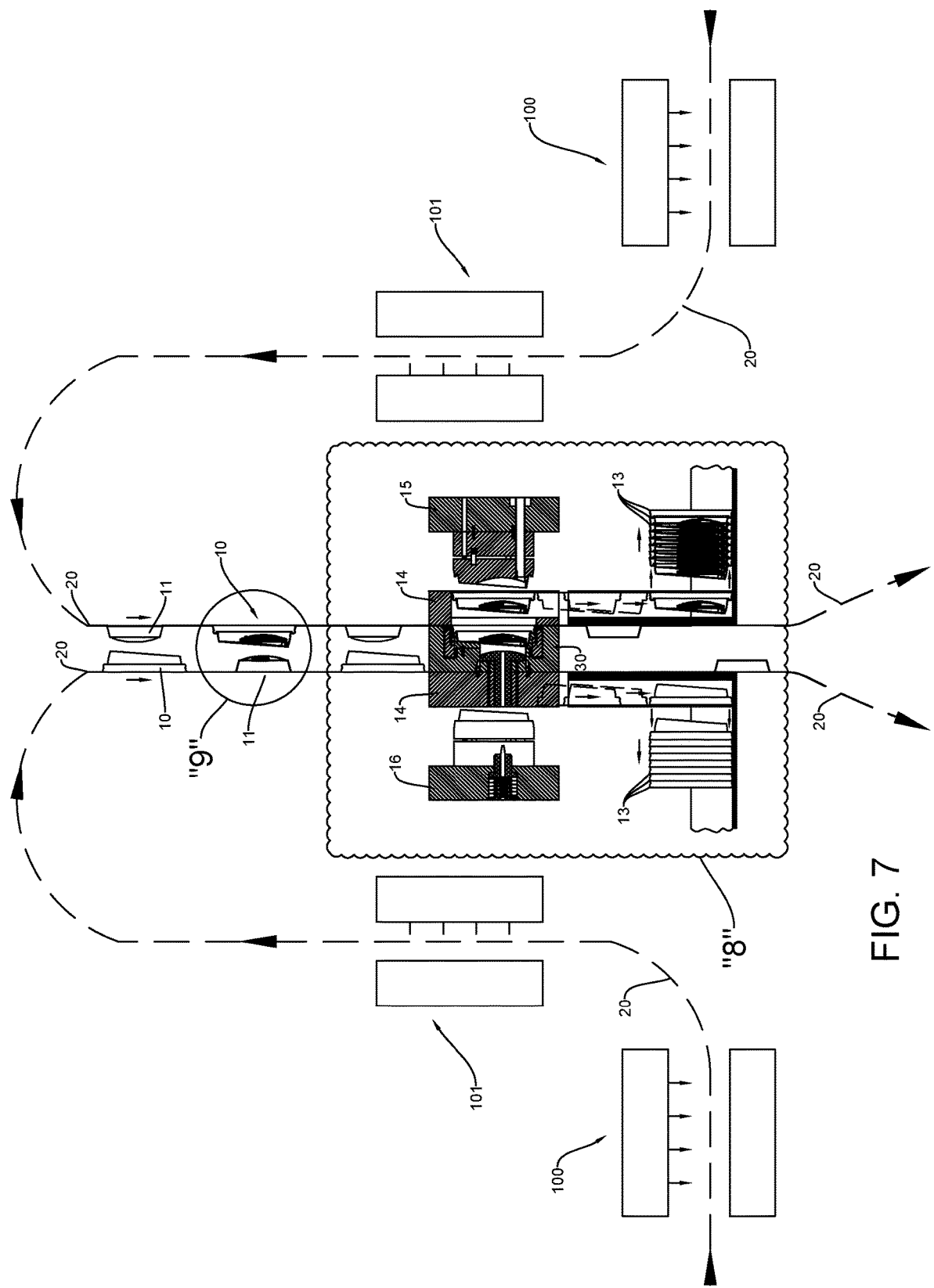
FIG. 7 is a schematic drawing showing a second production line arrangement with a schematic side view depiction of a second all-in-one assembly station for punching+trimming+assembling+packaging lower lid bodies and upper lid bodies according to the present invention.
Figure 8:
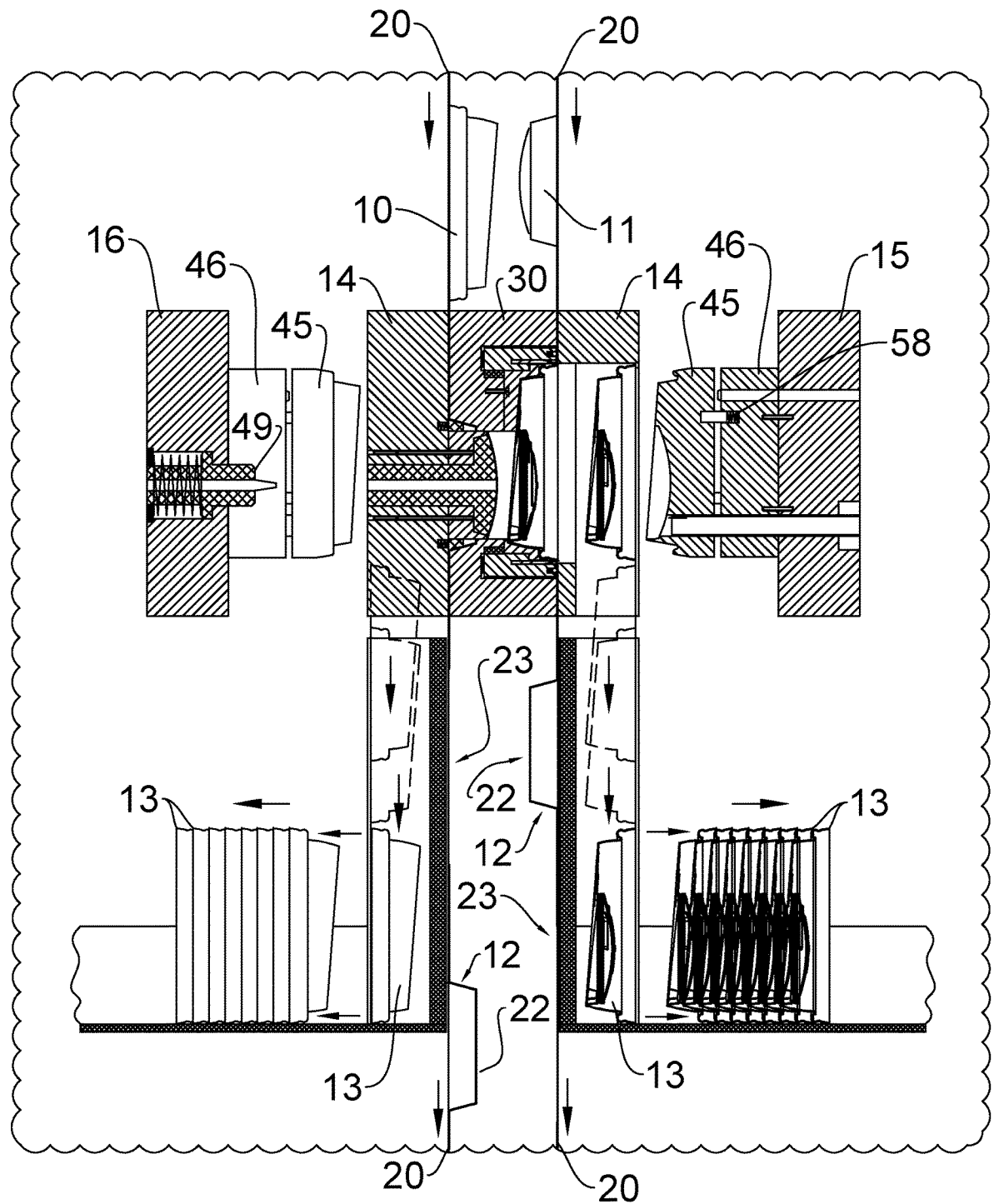
FIG. 8 is an enlarged schematic drawing as enlarged from FIG. 7 to more clearly show the second all-in-one assembly station with first and second uniformly-directed webs being directed therethrough according to the present invention.
Figure 9:
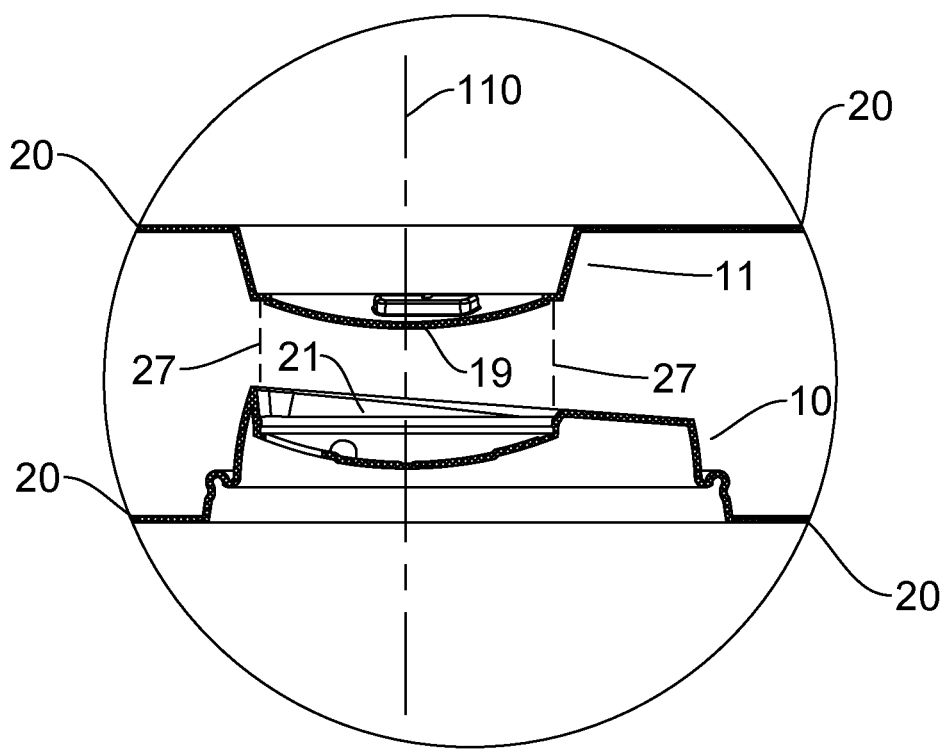
FIG. 9 is an enlarged schematic drawing as enlarged from FIG. 7 to more clearly show a web-attached lower lid body in axial alignment with a web-attached, support cone carrier element-supported upper lid body.

Comparatively referencing FIGS. 7 and 9, the reader will see that a support cone carrier element 11 (with upper lid body or disk 19) of a first web 20 and a lower lid body 10 of a second web 20 opposite the first web 20 are positioned into fixed axial alignment (as at assembly alignment axis 110) as both the upper lid body 19 and lower lid body 10 traverse the first and second intermediate plates 14 and the main base plate 30 for disk-to-lid assembly. FIG. 8 further introduces the lid support body 45 as structurally situated atop the lid support base 46 via springs 58, and as connected to the outer plate 15. Comparatively referencing FIGS. 9 and 10, the reader will preliminarily consider a disk die opening limit as at 47 and the disk-guiding shaft as at 56 formed in the main base plate 30 for enhancing axially aligned delivery of the disk 19 into the lid depression 21. It is contemplated that the all-in-one assembly station(s) according to the present invention are so productive as to adequately serve two high-speed thermoforming stations 100 simultaneously. In this regard, it is noted that bottlenecking within state-of-the-art thermoforming processes does not occur at the thermoforming stations, but rather at the subsequent trimming and assembly stations down-web.

Figure 11:
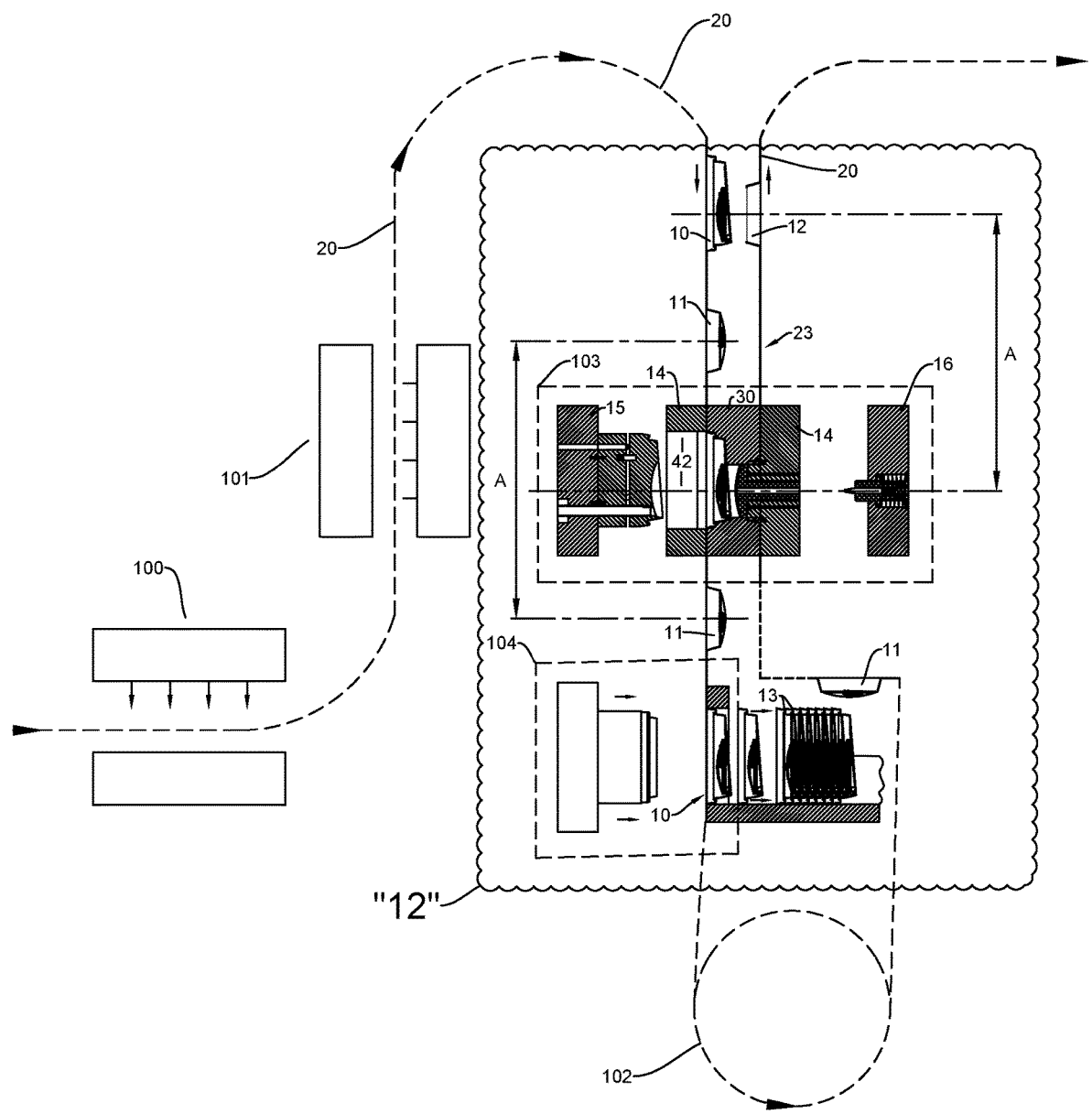
FIG. 11 is a schematic drawing showing a third production line arrangement with a schematic side view depiction of a third all-in-one assembly station for punching-assembling lower lid bodies and upper lid bodies and a separate packaging station for trimming and packaging composite articles or lid assemblies according to the present invention.
Figure 12:
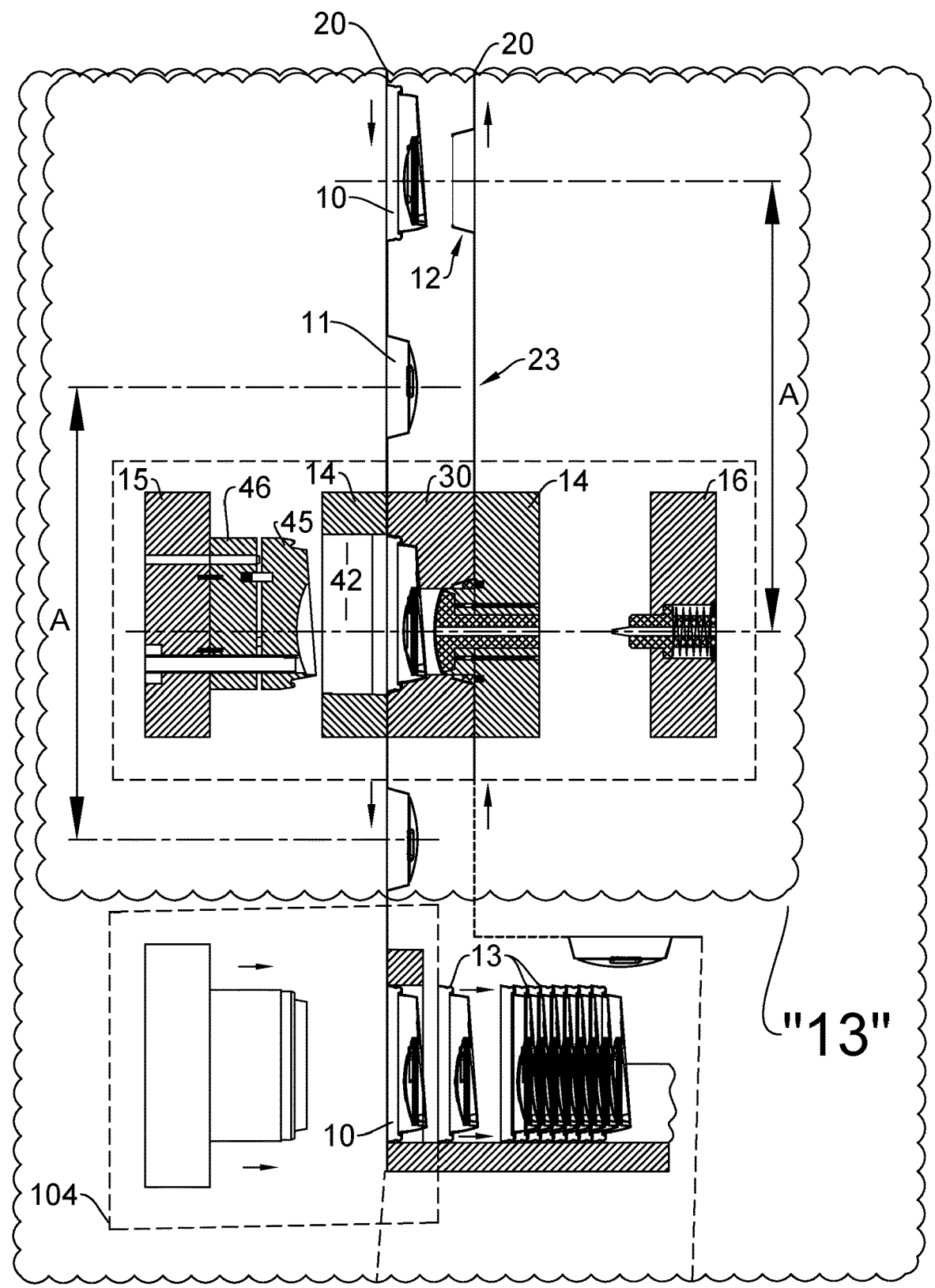
FIG. 12 is an enlarged schematic drawing as enlarged from FIG. 11 to more clearly show the third all-in-one assembly station for punching-assembling lower lid bodies and upper lid bodies and a separate packaging station for trimming and packaging the composite articles or lid assemblies.
Figure 13:
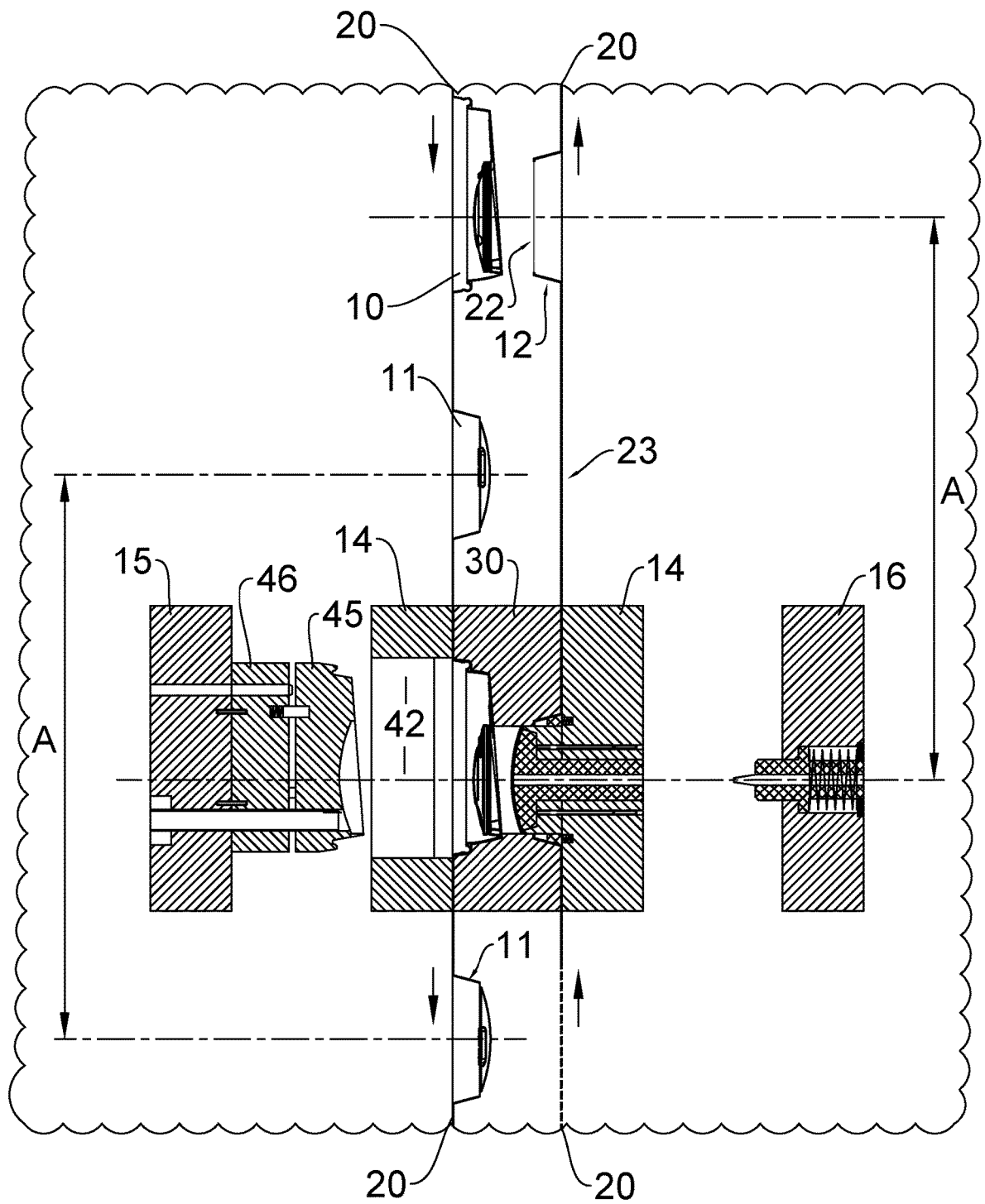
FIG. 13 is an enlarged schematic drawing as enlarged from FIG. 12 to more clearly show the third all-in-one assembly station for punching-assembling lower lid bodies and upper lid bodies with web-directed elements.

Referencing FIGS. 11-13, the reader will there consider a third production line arrangement according to the present invention showing a third all-in-one assembly station as at 103 for punch-assembling lower lid bodies 10 and upper lid bodies 19 and a separate packaging station as at 104 for trimming and packaging assembled two-piece lid assemblies 13. In other words, the production line arrangement generally depicted in FIG. 11-13 shows assembled lid assemblies 13 firstly trimmed using the basic punch and die method as a separate assembly station located on the way to the loop mechanism 102 after the upper lid body or disk 19 is simultaneously punched-inserted into the lower lid body or primary lid formation 10 lid via the all-in-one assembly station 103.

In this regard, the reader will note that web 20 with upper lid bodies or disks 19 being carried by support cone carrier elements 11 proceeds through the loop mechanism 102 to flip over and feeds into the opposite side of all-in-one assembly station 103 for subsequent and simultaneous punching and insertion of the upper lid bodies or disks 19 into the lower lid body or primary lid formations 10. The second trimming-packaging station 104 receives assembled lid assemblies 13 from the web 20 after being processed by the all-in-one assembly station 103.

In other words, the all-in-one assembly station 103 punches the upper lid body or disk 19 from the support cone carrier element 11 thereafter assembling the upper lid body or disk 19 into the lower lid body or primary lid formation 10 while still on the web 20 or web-attached after advancing through the loop mechanism 102. The dual action die-cut and directed movement of the upper lid body or disk 19 into engagement with the lid depression 21 of the lower lid body or primary lid formation 10 allows for increased efficiency of assembling the upper lid bodies or disks 19 into the lower lid bodies or primary lid formations 10 without the requirement for temporarily holding or carrying the disk 19 and/or moving it by changing directions as generally described by state-of-the-art systems and methods.

Referencing FIGS. 14-25, the reader will there consider certain production lines according to the present invention whereby the all-in-one assembly stations separate the lower lid bodies or primary lid formations 10 and upper lid bodies or disks 19 from the web 20 utilizing punch and die methods as opposed to certain circular knife methodology otherwise practiced, in part, by the all-in-one assembly stations depicted in FIGS. 1-10 discussed in more detail later in these specifications. Lower lid body 10 and upper lid body 19 web arrangements (with associated aperture arrangements) depicted in FIGS. 14-25 are further generally and variously depicted in various plan views in FIGS. 27-31 and 33-37 with perspective views being presented in FIGS. 32 and 32A.

The embodiments depicted in FIGS. 14-25 show methods of trimming assembled lid assemblies 13 by the punch and die incorporated into all-in-one assembly station(s). One of the structural reasons it is possible to incorporate a punch and die method of trimming into the all-in-one assembly stations depicted in the FIGS. 14-25 set of drawings is because all relevant parts (e.g. the lower lid bodies 10, the upper lid bodies 19; the intermediate compactor plates 14, the outer plates 15, the outer pin support plates 16, the main base plate 30, the compactor shaft 17, and the compactor head 18) are tightly aligned and in a pressed-against-each other state as perhaps most clearly depicted in FIG. 23.

The die-cut type lid trimming process begins when the web 20 is immovably pressed between the intermediate compactor plates 14 and the main base plate 30. The upper lid body or disk 19 is trimmed-inserted into the lower lid body or primary lid formation 10. The lid punch 60 is attached to the outer plate 15 and the lid support body 45 is suspended via springs 58 on the top of the lid punch 60 as generally depicted in FIGS. 14-23. The outer plate 15 with lid punch 60 moves towards the second intermediate compactor plate 14 and the lid punch 60 with lid support body 45 passes through access opening 42 of plate 9. The prepositioned lower lid body 10 on the web 20 is pressed into countersink-shaped lid nest 31 by the conically shaped lid support body 45.

The combination of conically shaped walls of the lid support body 45, as suspended from the lid punch 60 on springs 58, allows the lid support top surface 33 and the lid support rim top 35 to touch corresponding surfaces of the lid top rear surface 38 and lid ring rear surface 36 before the lid top outer surface 39 touches the lid nest ceiling 32. The lid rim outer surface 37 touches the lid nest rim surface 34 before the web 20 is securely pressed between the main base plate 30 and the second intermediate compactor plate 14.

The precision adjustment of alignment happens the moment before the lower lid body 10 and the web 20 are immovably pressed between the main base plate 30 and the second intermediate compactor plate 14 and the lid punch 60 is pressed against the back surface of the lower lid body 10 and the lid punch 60 cutting edge 61 is pressed against the lid edge perimeter 62. The lid punch 60 trims the lower lid boy 10 out of the web 20 and pushes it to the limit of lid die opening 65 at the same time pressing the lower lid body 10 further into the lid nest 31.

The trimmed lid assembly 13 is immovably pressed between the lid nest surface 31 and the surface of lid support body 45 and the springs 58 are compressed and the lid punch 60 is pressed against the bottom of the lid support body 45. The upper lid body or disk 19 is trimmed and pushed by the compactor head 18 into the lid depression 21 as generally depicted and referenced in FIGS. 19-21. At that moment the outer plate 15 with lid punch 60 and suspended lid support body 45 reverses direction and starts moving back.

Simultaneously, the compactor shaft 17 continues advances forward until compactor head 18 pushes the lid edge perimeter 62 of the trimmed lid assembly 13 beyond the plane of the web 20 through lower lid body-departed aperture 23 (the lid hole or lower lid body-departed aperture 23 is formed on the web 20 after the lower lid body 10 is punched therefrom) to the compactor's assembly push limit 25 of the compactor shaft 17 as generally depicted in FIG. 21 at broken line C. The compactor moving distance is from line A to line D in FIGS. 23 and 24.

The reader will note that the final push to the limit 64 as depicted in FIGS. 23 and 24 (at distance Y as further referenced in FIG. 58) is only needed if the lower lid body 10 (to form lid assembly 13) is punched out with conventional punch and die method as described and depicted in FIGS. 22-24. If a circular cutting mechanism is implemented, the requirement for such a final push becomes optional. In such a case, the lid assembly 13 is pulled out by lid support body 45, possibly by a vacuum directive to help hold lid assembly 13 on lid support body 45. Additionally, the "final" push to "Y" by push pin 49 is not required.

As the outer plate 15 (as an extended plate portion of the outer pin support plate 16) with the lid punch 60 continues reversing movement, the access opening plate 9 (as an extended plate portion of the first or second intermediate compactor plate 14) also starts moving in reverse direction (as generally illustrated in FIGS. 46-67A). The punched out and assembled lid assembly 13 remains positioned on the lid support body 45 preferably held by vacuum or mechanical means.

Figure 15:
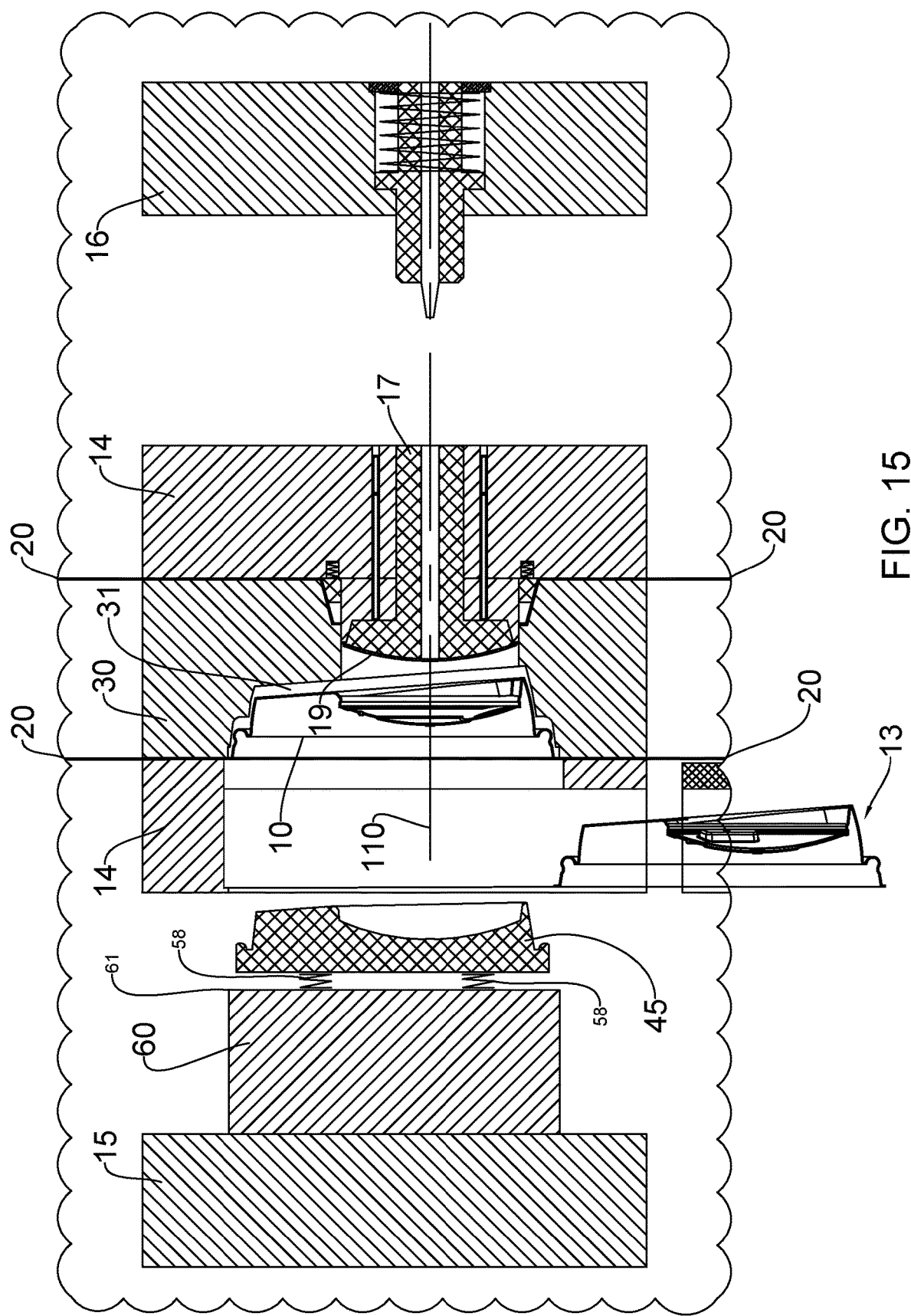
FIG. 15 is an enlarged schematic drawing as enlarged from FIG. 14 to more clearly show from left-to-right an outer plate, a first intermediate compactor plate, a main base plate, a second intermediate compactor plate, and an outer pin support plate of the fourth all-in-one assembly station according to the present invention.
Figure 16:
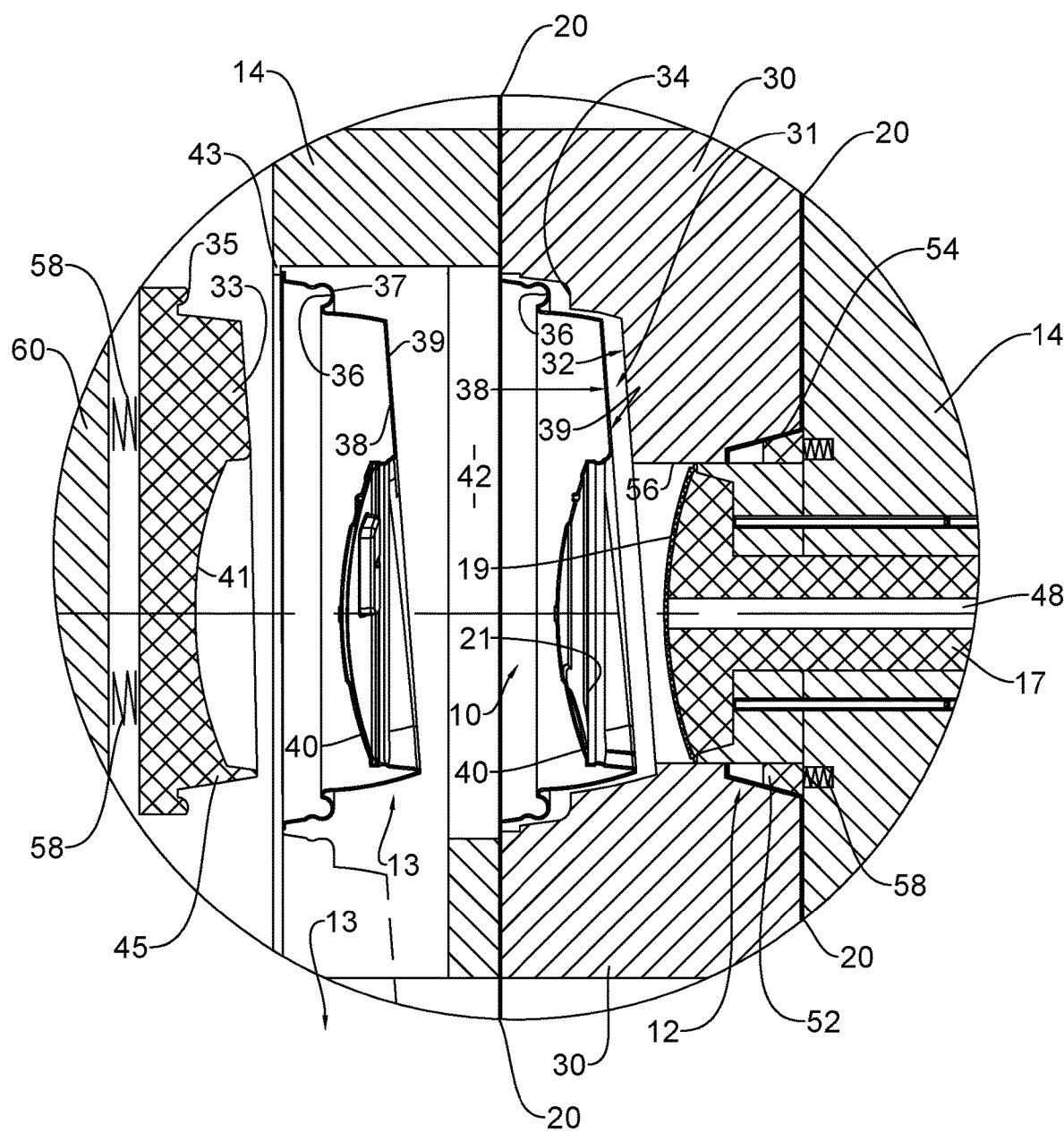
FIG. 16 is an enlarged schematic drawing as enlarged from FIG. 14 to more clearly show the first and second intermediate compactor plates relative to opposed portions of the web and the main base plate with the lower lid by to upper lid body assembly site being centrally depicted.

The access opening plate 9 moves in reverse direction until the lid assembly 13 is removed from the lid support body 45 by the lid stripper element or step 43 as generally depicted in FIGS. 16 and 18. FIG. 16 depicts the lid assembly 13 as removed from the lid support body 45 when the lid perimeter edge 62 touches the lid stripper element or step 43. FIG. 15 depicts the lid assembly 13 directed to the packaging station. Transport or directed movement of the lid assembly 13 to the packaging station may be achieved mechanically or with the aid of a vacuum or pressure-applying device or mechanism (not specifically illustrated).

Simultaneously, the first intermediate compactor plate 14 with compactor shaft 17, the disk punch 50, and the outer pin support plate 16 with push pin 49 reverses direction and starts moving to the position generally depicted in FIGS. 25 and 26. The reader will note that the trimmed lid assembly 13 may be pushed out of the lid nest 31 and therebeyond not only by the compactor shaft 17 but also by other mechanical means such as a ring element operable to push the lid rim outer surface 37 to further direct the lid assembly 13 for redirection to the packaging station whereby lid assemblies 13 may preferably be placed into stacked relation. The reader will further note that the compactor shaft 17 and compactor head 18 may preferably comprise vacuum/pressure delivery means via vacuum/pressure access shaft or channel 48. The application of vacuum/pressure is contemplated as complimentary to help with disk 19 discharge by way of the compactor head 18 or enhancing adhesion of the disk 19 surface to the surface of the compactor head 18.

The functional part movements within the all-in-one assembly station(s) happen simultaneously or nearly simultaneously in a tightly synchronized manner in relatively short periods of time, such that a full cycle is possibly as short as half a second. The drawings submitted in support of these specifications do not precisely depict the exact sequence of each function, but rather attempt to depict the relative position of different parts during the process of performing a particular function of all-in-one assembly station. In general, plates 9/14 and 15/16 move in synchronized manner, simultaneously in a direction towards the stationary main base plate 30 and in reverse direction back to the starting point. In this way, the clap-like or clapping movement and the moniker "clapper" may be said to fairly and accurately describe plate movement character.

Figure 10:
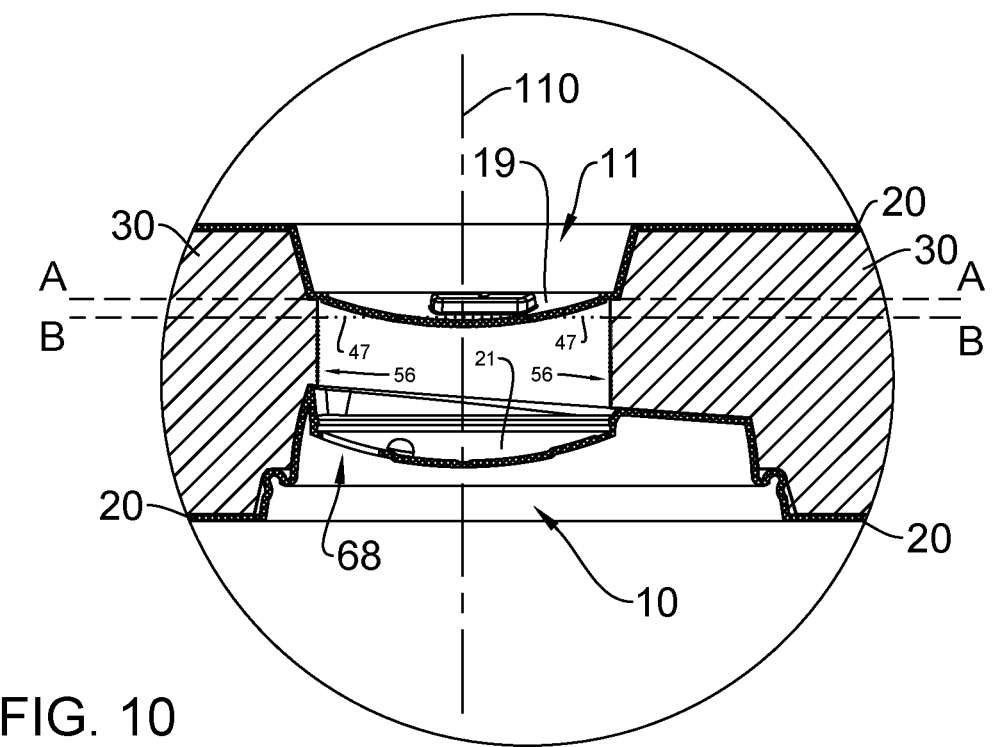
FIG. 10 is an enlarged schematic drawing showing in greater detail a web-attached lower lid body in axial alignment with a web-attached, support cone carrier element-supported upper lid body.

Referring now to FIGS. 41-45A, the reader will recall comparatively referencing FIGS. 9 and 10 showing a disk die opening limit as at 47 and a disk-guiding shaft as at 56 formed in the main base plate 30 for enhancing axially aligned delivery of the disk(s) 19 into the lid depression 21 for forming two-piece lid assembly 13. FIG. 41 is a first sequential view showing the upper lid body or disk 19 still attached to the web 20 as at support cone carrier element 11. This upper lid body or disk 19 is separated from the support cone carrier element 11 leaving support cone carrier element 12 and disk-departed aperture or hole 22, and further directed into the disk-guiding shaft 56 via the compactor head 18 as limited by the disk die opening limit 47 and disk die opening 55 as comparatively depicted in FIGS. 41 and 42.

Referencing FIGS. 43-43B, the reader will see that the disk 19 travels down the disk-guiding shaft 56 for insertion in the axially aligned underlying lid depression 21 of the lower lid body 10 positioned within the main base plate 30. The reader will note that the disk-guiding shaft 56 comprises a certain shaft length and that the disk 19 is of limited (arcuate) depth lesser in magnitude relative to the shaft length of the disk-guiding shaft 56. This structural distinction allows certain alternative disk-to-lid insertion methodology whereby a series of disks 19 may be positioned within the disk-guiding shaft 56 for sequential and successive insertion into underlying lid depressions 21 of lower lid bodies 10 as sequentially and successively positioned within the main base plate 30 as generally depicted in FIGS. 44 through 45A. In this regard, it is contemplated that a screw-type disk-feeding mechanism 80, comprising a series of disk-feeding screws 63, may preferably operate to deliver or feed the disks 19 into the lid depressions 21.

Threads 69 of the disk-feeding screws 63 preferably operate to drive the disks 19 into assembly with the lid depression(s) 21. A disk guide screw 29 may also be positioned at the disk sip opening 78 to aid in proper disk rotational alignment. The screw extension 79 and thread roots 81 that engage outer edges of the disks 19 are further generally depicted and referenced in FIG. 44B. Referencing FIGS. 45 and 45A, the reader will there further consider a disk punch 50 received within the disk die opening 55 with vacuum/pressure being indicated at 82 and vacuum/pressure access shafts or channels 44 as well as a lid support vacuum/press access line 67 formed in the second intermediate compactor plate 14 and the outer plate 15 for enabling vacuum/pressure to direct the rear surface 40 of the lid depression 21 toward the lid support body 45 and disk(s) 19 into engagement with the lid depression(s) 21.

The disk-feeding mechanism 80 more particularly functions to (a) retrieve an upper lid body or disk 19 from the disk die opening limit 47; (b) temporarily store multiple disks 19 in the disk-guiding shaft 56; (c) forward stored disks 19 towards lid depression(s) 21; and (d) drop an individual lower-most disk 19″ to be inserted into lid depression 21. Using vacuum suction 82 for inserting disk 19″ into lid depression 21 allows the temporary storage of multiple disks 19 in the disk-guiding shaft 56. The disk 19 is punched out and pressed to punch limit 47 at plane B of die opening 55.

From punch limit 47 to plane B, the disk 19 is engaged by thread-like disk-feeding mechanism 80 with disk-feeding screws 63 located in immediate adjacency to disk-guiding shaft 56. FIG. 44A depicts the thread pitch embracing the edge of the disk 19 at the thread root 81 and the guide screw 29 is embraced by disk sip opening 78 at its thread root 81. The disk-feeding mechanism 80 may incorporate differing means for grabbing disk(s) 19 from the disk die opening limit 47 for further allowing temporary storage of multiple disks in the disk-guiding shaft 56, after which stored disks 19 may be forwarded towards the lid depression(s) 21 and inserted into lid depressions 21 for forming lid assemblies 13.

Rotation of the screws 63 and 29 is preferably synchronized and engaged as one disk-feeding mechanism 80. At the punch limit 47 plane B threads 69 of the disk-feeding mechanism 80 "grab" an upper most disk 19′ from at least two opposite directions one of which is on disk-guiding screw 29 and forwards the upper most disk 19′ towards lid depression 21 one by one. The last or bottom-most disk 19″, at the end of the thread 69 at plane F of the disk-feeding screws 63 and disk-guiding screw 29 of the disk-feeding mechanism 80, is inserted into aligned lid depression 21 preferably by vacuum suction 82 through lid sip hole 68. The bottom part of the disk-guiding screw 29 extends below the last pitch of the thread 69 and below plane F screw extension 79 into lid depression 21 thereby guiding the bottom most disk 19‴ all the way into lid depression 21 and preventing it from circular dislocation.

There may be multiple disks 19 in transition to lid depression 21 in the disk-feeding mechanism 80. The disk-feeding mechanism 80 could conceivably accommodate a large number of disks 19, perhaps on the order of thousands of disks 19, while also accommodating as few as 2-10 disks 19. Having multiple disks 19 in the disk-feeding mechanism 80 at the starting cycle allows disks 19 to be inserted into approaching lower lid bodies or primary lid formations 10, which bodies or formations 10 have no need to then wait when web 20 moves through the loop 102 and the first support cone carrier element 11 aligns with the conical countersink 54 of the main base plate 30. In other words, the disk-feeding mechanism 80 may eliminate dependence on the synchronization of movements of disk punch 50 and ensuing assembly of upper lid bodies or disks 19 into lid depression(s) 21 in tandem with other tooling operations. This alternative arrangement, for example, not only eliminates the need for compactor shaft 17, but also gives the operator more options in terms of placement of disks 19 with a one-to-one ratio with lower lid bodies 10 on the web 20, and in different configurations and arrangements. For example, disks 19 could be separately formed and fed to the disk punch 50 from separate direction or the number of rows of disks 19 could follow the same number of rows of lower lid bodies 10. Disks 19 may further be punched out and temporarily stored in the disk-feeding mechanism 80. When rows of lower lid bodies 10 start aligning with the disk-feeding mechanism 80, disks 19 may be sequentially and successively inserted into sequential and successive lid depressions 21 row by row.

The reader will note that to minimize effect of building pressure and vacuum in chamber 26 created between plane C (i.e. the top of the compactor's head nest 24) and plane D (i.e. the bottom of the disk-guiding shaft 56 (See FIG. 56)) during the process of rapid back and forth movement of the compactor shaft 17, pressure/vacuum release channel 59 continually connects through all plates (shown with hidden lines in FIG. 55). The reader will further note that the back end of the compactor's push pin 49 comprises a mechanism with spring 58 to prevent "hard landing" of the compactor head 18 on the lid support body 45 for preventing damage to upper lid bodies or disks 19 or the lower lid bodies or primary lid formations 10.

The reader will further note that the disk 19 could be inserted into lid depression 21 by vacuum suction through lid support vacuum/pressure access line 67 which may be aligned with lid sip hole 68, or by combination vacuum suction through lid sip hole 68 and by pressure from compactor head 18. In this regard, vacuum/pressure access line 67 at lid support body 45 may be preferably aligned with lid sip hole 68 and may serve as vacuum/pressure release from the disk-guiding shaft 56 and disk-feeding mechanism 80. The disk-guiding shaft 56 may thus serve as certain disk storage means whereby disks 19 are stored within the disk-guiding shaft 56. An upper-most disk as at 19' is positioned in superior adjacency to stored disks 19 such that a lower-most disk 19''' is insertable into lid depression 21 during the compaction process described hereinabove. This process provides a built-in storage supply of disks 19 so as to provide flexibility for the system.

Referencing FIGS. 76-79, the reader will there consider a precision adjustment feature according to the present invention designed to increase/decrease diameter/size of punched workpiece thermoformed with resilient material exemplified by plastic. Comparing FIGS. 78 and 79, the reader will there see the relaxed diameter of the disk insert 19 as at D2, with an actuated diameter as at D1 defined by the disk-guiding shaft 56. The inherent resiliency of the material construction of the upper lid body or disk 19 provides the manufacturer with a means for precision adjustments within the diameters of D1 and D2.

Comparatively referencing FIGS. 76 and 77, the reader will note support cone carrier element 11 in FIG. 76 and support cone carrier element 11' in FIG. 77. The support cone carrier element 11' is a resiliently deformed support cone carrier element 11, having been resiliently deformed via the compactor head 18 as pushed from the normal (default) position by push pin screw 83 thereby further resiliently deforming the arch of disk 19 to form an arch-deformed disk "19D". The force that resiliently deforms the disk 19 into arch-deformed disk 19D also deforms support cone carrier element 11 into support cone carrier element 11' where the horizontal length of the support cone carrier element 11' deformation is referenced at 86.

Fixating screws 84 may preferably operate to secure the push pin screws 83 into preferred placement for adjusting the compactor head 18 a distance 85 thereby further resiliently deforming the support cone carrier element 11' a horizontal support cone carrier element deformation distance 86. The support cone carrier element 11 comprises a support cone carrier element shoulder as at 87 and the direction of size expansion is referenced at 88 once the disk 19 is punched and pushed from the disk-guiding shaft 56, the diameter of which equals to D0 (default diameter). The internal resistivity or resilient force of the material construction of the disk 19D pushes the outer diameter of the disk in the direction 88 to D2 or its relaxed diameter. The adjustments enabled by way of the screws 83 (and 84) and inherent resiliency of the material construction thereby allow the provider to adjust disk dimensions while holding punch and die dimensions constant.

It will thus be understood that a method for precision adjustment of dimensions of parts made from resilient (e.g. plastic) material during die cutting is supported by the foregoing. When precision of fitted parts exemplified by the upper lid body or disk 19 is part of the protocol or practice, adjustments are sometimes necessary to adjust for precision, and state of the art practices typically require the manufacturer to cut new tool dies and punches. To avoid forming new tool dies and punches, the present invention provides for flexibility in that the dimensions (e.g. size or diameter) of the upper lid body or disk 19 (as an example) may be adjusted slightly to either side with the same diameter of punch and die by manipulating the structure of the part when it still on the web 20 and just before the punch drives it into the die thereby providing an effective way of dimensional precision control.

Referencing FIGS. 46-49, the reader will there consider certain methodology for staggering lower lid body 10 and upper lid body 19 pre-assembly arrangements on the web 20. As earlier indicated, the main base plate 30 is immovable or stationary. On one side of the main base plate 30, the web 20 preferably moves in a downward or first direction and on the other side of the main base plate 30 the web 20 preferably moves in an upward or second direction opposite to the first direction. In the preferred embodiment, the web 20 is a single, continuous web 20 reversed in direction by the loop mechanism 102, which flips over the web 20 such that projected sides of the web 20 with lower lid bodies 10 and support cone carrier elements 11 (with disks 19) face one another. The indexation pre-positions the lower lid body or primary lid formation 10 to face corresponding lid nest 31 and support cone carrier element 11 (with the disk 19) to face corresponding conical countersink 54. The plates 9/14 and 15/16 are positioned to start synchronized movement to and fro or back and forth relative to main base plate 30.

FIG. 47 depicts alignment lines 27 between the upper lid body or disk 19 on support cone carrier element 11, the conical countersink 54 and the disk punch 50 with conically-shaped locator ring 52, as well as alignment between the lower lid body or primary lid formation 10, lid nest 31 and lid support body 45. The lid nest 31 and conical countersink 54 are pre-positioned on the main base plate 30 in such a way that it locates the upper lid body or disk 19 in axial alignment relative to the lid depression 21 on the lower lid body 10 such that the disk 19 is preferably in a rotatably closed position when it is inserted into the lid depression 21. Reference numeral 66 shows direction of precision alignment adjustment of the web 20. FIG. 48 depicts an optional compactor spring 28 for aiding directional movement of the compactor shaft 17 and the compactor head 18.

Referencing FIGS. 50-54, the reader will there consider certain precision alignment features according to the present invention. The reader will note that the web 20 is aligned and pressed between the main base plate 30 and the first and second intermediate compactor plates 14. An air hole needle 53 pocks an air hole in the upper lid body or disk 19. The needle 53 is extended and touches a needle-side surface of the upper lid body or disk 19 before the disk punch cutting edge 51 touches the upper lid body or disk 19 surface. The air hole is pocked before the upper lid body or disk 19 is punched out. The needle 53 also helps to prevent dislocation of the upper lid body or disk 19 as further depicted in FIG. 54.

Referencing FIG. 52, the reader will there consider that when the upper lid body or disk 19 is punched out and pressed to the disk punch limit 47 at point B of die opening 55, it is pre-positioned to be inserted into lid depression 21. The distance between the bottom surface of the upper lid body or disk 19 and the top surface of the lid depression 21 shown as C'-D' (equaling the compactor head limit 25 when all plates 15/16, 14, and 30 are pressed tightly together as generally depicted in FIG. 55 with reference numeral 25 being presented in FIGS. 56 and 57) equals the travel distance of the compactor shaft 17.

Comparatively referencing FIGS. 55 and 58, however, it will be seen that at distance Y, the compactor push pin 49 is extended out. This distance Y is reserved for "final" push on compactor head 18 to push out lid assembly 13 edge 62 past the web 20 as depicted in FIGS. 22-24 and 24A. This final push is synchronized with plate 15 moving back and pulling base 60 and lid support body 45 with it as further seen in FIGS. 22-24A. The surface of the disk-guiding shaft 56 is coated or made slightly smaller than the die opening 55 (See also FIGS. 10), tightening disk-to-shaft tolerance from punch limit point B all the way to the end of disk-guiding shaft 56. Additionally, the disk guide 57 (See also FIGS. 43A and 43B) and surface of the compactor head 18 conform with compactor head side surface of the upper lid body or disk 19 to prevent circular dislocation of the upper lid body or disk 19 as generally depicted in FIGS. 51, 52, and 52A.

FIGS. 50-52A generally illustrate the points through which the upper lid body or disk 19 travels before insertion into lid depression 21 and are not meant to depict a "stop point". When all parts are moving, the upper lid body or disk 19 is punched out with the disk punch 50 through the die opening 55 to the disk punch limit B and continuously pushed by compactor head 18 all the way into lid depression 21 from point B to point D. Once the upper lid body or disk 19 is seated into the lid depression 21, the compactor shaft 17 reverses direction after it pushes out lid assembly 13 as depicted in FIGS. 22-24A. If other means for pushing out lid assembly 13 are utilized, the compactor shaft 17 stops its forward motion and reverses direction. The described position of mechanical parts are presented for illustrative purposes primarily and do not necessarily represent actual positions of various mechanical components at any given moment.

Referencing FIGS. 53 and 54, the reader will there consider that precision alignment of the lower lid body or primary lid formation 10 and support cone carrier element 11 (with disk 19) has been completed. The pre-positioned lower lid body 10 on the web 20 is pressed into countersink shaped lid nest 31 by conically shaped lid support body 45 and the support cone carrier element 11 (with disk 19) on the web 20 is pressed into conical countersink 54 of the main base plate 30. The intermediate compactor plates 14 on both sides of the main base plate 30 and the outer plates 15 are in a pre-punch position. The reader will note that the upper lid body or disk 19 and the lower lid body 10 are not yet trimmed. The upper lid body or disk 19 is pressed in by the disk punch 50 against die opening 55.

The conically shaped locator ring 52 presses against back surface of the support cone carrier element 11 with springs 58 not fully compressed. The lower lid body 10 is pressed by the lid support body 45 against lid nest 31 with springs 58 not fully compressed. The web 20 is also not fully pressed between the main base plate 30 and the intermediate compactor plates 14. At this position, alignment of the lower lid body 10 and the support cone carrier element 11 (with disk 19) respectively eliminates deficiency, if any. The described position of mechanical parts are presented for illustrative purposes primarily and do not necessarily represent actual positions of various mechanical components at any given moment.

Referencing FIGS. 55-59, the reader will there consider that when the outer plates 15 and intermediate compactor plates 14 are pressed together against the main base plate 30 from opposite directions, the web 20 is immovably pressed between the intermediate compactor plates 14 and the stationary main base plate 30. The support cone carrier element 11 is immovably pressed between surfaces of the countersink 54 and conical locator ring 52, and the lower lid body 10 is immovably pressed between surfaces of lid support body 45 and lid nest 31. The upper lid body or disk 19 is inserted into lid depression 21 by compactor shaft 17 as pushed by push pin 49 and compactor head 18 pressing it through the disk-guiding shaft 56 all the way into lid depression 21. A punch limit travel distance is depicted at displacement Y in FIG. 58.

Simultaneously, the circular cutting mechanism 70 as generally and comparatively depicted in FIGS. 57 and 59 trims the lower lid body 10 from the web 20. The circular cutting mechanism 70 is an effective way of trimming thermoformed articles, and specifically circularly shaped articles exemplified by the illustrated lower lid bodies or primary lid formations 10 and upper lid bodies or disks 19. The circular cutting mechanism preferably comprises base ring 73 formed with high precision tolerances. Specifically, the inner ring surface 75 acts as a bearing surface against the outer surface of circular support dome 74. The knife blade tip point 71 is secured in the base ring 73 with the possibility of blade adjustments in different directions.

The knife blade tip point 71 preferably extends just as far as required to cut or slice through material thickness (for example, if material thickness is 0.015", the knife blade tip of knife blade 70 extends 0.016"–0.020" from the top surface of the material thickness). A pressure ball 72 keeps pressure against the material thickness at the time of circular rotation of knife blade tip point 71. The needle bearing 76 helps to keep constant pressure and rotation of the base ring 73 at the same time. It will be understood that the outer surface 77 of the base ring 73 may be outfitted with a gear or timing pulley for rotation means.

Referencing FIGS. 60-62, the reader will there consider the outer plates 15, first and second intermediate compactor plates 14, and the main base plate 30 after the staggered upper lid bodies or disks 19 have been inserted into the staggered lower lid bodies 10. The upper lid body or disk 19 is inserted into the lower lid body or primary lid formation 10 thereby forming a trimmed lid assembly 13. The first and second intermediate compactor plates 14 and the outer plates 15 reverse direction retreating from the stationary main base plate 30, and the web 20 disengages from the main base plate 30.

Disk-departed apertures or holes 22 are formed in the web 20 at the support cone carrier element(s) 12 where the disks 19 have been removed, and lower lid body-departed apertures or holes 23 have been formed in the web 20 where lower lid bodies 10 have been removed. The web 20 is then ready to advance the next row(s) of lower lid bodies 10 and support cone carrier elements 11 (with disks 19) as generally depicted in FIGS. 63 and 64. The assembled lid assembly 13 is preferably held on the lid support body 45 by vacuum suction through vacuum/pressure access shafts or channels 44 or by other means. The lid assemblies 13, as assembled, are then ready to be packaged.

Referencing FIGS. 63 and 64, the reader will there consider the web 20 as advanced for positioning the next row(s) of lower lid bodies or primary lid formations 10 and the upper lid bodies or disks 19 atop support cone carrier elements 11. In other words, the lower lid bodies 10 and the upper lid bodies 19 are indexed into position and the outer plates 15 and the first and second intermediate compactor plates 14 are at respective limit points. The described position of mechanical parts presented in FIGS. 60-64 are presented for illustrative purposes primarily and do not necessarily represent actual positions of various mechanical components at any given moment.

Referencing FIGS. 65-67A, the reader will there consider preferred movements once the lid assemblies 13 have been assembled. The first and second intermediate plates 14 move towards the main base plate 30, pressing the web 20 between the first and second intermediate compactor plates 14 and the main base plate 30. The lid stripper elements or steps 43 pull the lid assembles 13 from the lid support bodies 45, as particularly illustrated and referenced in FIGS. 67 and 67A.

The assembled lid assemblies 13 are dropped down to a packaging chute preferably by way of a mechanical push mechanism or with help of vacuum/pressure or under direction of its own weight. The reader will note that just before lid stripper element(s) or step(s) 43 touch the lid perimeter edge 62, the vacuum suction is preferably disengaged to release the lid assemblies 13. FIG. 66 is a representation of two sectional views in side by side relation and may be comparatively referenced with FIGS. 1 and 65, where FIG. 65 is a cross-sectional view as sectioned from FIG. 66, and FIG. 1 depicts a reduced view of the structures otherwise depicted in FIG. 66.

It will thus be understood that the pre-positioning of untrimmed lower lid bodies or primary lid formations 10 and upper lid bodies or disks 19 on the web 20 allows the tooling carrying/holding plates 9/14 and 15/16 to move in one horizontal or vertical direction back and forth relative to stationary main base plate 30 as generally depicted in FIGS. 46-67A. The trimming and inserting steps of upper lid bodies or disks 19 into the lid depressions 21 of the lower lid bodies or primary lid formations 10 are completed without tools changing direction as generally depicted in FIGS. 55-59. There is no requirement for temporary storage or temporary stoppage of moving parts. The functions of the all-in-one station(s) are completed in process of synchronized linear clapping movement of tooling holding the plates 14 and 15 (as in FIGS. 46-67A) and plates 9 and 16 (as in FIGS. 1-26) back and forth in relation to the stationary main base plate 30. The moniker "clapper" fairly and accurately describes the character of the clap-like or clapping plate movement.

The arrangement of plates 9/14 and 15/16, enabling clap-like movements of opposed tooling, eliminates complicated directional movement changes of trimmed parts to assembly locations and returns and significantly simplifies synchronization of the different parts of mechanism timing and movements. The arrangement(s) further eliminate additional "over-stroke position" in order to insure there is no tab closure or disks 19 left in the die opening from prior cycles, since no disks/tab closures could be left in either the die opening 55 or disk-guiding shaft 56 following an assembly cycle. It should be noted, that the disk-guiding shaft 56 sidewalls may be preferably coated with Teflon-like coating or, alternatively, dimensioned to be just a bit smaller than the die opening 55.

These features allow disks 19, after being trimmed by disk punch 50 and pushed thereby to the die opening limit 47 (as depicted in FIGS. 52 and 52A), to be continually pushed through disk-guiding shaft 56 by the compactor head 18 without significant deviation from its original positioning. The reader will note that retention of the disk position within the disk-guiding shaft 56 may alternatively be achieved by different means such as making the disk-guiding shaft 56 with rubber-like material or trimming disks 19 using precision adjusting method of trimming as discussed hereinabove.

For example, the disk guide 57 prevents circular movement of the disks 19 after trimming as further directed to the lid depression 21. Effectively pre-positioning lower lid bodies 10 and disks 19 on the web 20 eliminates possibility for lower lid bodies 10 and disks 19 to deviate from pre-positioned state during the assembly process, creating simple, efficient and reliable two-piece or composite article assembly method allowing to make high speed inline assembly mechanism with any "over-stroke position" being a part of integrated linear movement of mechanism. The present invention further eliminates "standby positions" as there is no need pick up, hold, or carry the tab closures or disks. All of these eliminations provide certain simplified composite article assembly methodology enabled by the all-in-one assembly stations for trimming and assembling multiple thermoformed workpieces as exemplified by lower lid bodies 10 and upper lid bodies or disks 19.

The reader will further recall that pre-positioned lower lid bodies 10 on the web 20 are pressed into countersink shaped lid nest 31 by conically shaped lid support body 45 as generally depicted in FIGS. 47-49. The combination of conically shaped walls of the lid support body 45 as suspended from the lid support base 46 on the springs 58 allows lid support top surface 33 and the lid support rim top 35 to touch corresponding surfaces of the lid top rear surface 38 and the lid ring rear surface 36 before the lid top outer surface 39 touches the lid nest ceiling 32 and the lid rim outer surface 37 touches the lid nest rim surface 34 and before the web 20 is securely pressed between the main base plate 30 and the intermediate compactor plates 14. The precision alignment adjustment happens moments before the lower lid bodies and the web 20 are immovably pressed between plates 30 and 14 and the lower lid bodies 10 are thereafter immovably pressed between corresponding surfaces of lid support body 45, the lower lid body 10, and the lid nest 31 as generally depicted in FIGS. 55-59.

The reader will further recall that the compactor head 18 conforms to the upper surface of the upper lid body or disk 19 and creates surface to surface contact as generally depicted in FIGS. 47, 48, 51, 52, and 52A. The upper lid body or disk 19 is preferably formed on top of the frustum of the support cone carrier element 11 where the base of the support cone carrier element 11 is an extension of the (plastic) web 20. This formation helps to speed up indexation and proper insertion and fixating of frustoconicaly thermoformed support cone carrier element 11 into the corresponding conical countersink 54 of the main base plate 30.

The provision of a multiplicity of these types of formations (as generally depicted in FIGS. 27-37) on the continuously advancing web 20 allows not only increased speed of indexing and insertion of corresponding frustoconicaly thermoformed support cone carrier elements 11 into conical countersinks 54 of the main base plate 30, but does so with high precision. In this regard, the conically shaped locator ring 52 suspended on the spring 58 (See FIG. 47) helps properly align frustoconicaly thermoformed support cone carrier elements 11 on the web 20 with corresponding conical countersink 54 on the main base plate 30 before the web 20 is immovably pressed between the main base plate 30 and the intermediate plate 14 (as seen in FIGS. 51-54) thereby self-adjusting parts into alignment for higher precision.

Referencing FIGS. 68-75, the reader will there consider certain alternative methodology for trimming plastic shapes as prefaced above. There are benefits of cutting specifically rounded or circular-shaped parts exemplified by lower lid bodies or primary lid formations 10 and upper lid bodies or disks 19, etc. The alternative method includes a method of circularly moving a cutting implement or knife 210 through a stack 202 of web sheets 203 for avoiding the need to either die-cut or press-knife through material layers as is currently done in the state of the art.

A single tubular shaft as at 200 is depicted having a diameter sufficient to accept a stack 204 of cut lid formations or workpieces 205. A shaft-receiving plate assembly 201 comprises shaft-receiving apertures 211 outfitted with certain interface means 207 for driving externally located threads 206 formed on the exterior of the tubular shaft 200 and extending the length of the tubular shaft as at arrows 208. The shaft-receiving plate assembly 201 is positioned in adjacency to a stack 202 of web sheets 203 such that the successively stacked workpieces 215 are positioned adjacent the apertures 211.

As the interface means 207 drives the external threads, the tubular shaft 200 rotates at a high rate of speed as at arrows 212 and is thus directed into the stack 202 of web sheets 203 for cutting through the web sheets 203 and separating lid formations or workpieces 205 from the successive sheets 203. The end 209 of the tubular shaft 200 is outfitted with a cutting implement or knife 210 that cuts through the successive web sheets 203 as it is directed as at arrow 213. Each of the web sheets 203 has a material thickness 221 (e.g. 0.02 inches) generally extending in a material plane 220. The cutting implement or knife tip 222 extends a distance from shaft end plane 223 greater in magnitude than the material thickness 221 to cut through the material thickness 221.

While the above descriptions contain much specificity, this specificity should not be construed as limitations on the scope of the invention, but rather as an exemplification of the invention. In certain embodiments, the basic invention may be said to essentially teach or disclose certain composite article assembly or two-workpiece assembly methodologies essentially based on the all-in-one assembly stations through which one or more continuous webs 20 may be directed as described in more detail hereinabove. The concepts described hereinabove, though directed to a two-piece lid assembly method, naturally apply to two-workpiece assemblies whereby a first and second workpiece may be assembled to form a two-workpiece ensemble or composite article according to the methods and apparatus discussed above.

The essential composite article assembly or two-workpiece assembly method according to the present invention may be said to comprise the basic steps of forming upper lid bodies or disks as at 19 (i.e. a first workpiece) and lower lid bodies or primary lid formations as at 10 (i.e. a second workpiece) via a primary body-forming station as exemplified by thermoforming station(s) 100. The upper lid bodies or first workpieces 19 and the lower lid bodies or second workpieces 10 are then positioned into axial alignment along an assembly alignment axis as at 110 within an all-in-one assembly station as variously exemplified.

Once positioned into axial alignment with one another, the upper lid bodies or first workpieces 19 and the lower lid bodies or second workpieces 10 are directed toward one another within the assembly station along the assembly alignment axis 110 so as to close the distance between the respectively aligned upper lid bodies/first workpieces 19 and the lower lid bodies/second workpieces 10. When the distance between the respectively aligned upper lid bodies/workpieces 19 and lower lid bodies/workpieces 10 approaches zero, the upper lid bodies 19 engage the lower lid bodies 10 and, due to the size and shape thereof, assemble under the (forced and) directed engagement into one another to form two-piece lid assemblies 13.

As earlier described, the steps of (a) directing the upper lid bodies or disks 19 and the lower lid bodies or primary lid formations 10 toward one another within the assembly station along the assembly alignment axis 110, and (b) assembling the upper lid bodies or disks 19 with the lower lid bodies or primary lid formations 10 along the assembly alignment axis 110 within the all-in-one assembly station(s) are performed in a single clap-like or clapping movement of opposed tooling as exemplified by the plate with access opening 9 or intermediate compactor plates 14 (i.e. combination plates 9/14 when forming multiple workpiece assemblies in side-by-side, staggered relation to one another), and the outer plates 15 or the outer pin support plates 16 (i.e. combination plates 15/16 when forming multiple workpiece assemblies in side-by-side, staggered relation to one another) opposite the stationary main base plate 30 within which upper lid body-to-lower lid body assembly occurs.

It will be recalled that the present invention is believed centered on the substantially simultaneous, dual-action, web-cut and disk-to-lid assembly step whereby the opposed tooling is directed towards one another for directing an upper lid body or disk 19 into engagement with a lower lid body or primary lid formation 10 for forming lid assemblies 13. In other words, when the upper lid body or disk 19 is cut from the web 20 it is directed (e.g. pushed (i.e. not carried)) into assembled relation with the lower lid body or primary lid formation 10 also being removed from the web 20 during one clap-like, to-and-fro or back and forth tooling movement within the all-in-one assembly station(s) according to the present invention.

The step of forming upper lid bodies or disks 19 and lower lid bodies or primary lid formations 10 via the primary body-forming station (e.g. thermoforming stations 100) comprises or includes the step of forming the upper lid bodies 19 and the lower lid bodies 10 on at least one continuous web 20 via at least one primary body-forming station. Certain alternative methodology according to the present invention involves forming the upper lid bodies 19 and the lower lid bodies 10 on at least a pair of, or at least two continuous webs 20 as generally depicted in FIGS. 7 and 8, and directing the pair or at least two continuous webs 20 via at least two separate primary body-forming stations after which stations, the webs 20 continue in a web-to-station flow or direction (i.e. into or toward a singular all-in-one assembly station).

The composite article assembly method according to the present invention further comprises the step of removing a select body formation from the at least one continuous web 20 before directing upper lid bodies 19 and lower lid bodies 10 toward one another within the assembly station, which select body formation is selected from the group consisting of the upper lid bodies 19 and the lower lid bodies 10. In other words, either the upper lid body 19 or the lower lid body 10 is preferably separated (e.g. via a select cutting process) from the web 20 before it is further directed toward the other body of the two bodies 19 or 10 for further assembly into lid assembly 13. The select cutting process may be selected from the group consisting of a die-cutting process or a circular knife-cutting process.

The composite article assembly method may further preferably comprise or include the step of forming upper lid bodies 19 and lower lid bodies 10 on the least one continuous web 20 via the at least one body-forming station such that the upper lid bodies 19 and the lower lid bodies 10 are formed in spaced and alternating relation to one another as variously exemplified and illustrated (e.g. See FIGS. 27-37). The composite article assembly methodology according to the present invention may further preferably comprise the step of directing the at least one continuous web 20 through a secondary body-forming station as exemplified by the stations 101 after forming the upper lid bodies 19 and lower lid bodies 10 via the primary body-forming station exemplified by the thermoforming stations 100. The secondary body-forming station, as exemplified by station 101, functions to form secondary formations as exemplified by sip holes, air vents, or other similar secondary apertures in select bodies as selected from the group consisting of upper lid bodies 19 and lower lid bodies 10.

When the production line is built around a single, continuous web 20, the composite article assembly method may further preferably comprise the step of directing the spaced and alternating upper lid bodies 19 and lower lid bodies 10 through a loop mechanism as exemplified by loop mechanism 102 so as to axially align the upper lid bodies 19 and lower lid bodies 10 within the singular assembly station for forming lid assemblies 13. Bearing in mind that the all-in-one assembly stations all provide a basis for the described methodology, the methodology may further preferably comprise the step of directing the upper lid bodies 19 and lower lid bodies 10 into a stationary plate as exemplified by the stational main base plate 30 for structurally or mechanically enhancing axial alignment of the upper lid bodies 19 and the lower lid bodies 10 during the step of assembling the upper lid bodies 19 with the lower lid bodies along the assembly alignment axis 110.

Comparatively referencing FIGS. 41-45, it will be recalled that the composite article assembly method according to the present invention may further preferably comprise the step of directing at least two or a series of first select body formations into the stationary plate (e.g. the main base plate 30) before directing a first of the at least two first select body formations into assembled relation with a singular second select body formation. The first and second select body formations may be selected from the group consisting of the upper lid bodies 19 and the lower lid bodies 10.

In other words, as discussed hereinabove, a series of upper lid bodies 19 may be directed into the disk-guiding shaft 56 of the main base plate 30 before a first of the upper lid bodies or disks 19 (i.e. the lower-most disk 19") is expelled, directed, or discharged (e.g. via the disk-feeding mechanism 80) from the disk-guiding shaft 56 into engagement with an underlying lid depression 21 of a lower lid body 10. It will thus be understood that the disk-guiding shaft 56 of the main base plate 30 may temporarily store at least a second of the at least two first select body formations in the stationary plate exemplified by the main base plate 30.

The step of directing upper lid bodies 19 and lower lid bodies 10 into the stationary plate exemplified by the main base plate 30 may further preferably comprise the step of directing upper lid bodies 19 and lower lid bodies 10 into a series of cavities or chambers are exemplified by the axially aligned conical countersink 54, the disk-guiding shaft 56, and the lid nest 31. Referencing FIGS. 46, 50, 53, 55, 60, 63, and 65, it will be seen that the main base plate 30 may comprise the cavities or chambers exemplified by the axially aligned conical countersink 54, the disk-guiding shaft 56, and the lid nest 31 arranged or formed in side-by-side relation within the stationary main base plate 30.

Each of these cavities or chambers respectively comprises a select assembly alignment axis as at 110. The select alignment axes 110 are parallel to one another. The upper lid bodies 19 are assembled with lower lid bodies 10 in side-by-side relation within the stationary main base plate 30 in opposite directions defined by or along the select alignment axes 110. In other words, for example, a first upper lid body 19 is directed into engagement with a first lower lid body 10 in a first direction and a second upper lid body 19 is directed into engagement with a second lower lid body 10 in a second direction opposite the first direction in side-by-side relation to the first upper lid body 19 and first lower lid body 10 as generally depicted in FIGS. 46, 50, 53, 55, 60, 63, and 65.

Referencing FIGS. 76-79, the reader will recall that the present invention embraces the concept of adjusting tooling features in a manner that cooperates with inherent resiliency of materials to provide for better assembly characteristics. For example, screws 83 and 84 may be fine-tuned for adjusting the compactor shaft 17 and compactor head 18 so as to resiliently deform the upper lid body 19 prior to separation from the web 20 and directed transfer through the disk-guiding shaft 56 into engagement with the underlying lid depression 21 of a lower lid body 10. Accordingly, the present methodology contemplates the step of resiliently deforming a select body formation before the step of assembling upper lid bodies 19 with lower lid bodies 10 along the assembly alignment axis 110 within the assembly station, which select body formation is selected from the group consisting of the upper lid bodies 19 and the lower lid bodies 10. The step of resiliently deforming the select body formation functions to adjustably enhance upper lid body-to-lower lid body assembly.

The composite article assembly methodology according to the present invention further contemplates the step of directing force into a select body formation via vacuum/pressure application as enabled, for example, via the compactor push pin vacuum/pressure access channel 48, vacuum/pressure access channels 44, pressure/vacuum release channel 59, and lid support vacuum/pressure access line 67. The select body formation may be preferably selected from the group consisting of the upper lid bodies 19, the lower lid bodies 10, and the two-piece lid assemblies 13. In this last regard, it will be recalled that force may be directed into the lid assemblies 13 for re-directing formed lid assemblies 13 toward the packaging station(s) according to the present invention. The composite article assembly method according to the present invention may further comprise the step of directing composite articles or lid assemblies into stacked relation as generally depicted throughout the drawings submitted in support of these specifications.

Referencing FIGS. 68-75A, the present specifications further contemplate certain workpiece stacking methodology or workpiece cutting/trimming methodology for providing a stacked series of lid formations or composite articles for ease of packaging. The workpiece stacking or workpiece trimming methodology according to the present invention contemplates the essential steps of stacking a series of web sheets 203 atop one another into a web sheet stack as at 202. Each web sheet 203 may provide at least one, but preferably a series of workpieces as at 215. The web sheet stack 202 may thus preferably comprise at least one stack of web-based lid bodies or workpieces as at 215.

The web sheet stack 202 may be positioned in (inferior) adjacency to a shaft-receiving plate assembly as at 201, which shaft-receiving plate assembly 201 comprises at least one, but preferably a series of shaft-receiving apertures or bores as at 211. The at least one stack of web-based lid bodies or workpieces 215 are preferably positioned in adjacency to the shaft-receiving aperture(s) 211. At least one tubular shaft 200, but preferably a plurality of tubular shafts as at 200 may be directed through the web sheet stack 202 via the shaft-receiving aperture(s) 211 thereby separating the web-based lid bodies or workpieces 215 from the series of web sheets 203 and forming a stacked series of lid formations or workpieces as at 204.

The stacked series of lid formations or workpieces 204 is linearly directed into the tubular shaft 200 as the tubular shaft 200 is directed through the web sheet stack 202. It will be recalled the tubular shaft 200 preferably comprises a tubular shaft end as at 209, which tubular shaft end 209 is preferably outfitted with a cutting implement or knife as at 210. The cutting implement 210 cuts through the web sheet stack 202 as the tubular shaft 200 is directed therethrough. The tubular shaft 200 preferably comprises external threads as at 206, and the shaft receiving aperture or bore 211 is preferably outfitted with a thread-driving interface as at 207. The thread-driving interface 207 and external threads 206 are cooperable for converting rotational motion as at 212 to linearly directed motion 213 for directing the tubular shaft 200 linearly through the web sheet stack 202.

Although the lid formation and packaging systems and methods according to the present invention have been described by reference to a number of different embodiments, aspects, and features, it is not intended that the novel combinations or assemblies be limited thereby, but that modifications thereof are intended to be included as falling within the broad scope and spirit of the foregoing disclosure, the appended drawings, and the following claims.

What is claimed is:

1. A composite article assembly method, the composite article assembly method comprising the steps of:
    axially aligning web-based first and second thermoformed workpieces within an assembly station along an assembly alignment axis;
    directing the first and second workpieces toward one another within the assembly station along the assembly alignment axis; and
    assembling the first and second workpieces along the assembly alignment axis within the assembly station thereby forming a composite article.

2. The composite article assembly method of claim 1 wherein the steps of:
    directing the first and second workpieces toward one another within the assembly station along the assembly alignment axis; and
    assembling the first and second workpieces along the assembly alignment axis within the assembly station are performed in a single clapping movement of opposed tooling.

3. The composite article assembly method of claim 2 wherein the web-based first and second thermoformed workpieces are formed in spaced and alternating relation to one another.

4. The composite article assembly method of claim 3 comprising the step of directing the web-based first and second thermoformed workpieces through a loop mechanism for axially aligning the web-based first and second thermoformed workpieces within the assembly station.

5. The composite article assembly method of claim 2 comprising the step of directing the web-based first and second thermoformed workpieces into a stationary plate for enhancing axial alignment of the web-based first and second thermoformed workpieces during the step of assembling the web-based first and second thermoformed workpieces, the stationary plate interfacing intermediate the single clapping movement of opposed tooling.

6. The composite article assembly method of claim 5 comprising the step of successively directing at least two select workpieces into the stationary plate before discharging a first of the at least two select workpieces into assembled relation with a singular second workpiece.

7. The composite article assembly method of claim 6 comprising the step of temporarily storing at least a second of the at least two select workpieces in the stationary plate.

8. The composite article assembly method of claim 2 comprising the step of resiliently deforming a select workpiece before the step of assembling the first and second workpieces, the step of resiliently deforming the select workpiece for adjustably enhancing composite article assembly.

* * * * *